US012775474B2

(12) United States Patent
Tao et al.

(10) Patent No.: US 12,775,474 B2
(45) Date of Patent: Oct. 27, 2026

(54) MEMORIALIZING A GRAPHICAL USER INTERFACE WITH GENERATIVE ARTIFICIAL INTELLIGENCE

(71) Applicant: The Toronto-Dominion Bank, Toronto (CA)

(72) Inventors: Linda Ling Tao, Toronto (CA); Anand Pandey, Markham (CA); Prerak Trivedi, Mississauga (CA); John Jong-Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 337 days.

(21) Appl. No.: 18/412,116

(22) Filed: Jan. 12, 2024

(65) Prior Publication Data

US 2025/0231774 A1 Jul. 17, 2025

(51) Int. Cl.

*G06F 3/0484* (2022.01)
*G06F 3/0482* (2013.01)
*G06F 9/451* (2018.01)

(52) U.S. Cl.

CPC ............ *G06F 9/451* (2018.02); *G06F 3/0482* (2013.01); *G06F 3/0484* (2013.01)

(58) Field of Classification Search

CPC ....... G06F 9/451; G06F 3/0482; G06F 3/0484
See application file for complete search history.

(56) References Cited

U.S. PATENT DOCUMENTS 7,865,837 B1 * 1/2011 Huff ..................... G06Q 10/109 715/811
9,864,982 B2 1/2018 Bristow et al.
10,163,085 B2 12/2018 D'Agostino et al.
10,178,246 B1 1/2019 Horvath et al.
10,181,114 B2 1/2019 Tseretopoulos et al.
10,339,931 B2 7/2019 Tseretopoulos et al.
10,346,824 B2 7/2019 Chan et al.
10,360,303 B2 7/2019 Volkovs et al.
10,405,146 B1 9/2019 Kuruvilla et al.
10,438,206 B2 10/2019 Jivraj et al.
10,440,196 B2 10/2019 Horvath et al.
10,440,197 B2 10/2019 Horvath et al.
10,460,748 B2 10/2019 Tseretopoulos et al.
10,482,675 B1 11/2019 Sutter et al.
10,659,400 B2 5/2020 Moon et al.
10,698,902 B2 6/2020 Tseretopoulos et al.
10,706,635 B2 7/2020 Sutter et al.
10,708,721 B2 7/2020 Kuruvilla et al.
10,728,259 B2 7/2020 McCarter et al.
(Continued)

OTHER PUBLICATIONS

Heglin et al., "Auto-Adjudication Process Via Machine Learning," U.S. Appl. No. 19/053,942, filed Feb. 14, 2025.

*Primary Examiner* — Anil K Bhargava

(57) ABSTRACT

An example operation includes one or more of rendering a graphical user interface within a software application including a plurality of elements, modifying locations of the plurality of elements within the graphical user interface based on user inputs on the graphical user interface, generating a dynamic mapping of the graphical user interface including the modified locations of the plurality of elements based on an execution of an artificial intelligence (AI) model on the rendered graphical user interface, and storing the dynamic mapping of the graphical user interface within a storage.

20 Claims, 29 Drawing Sheets

(56) References Cited

U.S. PATENT DOCUMENTS 10,776,619 B2 9/2020 Collinson et al.
10,789,637 B1 9/2020 Jain et al.
10,824,941 B2 11/2020 Volkovs et al.
10,831,923 B2 11/2020 Dunjic et al.
10,832,047 B2 11/2020 Moghtadai
10,862,897 B2 12/2020 D'Agostino et al.
10,867,292 B2 12/2020 Lin et al.
10,867,293 B2 12/2020 Bristow et al.
10,878,816 B2 12/2020 Tseretopoulos et al.
10,902,220 B2 1/2021 Lozon et al.
10,922,665 B2 2/2021 Miller et al.
10,943,605 B2 3/2021 Tseretopoulos et al.
10,977,617 B2 4/2021 Tseretopoulos et al.
11,004,187 B2 5/2021 Kuruvilla et al.
11,017,028 B2 5/2021 Dunjic et al.
11,030,415 B2 6/2021 Volkovs et al.
11,055,924 B2 7/2021 Navarro et al.
11,061,638 B2 7/2021 Lam
11,070,448 B2 7/2021 Miller et al.
11,087,314 B2 8/2021 Gandhi et al.
11,100,168 B2 8/2021 Miller et al.
11,140,143 B2 10/2021 Moon et al.
11,144,921 B2 10/2021 Dunjic et al.
11,144,998 B2 10/2021 Kuruvilla et al.
11,145,169 B2 10/2021 Pratten et al.
11,182,860 B2 11/2021 Kuruvilla et al.
11,200,328 B2 12/2021 Shpurov et al.
11,200,411 B2 12/2021 Rizvi et al.
11,210,857 B2 12/2021 Rizvi et al.
11,222,286 B2 1/2022 Choe et al.
11,232,304 B2 1/2022 Navarro et al.
11,257,144 B1 * 2/2022 Hamel ............... G06Q 30/0631
11,276,257 B2 3/2022 Moghtadai et al.
11,303,642 B2 4/2022 Dunjic et al.
11,334,574 B2 5/2022 Caputo et al.
11,347,744 B2 5/2022 Tseretopoulos et al.
11,349,871 B2 5/2022 Moon et al.
11,354,442 B2 6/2022 Haldenby et al.
11,361,566 B2 6/2022 Collinson et al.
11,373,229 B2 6/2022 Tseretopoulos et al.
11,392,776 B2 7/2022 Lozon et al.
11,393,020 B2 7/2022 Mathew et al.
11,394,668 B1 7/2022 Subbunarayanan et al.
11,397,765 B2 7/2022 Volkovs et al.
11,409,811 B2 8/2022 D'Agostino
11,411,734 B2 8/2022 Shpurov et al.
11,430,242 B2 8/2022 Moghtadai
11,436,809 B2 9/2022 Rizvi et al.
11,451,669 B1 9/2022 Navarro et al.
11,469,878 B2 10/2022 Shpurov et al.
11,470,091 B2 10/2022 McCarter et al.
11,470,143 B2 10/2022 Joheb et al.
11,475,059 B2 10/2022 Liu et al.
11,475,251 B2 10/2022 Morin et al.
11,477,265 B2 10/2022 McPhee et al.
11,507,622 B2 11/2022 Grebenisan et al.
11,507,868 B2 11/2022 Kwong et al.
11,546,345 B2 1/2023 D'Agostino et al.
11,550,862 B2 1/2023 Ahlstrom et al.
11,580,762 B2 2/2023 Rizvi et al.
11,600,064 B2 3/2023 Navarro et al.
11,604,899 B2 3/2023 Haldenby et al.
11,620,741 B2 4/2023 Kuruvilla et al.
11,632,311 B2 4/2023 Miller et al.
11,651,100 B2 5/2023 Dunjic et al.
11,663,488 B2 5/2023 Volkovs et al.
11,671,536 B2 6/2023 Navarro et al.
11,687,995 B2 6/2023 Tseretopoulos et al.
11,689,484 B2 6/2023 Moon et al.
11,695,712 B2 7/2023 Schoppe et al.
11,704,782 B2 7/2023 Wakim et al.
11,741,305 B2 8/2023 Skaljin et al.
11,743,210 B2 8/2023 Moon et al.
11,748,400 B2 9/2023 Volkovs et al.
11,756,388 B2 9/2023 Pratten et al.
11,777,918 B2 10/2023 Moon et al.
11,782,935 B2 10/2023 Caputo et al.
11,789,909 B2 10/2023 Grebenisan et al.
11,790,012 B2 10/2023 D'Agostino
11,790,354 B2 10/2023 Gandhi et al.
11,797,962 B2 10/2023 Jones et al.
11,809,486 B2 11/2023 Liu et al.
11,809,577 B2 11/2023 Begg et al.
11,811,826 B2 11/2023 Moon et al.
11,842,252 B2 12/2023 Kuang et al.
11,875,398 B2 1/2024 Pratten et al.
11,880,811 B2 1/2024 Pawelkiewicz et al.
11,886,764 B2 1/2024 Lam
11,928,112 B2 3/2024 Dunjic et al.
11,941,525 B2 3/2024 Morin et al.
11,941,703 B2 3/2024 Kuruvilla et al.
11,955,117 B2 4/2024 McDermid et al.
11,966,491 B2 4/2024 D'Agostino
11,978,085 B2 5/2024 Rai et al.
11,978,090 B2 5/2024 Navarro et al.
11,985,153 B2 5/2024 Karl
11,995,121 B2 5/2024 Volkovs et al.
12,008,315 B2 6/2024 Miller et al.
12,014,303 B2 6/2024 Carvalho et al.
12,019,594 B2 6/2024 Floyd et al.
12,021,874 B2 6/2024 Dunjic et al.
12,039,535 B2 7/2024 Dunjic et al.
12,052,363 B2 7/2024 Shpurov et al.
12,061,652 B2 8/2024 Miller et al.
12,067,130 B2 8/2024 Shpurov et al.
12,067,580 B2 8/2024 Jeske et al.
12,079,351 B2 9/2024 Begg et al.
12,106,220 B2 10/2024 Volkovs et al.
12,111,793 B2 10/2024 Grebenisan et al.
12,124,925 B2 10/2024 Rho et al.
12,136,079 B2 11/2024 Jones et al.
12,164,542 B1 12/2024 Rahman et al.
12,169,693 B2 12/2024 Lu
12,182,800 B2 12/2024 Navarro et al.
12,198,109 B2 1/2025 Abbas
12,198,510 B2 1/2025 Pratten et al.
12,210,534 B2 1/2025 Cashion et al.
12,211,274 B2 1/2025 Ma et al.
12,217,011 B2 2/2025 Luo et al.
12,223,549 B2 2/2025 Bouëtté et al.
12,229,690 B2 2/2025 Stanevich et al.
12,254,512 B2 3/2025 Heglin et al.
12,282,785 B2 4/2025 Karbasi et al.
12,288,236 B2 4/2025 Volkovs et al.
12,299,149 B2 5/2025 Nikoghossian et al.
12,316,715 B2 5/2025 Taheri et al.
12,321,861 B2 6/2025 Volkovs et al.
12,326,856 B2 6/2025 Mohammed et al.
12,333,354 B2 6/2025 Mohammed et al.
12,353,969 B2 7/2025 Kuang et al.
12,354,094 B2 7/2025 Jones et al.
12,373,795 B2 7/2025 Misler et al.
2014/0074550 A1 3/2014 Chourey
2015/0156283 A1 * 6/2015 Navarro ................ G06F 3/0482
715/739
2018/0268818 A1 9/2018 Schoenmackers et al.
2019/0114662 A1 4/2019 Bennion et al.
2019/0172045 A1 6/2019 Dunjic et al.
2020/0058068 A1 2/2020 Gandhi et al.
2020/0403817 A1 * 12/2020 Daredia ................ G10L 15/083
2021/0027160 A1 1/2021 Volkovs et al.
2021/0037040 A1 2/2021 Aleks et al.
2021/0117893 A1 4/2021 Sohum et al.
2021/0182946 A1 6/2021 Tapia
2021/0232950 A1 7/2021 Kono
2021/0264461 A1 8/2021 Fam
2021/0406570 A1 12/2021 Bielby
2021/0407016 A1 12/2021 Kuruvilla et al.
2022/0058489 A1 2/2022 Volkovs et al.
2022/0108069 A1 4/2022 Lee
2022/0157094 A1 5/2022 Moghtadai et al.
2022/0172083 A1 6/2022 Wu et al.
2022/0188705 A1 6/2022 Davoodi et al.
2022/0198411 A1 6/2022 Jones et al.

(56) References Cited

U.S. PATENT DOCUMENTS

2022/0198432 A1 6/2022 Jones et al.
2022/0198445 A1 6/2022 Jones et al.
2022/0207295 A1 6/2022 Stanevich et al.
2022/0207430 A1 6/2022 Dickie et al.
2022/0207432 A1 6/2022 Whelan et al.
2022/0207606 A1 6/2022 Dickie et al.
2022/0245060 A1 8/2022 Kathuria et al.
2022/0270155 A1 8/2022 Volkovs et al.
2022/0277213 A1 9/2022 Braviner et al.
2022/0277227 A1 9/2022 Yu et al.
2022/0277323 A1 9/2022 Whelan et al.
2022/0284450 A1 9/2022 Asta et al.
2022/0300903 A1 9/2022 Huang et al.
2022/0309573 A1 9/2022 Mathew et al.
2022/0318573 A1 10/2022 Smith et al.
2022/0318617 A1 10/2022 Wong et al.
2022/0327397 A1 10/2022 Braviner et al.
2022/0327430 A1 10/2022 Zuberi et al.
2022/0327431 A1 10/2022 Braviner et al.
2022/0327432 A1 10/2022 Gutierrez Bugarin et al.
2022/0327625 A1 10/2022 Leung et al.
2022/0335718 A1 10/2022 Ma et al.
2022/0343422 A1 10/2022 Zuberi et al.
2022/0365645 A1* 11/2022 Tyler .................... G06F 3/0481
2022/0366064 A1 11/2022 Nikoghossian et al.
2022/0383301 A1 12/2022 Jones et al.
2022/0383313 A1 12/2022 Jones et al.
2022/0383314 A1 12/2022 Jones et al.
2022/0394349 A1 12/2022 Sanders
2022/0405299 A1 12/2022 Leung et al.
2022/0414495 A1 12/2022 Stanevich et al.
2023/0006809 A1 1/2023 Shpurov et al.
2023/0007075 A1 1/2023 Mcphee et al.
2023/0011451 A1 1/2023 Lu
2023/0048437 A1 2/2023 Karbasi et al.
2023/0083899 A1 3/2023 Gandouet et al.
2023/0086653 A1 3/2023 Zykh et al.
2023/0092384 A1 3/2023 Ahlstrom et al.
2023/0107703 A1 4/2023 Zhang et al.
2023/0113752 A1 4/2023 Jorlett et al.
2023/0119108 A1 4/2023 Volkovs et al.
2023/0131935 A1 4/2023 Volkovs et al.
2023/0153461 A1 5/2023 Kalra et al.
2023/0195734 A1 6/2023 Cashion et al.
2023/0196406 A1 6/2023 Gandouet et al.
2023/0244917 A1 8/2023 Loaiza Ganem et al.
2023/0244962 A1 8/2023 Volkovs et al.
2023/0252301 A1 8/2023 Volkovs et al.
2023/0259883 A1 8/2023 Misler et al.
2023/0267367 A1 8/2023 Volkovs et al.
2023/0267475 A1 8/2023 Navarro et al.
2023/0306434 A1 9/2023 Dunjic et al.
2023/0316485 A1 10/2023 Wakim et al.
2023/0318994 A1 10/2023 Moon et al.
2023/0336615 A1 10/2023 Joheb et al.
2023/0342481 A1 10/2023 Nikoghossian et al.
2023/0344814 A1 10/2023 Moon et al.
2023/0351116 A1 11/2023 Skaljin et al.
2023/0368048 A1 11/2023 Yang et al.
2023/0377047 A1 11/2023 Bouëtté et al.
2023/0385693 A1 11/2023 Cresswell et al.
2023/0385694 A1 11/2023 Cresswell et al.
2023/0386190 A1 11/2023 Cresswell et al.
2023/0394452 A1 12/2023 Jones et al.
2023/0401192 A1 12/2023 Yang et al.
2023/0401553 A1 12/2023 Navarro et al.
2023/0401572 A1 12/2023 Navarro et al.
2023/0419302 A1 12/2023 Navarro et al.
2023/0419402 A1 12/2023 Ghelichi et al.
2024/0020534 A1 1/2024 Perez Vallejo et al.
2024/0062117 A1 2/2024 Kuang et al.
2024/0106851 A1 3/2024 Kennedy et al.
2024/0119346 A1 4/2024 Chang et al.
2024/0126575 A1 4/2024 Kiriakou et al.
2024/0127036 A1 4/2024 Zuberi et al.
2024/0127214 A1 4/2024 Wander et al.
2024/0193562 A1 6/2024 Pratten et al.
2024/0202756 A1 6/2024 Karl et al.
2024/0203405 A1 6/2024 McDermid et al.
2024/0211732 A1 6/2024 Wander et al.
2024/0212049 A1 6/2024 Ghelichi et al.
2024/0220653 A1 7/2024 D'Agostino
2024/0232614 A1 7/2024 Esmaeili et al.
2024/0232950 A1 7/2024 Navarro et al.
2024/0249310 A1 7/2024 Rai et al.
2024/0256903 A1 8/2024 Ens et al.
2024/0256904 A1 8/2024 Leung et al.
2024/0256968 A1 8/2024 Hosseinzadeh et al.
2024/0265055 A1 8/2024 Purkayastha
2024/0281467 A1 8/2024 Volkovs et al.
2024/0281808 A1 8/2024 Vouitsis et al.
2024/0281818 A1 8/2024 Golestan Irani et al.
2024/0289645 A1 8/2024 Makhijani et al.
2024/0289876 A1 8/2024 Mathew et al.
2024/0303551 A1 9/2024 Li et al.
2024/0304182 A1 9/2024 Hamilton et al.
2024/0330772 A1 10/2024 Cresswell et al.
2024/0330809 A1 10/2024 Carvalho et al.
2024/0338520 A1 10/2024 Misler et al.
2024/0346338 A1 10/2024 Desai et al.
2024/0370880 A1 11/2024 Jeske et al.
2024/0370881 A1 11/2024 Jeske et al.
2024/0385838 A1 11/2024 Yu et al.
2024/0386295 A1 11/2024 Yu et al.
2024/0386325 A1 11/2024 Yu et al.
2024/0386326 A1 11/2024 Yu et al.
2024/0386427 A1 11/2024 Abbas et al.
2024/0394569 A1 11/2024 Farhadi Hassan Kiadeh et al.
2024/0394588 A1 11/2024 Heglan et al.
2024/0403702 A1 12/2024 Deljavan Farshi
2024/0403862 A1 12/2024 Abbas et al.
2024/0412069 A1 12/2024 Volkovs et al.
2024/0412078 A1 12/2024 Ghelichi et al.
2024/0412083 A1 12/2024 Starszyk et al.
2024/0419978 A1 12/2024 Stein et al.
2024/0420010 A1 12/2024 Cirulis et al.
2024/0420011 A1 12/2024 Cirulis et al.
2024/0428283 A1 12/2024 Belbahri et al.
2025/0013363 A1 1/2025 Estoesta et al.
2025/0013697 A1 1/2025 Estoesta et al.
2025/0013927 A1 1/2025 Rho et al.
2025/0014010 A1 1/2025 Jones et al.
2025/0014052 A1 1/2025 Bhattacharjee et al.
2025/0028852 A1 1/2025 Chowanski et al.
2025/0028934 A1 1/2025 Wong et al.
2025/0029012 A1 1/2025 Rho et al.
2025/0045601 A1 2/2025 Zuberi et al.
2025/0053387 A1 2/2025 Wang et al.
2025/0068646 A1 2/2025 Rahman et al.
2025/0068853 A1 2/2025 Lu
2025/0069063 A1 2/2025 Navarro et al.
2025/0077187 A1 3/2025 Guttridge et al.
2025/0077188 A1 3/2025 Guttridge et al.
2025/0077189 A1 3/2025 Guttridge et al.
2025/0077190 A1 3/2025 Guttridge et al.
2025/0077204 A1 3/2025 Guttridge et al.
2025/0077227 A1 3/2025 Guttridge et al.
2025/0077396 A1 3/2025 Sen
2025/0077397 A1 3/2025 Sen
2025/0077399 A1 3/2025 Sen
2025/0077400 A1 3/2025 Sen
2025/0077556 A1 3/2025 Guttridge et al.
2025/0077681 A1 3/2025 Sen
2025/0077682 A1 3/2025 Guttridge et al.
2025/0077939 A1 3/2025 Tabatabaei et al.
2025/0078324 A1 3/2025 Gormley
2025/0078325 A1 3/2025 Gormley
2025/0078344 A1 3/2025 Gormley
2025/0078345 A1 3/2025 Gormley
2025/0078972 A1 3/2025 Gormley
2025/0085936 A1 3/2025 Guttridge et al.
2025/0086096 A1 3/2025 Guttridge et al.
2025/0086440 A1 3/2025 Erb et al.
2025/0086441 A1 3/2025 Guttridge et al.

(56) References Cited

U.S. PATENT DOCUMENTS

| | | | |
|---|---|---|---|
| 2025/0086451 | A1 | 3/2025 | Guttridge et al. |
| 2025/0086551 | A1 | 3/2025 | Zhao |
| 2025/0094437 | A1 | 3/2025 | Upendran |
| 2025/0103609 | A1 | 3/2025 | Upendran |
| 2025/0103961 | A1 | 3/2025 | Cresswell et al. |
| 2025/0103980 | A1 | 3/2025 | Deljavan Farshi et al. |
| 2025/0104024 | A1 | 3/2025 | Abbas |
| 2025/0104029 | A1 | 3/2025 | Deljavan Farshi et al. |
| 2025/0104047 | A1 | 3/2025 | Mashkevich |
| 2025/0104050 | A1 | 3/2025 | Mashkevich |
| 2025/0104059 | A1 | 3/2025 | Mashkevich |
| 2025/0104074 | A1 | 3/2025 | Tsang et al. |
| 2025/0104306 | A1 | 3/2025 | Mashkevich |
| 2025/0104700 | A1 | 3/2025 | Henault-Ethier et al. |
| 2025/0106060 | A1 | 3/2025 | Gormley et al. |
| 2025/0106201 | A1 | 3/2025 | Gormley |
| 2025/0110805 | A1 | 4/2025 | Starszyk et al. |
| 2025/0117411 | A1 | 4/2025 | Mohammed |
| 2025/0117595 | A1 | 4/2025 | Taheri |
| 2025/0117596 | A1 | 4/2025 | Taheri |
| 2025/0117623 | A1 | 4/2025 | Devarajan et al. |
| 2025/0117629 | A1 | 4/2025 | Pandey et al. |
| 2025/0117630 | A1 | 4/2025 | Taheri |
| 2025/0117769 | A1 | 4/2025 | Taheri |
| 2025/0117836 | A1 | 4/2025 | Taheri et al. |
| 2025/0117853 | A1 | 4/2025 | Pandey et al. |
| 2025/0117854 | A1 | 4/2025 | Pandey et al. |
| 2025/0117855 | A1 | 4/2025 | Pandey et al. |
| 2025/0117856 | A1 | 4/2025 | Pandey et al. |
| 2025/0119396 | A1 | 4/2025 | Taheri |
| 2025/0119494 | A1 | 4/2025 | Pandey et al. |
| 2025/0119495 | A1 | 4/2025 | Pandey et al. |
| 2025/0124039 | A1 | 4/2025 | Cashion et al. |
| 2025/0124240 | A1 | 4/2025 | Luo et al. |
| 2025/0131718 | A1 | 4/2025 | Ma et al. |
| 2025/0138838 | A1 | 5/2025 | Ramesh et al. |
| 2025/0139267 | A1 | 5/2025 | Zykh et al. |
| 2025/0139382 | A1 | 5/2025 | Mohammed et al. |
| 2025/0139708 | A1 | 5/2025 | Bouëtté et al. |
| 2025/0147733 | A1 | 5/2025 | Abbas et al. |
| 2025/0148321 | A1 | 5/2025 | Stanevich et al. |
| 2025/0165375 | A1 | 5/2025 | Cresswell et al. |
| 2025/0165866 | A1 | 5/2025 | Cresswell et al. |
| 2025/0173170 | A1 | 5/2025 | Glynn-Udrow et al. |
| 2025/0173568 | A1 | 5/2025 | Cresswell et al. |
| 2025/0173618 | A1 | 5/2025 | Cresswell et al. |
| 2025/0173619 | A1 | 5/2025 | Cresswell et al. |
| 2025/0173725 | A1 | 5/2025 | Devarajan et al. |
| 2025/0181321 | A1 | 6/2025 | Gormley |
| 2025/0182028 | A1 | 6/2025 | Gormley |
| 2025/0182196 | A1 | 6/2025 | Gormley |
| 2025/0182222 | A1 | 6/2025 | Gormley |
| 2025/0191062 | A1 | 6/2025 | Heglin et al. |
| 2025/0217175 | A1 | 7/2025 | Karbasi et al. |
| 2025/0225560 | A1 | 7/2025 | Bajaj et al. |
| 2025/0231668 | A1 | 7/2025 | Tao et al. |
| 2025/0231750 | A1 | 7/2025 | Lim et al. |
| 2025/0231774 | A1 | 7/2025 | Tao et al. |
| 2025/0231775 | A1 | 7/2025 | Tao et al. |
| 2025/0231793 | A1 | 7/2025 | Lim et al. |
| 2025/0232130 | A1 | 7/2025 | Tao et al. |
| 2025/0232351 | A1 | 7/2025 | Tao et al. |
| 2025/0232375 | A1 | 7/2025 | Tao et al. |
| 2025/0232376 | A1 | 7/2025 | Tao et al. |
| 2025/0232377 | A1 | 7/2025 | Tao et al. |
| 2025/0232503 | A1 | 7/2025 | Lim et al. |
| 2025/0238536 | A1 | 7/2025 | Nikoghossian et al. |
| 2025/0245071 | A1 | 7/2025 | Ionescu et al. |
| 2025/0245511 | A1 | 7/2025 | D'Agostino et al. |

* cited by examiner

100

200

300B

300C

500A

500B

800B

800C

900B

900D

1010

1020

1040

1100

MEMORIALIZING A GRAPHICAL USER INTERFACE WITH GENERATIVE ARTIFICIAL INTELLIGENCE

BACKGROUND

Wealth advisors work with clients to develop investment strategies, retirement plans, wealth-building plans, and the like. In many cases, an advisor will speak with clients during meetings, phone calls, teleconferences, and the like, which are conducted using meeting software. The meeting software may display a dashboard with information about assets to help the client understand and make informed wealth management decisions. Over time, the advisor and the client may establish their preferences for the dashboard. For example, users may have preferences for the type of content they prefer to see on the dashboard and locations for the type of content within the dashboard.

SUMMARY

One example embodiment provides an apparatus that may include a memory, and a processor coupled to the memory, the processor configured to connect a local user profile hosted within a software application hosted by a first platform with a profile hosted by a data source on a second platform, extract a first set of profile features from the profile hosted by the data source and a second set of profile features from the local user profile, determine a new profile feature to add to the local user profile based on an execution of an artificial intelligence (AI) model on a combination of the first and second sets of profile features, and display information about the new profile feature on a user interface of the first or second platform.

Another example embodiment provides a method that includes one or more of connecting a local user profile hosted within a software application hosted by a first platform with a profile hosted by a data source on a second platform, extracting a first set of profile features from the profile hosted by the data source and a second set of profile features from the local user profile, determining a new profile feature to add to the local user profile based on the execution of an artificial intelligence (AI) model on a combination of the first and second sets of profile features, and displaying information about the new profile feature on a user interface of the first or second platform.

A further example embodiment provides a computer-readable medium comprising instructions, that when read by a processor, cause the processor to perform one or more of connecting a local user profile hosted within a software application hosted by a first platform with a profile hosted by a data source on a second platform, extracting a first set of profile features from the profile hosted by the data source and a second set of profile features from the local user profile, determining a new profile feature to add to the local user profile based on the execution of an artificial intelligence (AI) model on a combination of the first and second sets of profile features, and displaying information about the new profile feature on a user interface of the first or second platform.

A further example embodiment provides an apparatus that may include a memory, and a processor coupled to the memory, the processor configured to one or more of ingest profile data of a user from an external data source, identify a plurality of features of a profile hosted by the external data source based on execution of an artificial intelligence (AI) model on the ingested profile data of the user from the external data source, identify a feature from among the plurality of features of the profile hosted by the external data source that is not connected to a local user profile of the user, and display a connection request on a user interface, wherein the connection request includes a link to a page associated with the identified feature hosted by the external data source.

A further example embodiment provides a method that includes one or more of ingesting profile data of a user from an external data source, identifying a plurality of features of a profile hosted by the external data source based on execution of an artificial intelligence (AI) model on the ingested profile data of the user from the external data source, identifying a feature from among the plurality of features of the profile hosted by the external data source that is not connected to a local user profile of the user, and displaying a connection request on a user interface, wherein the connection request includes a link to a page associated with the identified feature hosted by the external data source.

A further example embodiment provides a computer-readable medium comprising instructions, that when read by a processor, cause the processor to perform one or more of ingesting profile data of a user from an external data source, identifying a plurality of features of a profile hosted by the external data source based on execution of an artificial intelligence (AI) model on the ingested profile data of the user from the external data source, identifying a feature from among the plurality of features of the profile hosted by the external data source that is not connected to a local user profile of the user, and displaying a connection request on a user interface, wherein the connection request includes a link to a page associated with the identified feature hosted by the external data source.

A further example embodiment provides an apparatus that may include a memory, and a processor coupled to the memory, the processor configured to establish a communication session between a first user device and a second user device from among the plurality of user devices, train an artificial intelligence (AI) model to learn user interface preferences of a plurality of user devices during the communication session, receive a description associated with the communication session, generate a plurality of windows of content and display the plurality of windows of content on a user interface of the first user device during the communication session based on execution of the AI model on the description associated with the communication session, and generate a second plurality of windows of content and display the second plurality of windows of content on a user interface of the second user device based on an execution of the AI model on the description associated with the communication session.

A further example embodiment provides a method that includes one or more of establishing a communication session between a first user device and a second user device from among the plurality of user devices, training an artificial intelligence (AI) model to learn user interface preferences of a plurality of user devices during the communication session, receiving a description associated with the communication session, generating a plurality of windows of content and displaying the plurality of windows of content on a user interface of the first user device during the communication session based on execution of the AI model on the description associated with the communication session, and generating a second plurality of windows of content and displaying the second plurality of windows of content on a user interface of the second user device based on an execution of the AI model on the description associated with the communication session.

A further example embodiment provides a computer-readable medium comprising instructions, that when read by a processor, cause the processor to perform one or more of establishing a communication session between a first user device and a second user device from among the plurality of user devices, training an artificial intelligence (AI) model to learn user interface preferences of a plurality of user devices during the communication session, receiving a description associated with the communication session, generating a plurality of windows of content and displaying the plurality of windows of content on a user interface of the first user device during the communication session based on execution of the AI model on the description associated with the communication session, and generating a second plurality of windows of content and displaying the second plurality of windows of content on a user interface of the second user device based on an execution of the AI model on the description associated with the communication session.

A further example embodiment provides an apparatus that may include a memory, and a processor coupled to the memory, the processor configured to render a graphical user interface within a software application including a plurality of elements, modify locations of the plurality of elements within the graphical user interface based on user inputs on the graphical user interface, generate a dynamic mapping of the graphical user interface including the modified locations of the plurality of elements based on an execution of an artificial intelligence (AI) model on the rendered graphical user interface, and store the dynamic mapping of the graphical user interface within a storage.

A further example embodiment provides a method that includes one or more of rendering a graphical user interface within a software application including a plurality of elements, modifying locations of the plurality of elements within the graphical user interface based on user inputs on the graphical user interface, generating a dynamic mapping of the graphical user interface including the modified locations of the plurality of elements based on an execution of an artificial intelligence (AI) model on the rendered graphical user interface, and storing the dynamic mapping of the graphical user interface within a storage.

A further example embodiment provides a computer-readable medium comprising instructions, that when read by a processor, cause the processor to perform one or more of rendering a graphical user interface within a software application including a plurality of elements, modifying locations of the plurality of elements within the graphical user interface based on user inputs on the graphical user interface, generating a dynamic mapping of the graphical user interface including the modified locations of the plurality of elements based on an execution of an artificial intelligence (AI) model on the rendered graphical user interface, and storing the dynamic mapping of the graphical user interface within a storage.

A further example embodiment provides an apparatus that may include a memory, and a processor coupled to the memory, the processor configured to store portfolio content from a plurality of users, receive a portfolio of a user during a call, determine that the user is similar to a subset of users from among the plurality of users based on execution of an artificial intelligence (AI) model on the portfolio of the user and the portfolio content from the plurality of users, identify an item that is included in portfolios of the subset of users which is not included in the portfolio of the user, and display content about the item on a user interface.

A further example embodiment provides a method that includes one or more of storing portfolio content from a plurality of users, receiving a portfolio of a user during a call, determining that the user is similar to a subset of users from among the plurality of users based on execution of an artificial intelligence (AI) model on the portfolio of the user and the portfolio content from the plurality of users, identifying an item that is included in portfolios of the subset of users which is not included in the portfolio of the user, and displaying content about the item on a user interface.

A further example embodiment provides a computer-readable medium comprising instructions, that when read by a processor, cause the processor to perform one or more of storing portfolio content from a plurality of users, receiving a portfolio of a user during a call, determining that the user is similar to a subset of users from among the plurality of users based on execution of an artificial intelligence (AI) model on the portfolio of the user and the portfolio content from the plurality of users, identifying an item that is included in portfolios of the subset of users which is not included in the portfolio of the user, and displaying content about the item on a user interface.

A further example embodiment provides an apparatus that may include a memory, and a processor coupled to the memory, the processor configured to one or more of log user actions with respect to placement of objects of content on a user interface including respective content types of the objects of content, train an artificial intelligence (AI) model to learn location preferences for a content type on the user interface based on the logged user actions including the respective content types, receive a request to open an object on the user interface with the content type, determine a display location on the user interface for the object based on execution of the AI model on the content type, and display the object at the determined display location on the user interface.

A further example embodiment provides a method that includes one or more of logging user actions with respect to placement of objects of content on a user interface including respective content types of the objects of content, training an artificial intelligence (AI) model to learn location preferences for a content type on the user interface based on the logged user actions including the respective content types, receiving a request to open an object on the user interface with the content type, determining a display location on the user interface for the object based on execution of the AI model on the content type, and displaying the object at the determined display location on the user interface.

A further example embodiment provides a computer-readable medium comprising instructions, that when read by a processor, cause the processor to perform one or more of logging user actions with respect to placement of objects of content on a user interface including respective content types of the objects of content, training an artificial intelligence (AI) model to learn location preferences for a content type on the user interface based on the logged user actions including the respective content types, receiving a request to open an object on the user interface with the content type, determining a display location on the user interface for the object based on execution of the AI model on the content type, and displaying the object at the determined display location on the user interface.

DETAILED DESCRIPTION

Figure 1:
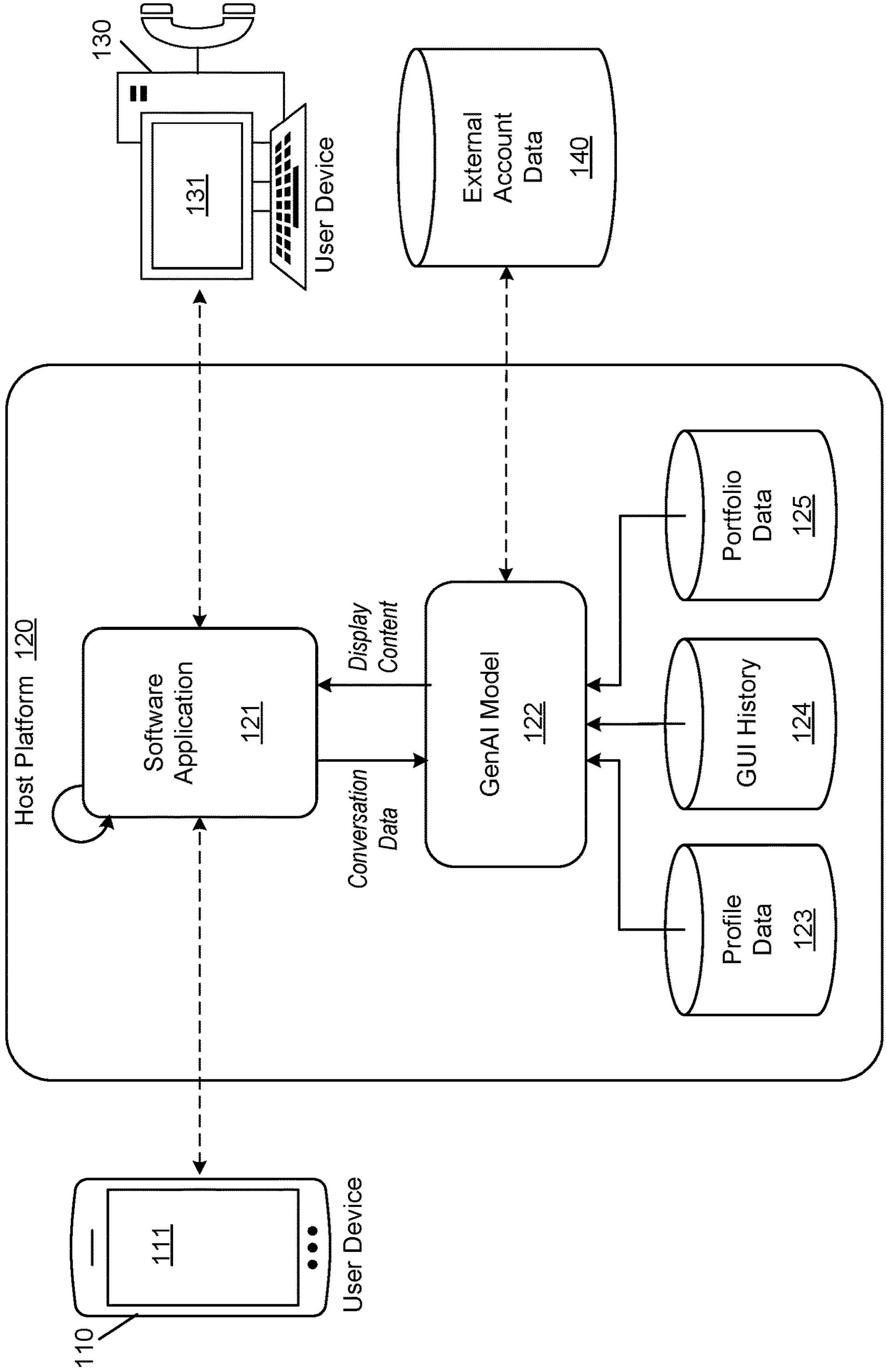
FIG. 1 is a diagram illustrating a generative artificial intelligence (GenAI) computing environment for generating graphical user interface (GUI) content according to example embodiments.

It is to be understood that although this disclosure includes a detailed description of cloud computing, implementation of the instant solution recited herein is not limited to a cloud computing environment. Rather, embodiments of the instant solution are capable of being implemented in conjunction with any other type of computing environment now known or later developed.

The example embodiments are directed to a platform that can ingest content from a graphical user interface (GUI) and learn preferences for locations of content types within the GUI based on generative artificial intelligence (GenAI). In some embodiments, a GenAI model may be trained to understand a correlation between content types and GUI locations (e.g., X-, Y-, Z-coordinates, etc.). For example, the training may include logged GUI activity of the user. Furthermore, the GenAI model may also render content within a GUI based on the GUI preferences learned by the GenAI model.

According to various embodiments, the GenAI model may be a large language model (LLM), such as a multimodal large language model. As another example, the GenAI model may be a transformer neural network ("transformer"), or the like. The GenAI model is capable of understanding connections between coordinate points on a GUI and content types (e.g., income, retirement, savings, banking, etc.). For example, the GenAI model may include libraries and deep learning frameworks that enable the GenAI model to create realistic display content on the GUI including dynamically generated image and text content.

Technological advancements typically build upon the fundamentals of predecessor technologies, such is the case with Artificial Intelligence (AI). An AI classification system describes the stages of AI progression. The first classification is known as "Reactive Machines," followed by present-day AI classification "Limited Memory Machines" (also known as "Artificial Narrow Intelligence"), then progressing to "Theory of Mind" (also known as "Artificial General Intelligence"), and reaching the AI classification "Self Aware" (also known as "Artificial Superintelligence").

Present-day Limited Memory Machines are a growing group of AI models built upon the foundation of its predecessor, Reactive Machines. Reactive Machines emulate human responses to stimuli; however, they are limited in their capabilities as they cannot typically learn from prior experience. Once the AI model's learning abilities emerged, its classification was promoted to Limited Memory Machines. In this present-day classification, AI models learn from large volumes of data, detect patterns, solve problems, generate and predict data, and the like, while inheriting all of the capabilities of Reactive Machines.

Examples of AI models classified as Limited Memory Machines include, but are not limited to, Chatbots, Virtual Assistants, Machine Learning (ML), Deep Learning (DL), Natural Language Processing (NLP), Generative AI (GenAI) models, and any future AI models that are yet to be developed possessing the characteristics of Limited Memory Machines.

Generative AI models are a combination of Limited Memory Machine technologies, incorporating ML and DL, and, in turn, form the foundational building blocks of future AI models. For example, Theory of Mind is the next progression of AI that will be able to perceive, connect, and react by generating appropriate reactions in response to the entity with which the AI model is interacting; all these capabilities rely on the fundamentals of Generative AI. Furthermore, in an evolution into the Self Aware classification, AI models will be able to understand and evoke emotions in the entities they interact with, as well as possessing their own emotions, beliefs, and needs, all of which rely on Generative AI fundamentals of learning from experiences to generate and draw conclusions about itself and its surroundings. Generative AI models are integral and core to future artificial intelligence models. As described herein, Generative AI refers to present-day Generative AI models and future AI models.

The GenAI model may also analyze a type of content that is to be displayed, for example, a page of content that is about to be loaded into a web browser, software application, etc. Here, the GenAI model may determine a location for the page of content within the browser or other user interface based on the content type. The GenAI model can apply what it has learned through its training to choose a display location/placement of the page/window of the content type on the screen. Furthermore, the GenAI model may be retrained as the user changes preferences for content types and display locations. Data from the user's activity on the GUI can be logged and ingested by the GenAI model to learn updated display location preferences of the user over time.

In addition, the example embodiments may also leverage open banking protocols and connect profiles across host platforms. For example, a feature (such as an account, etc.) of a user hosted by an external computing platform may be connected to an account/profile of the user hosted locally by a host computing platform. Here, the GenAI model may analyze account/profile data from the external computing platform to identify a feature (such as a payment account, loan, credit card, savings account, etc.) which can be connected to a user profile hosted locally by the host computing platform.

FIG. 1 illustrates a GenAI computing environment 100 for generating GUI content according to example embodiments. Referring to FIG. 1, a host platform 120, such as a cloud platform, web server, etc., may host a communication session between a user device 110 and a user device 130, such as a chat session, an audio call, a video call, and the like. Here, each of the user devices may be a mobile device, a computer, a laptop, a desktop computer, or the like. The user devices may include a display that can output visual content such as meeting content. For example, the user device 110 includes a user interface 111 for displaying meeting content. Meanwhile, the user device 130 may include a user interface 131 for displaying GUI content.

Here, the host platform 120 may host a software application 121 and make it accessible to the user device 110 and the user device 130 at the same time over a computer network such as the Internet. For example, the software application 121 may include a mobile application that includes a front-end which is installed on the user device 110 (and the user device 130), and a back-end which is installed on the host platform 120. As another example, the software application 121 may be a progressive web application (PWA) that is hosted by the host platform 120 and made accessible via a browser on the user device 110 and/or the user device 130 via an address on the web. In one example, the software application 121 is a teleconferencing software application, however, embodiments are not limited thereto.

In the example embodiments, the host platform 120 may include a GenAI model 122 which is capable of learning a user's preferences for display locations of content types and for applying the user's preferences when new content is opened on the screen. The host platform 120 may also include one or more additional models, including one or more machine learning models, one or more artificial intelligence (AI) models, one or more additional GenAI models, and the like. The models, including the GenAI model 122 may be held by the host platform 120 within a model repository (not shown).

In the example embodiments, the GenAI model 122 may be trained based on GUI history data of one or more users, profile data of one or more users, portfolio data of one or more users, asset data from open sources, such as publicly available sources on the web, and the like. The GenAI model 122 may be trained to generate GUI content that can be depicted on a user interface of the meeting software, such as windows of content, cards, modules, menus, buttons, checkboxes, radio buttons, and the like. The GUI content may be generated based on user preferences that the GenAI model 122 has learned from user activities on the GUI. Thus, the GenAI model 122 can learn where a user prefers particular content types. The GenAI model can also dynamically size the content based on preferences of the user and a type of display device where the content is being output.

The training data for training the GenAI model 122 may be obtained from a data store 124 that includes historical GUI data of the user, such as logged user activities on the GUI including movement of GUI objects and content types. The historical GUI data may include coordinate points (e.g., X, Y, and Z) which represent dimensional locations of the objects with respect to an outer perimeter of the GUI.

In the example of FIG. 1, the user devices 110 and 130 may exchange speech, text, images, communications, and the like, submitted through the software application 121. For example, audio may be spoken, text or chat may be entered into a text box, documents may be viewed, and the like. The content may be recorded by the software application 121 and provided to the GenAI model 122. In response, the GenAI model 122 may dynamically identify content to be displayed during the meeting based on the content being discussed, displayed, emphasized, etc., during the meeting.

As an example, a dashboard may be output by the software application 121 on the user interface 111 of the user device 110 and the user interface 131 of the user device 130. Here, the dashboard may include content that is visible to both of the user devices 110 and 130 and/or content that is only visible to one of the user devices. The software application 121 may control which device sees which content and create different experiences on the user interface for each of the user devices 110 and 130 during the meeting. Furthermore, the GenAI model 122 may ingest the content recorded from the meeting and generate additional content that can be displayed during the meeting, as well as additional content that can be used after the meeting, such as a call script, a call list, and the like. The GenAI model 122 may use profile data from a data store 123 and portfolio data from a data store 125 to generate recommendations of features, assets, products, and the like, for a client.

Furthermore, according to various embodiments, the host platform 120 may also connect a user profile stored within the software application 121 with a feature hosted by an external data source 140, such as an external server, website, etc. The external data source 140 may provide history of the user to the host platform 120. The history can be analyzed by the GenAI model 122 to identify product recommendations based on a combination of history from the user's external profile and the user's locally held profile.

Figure 2:
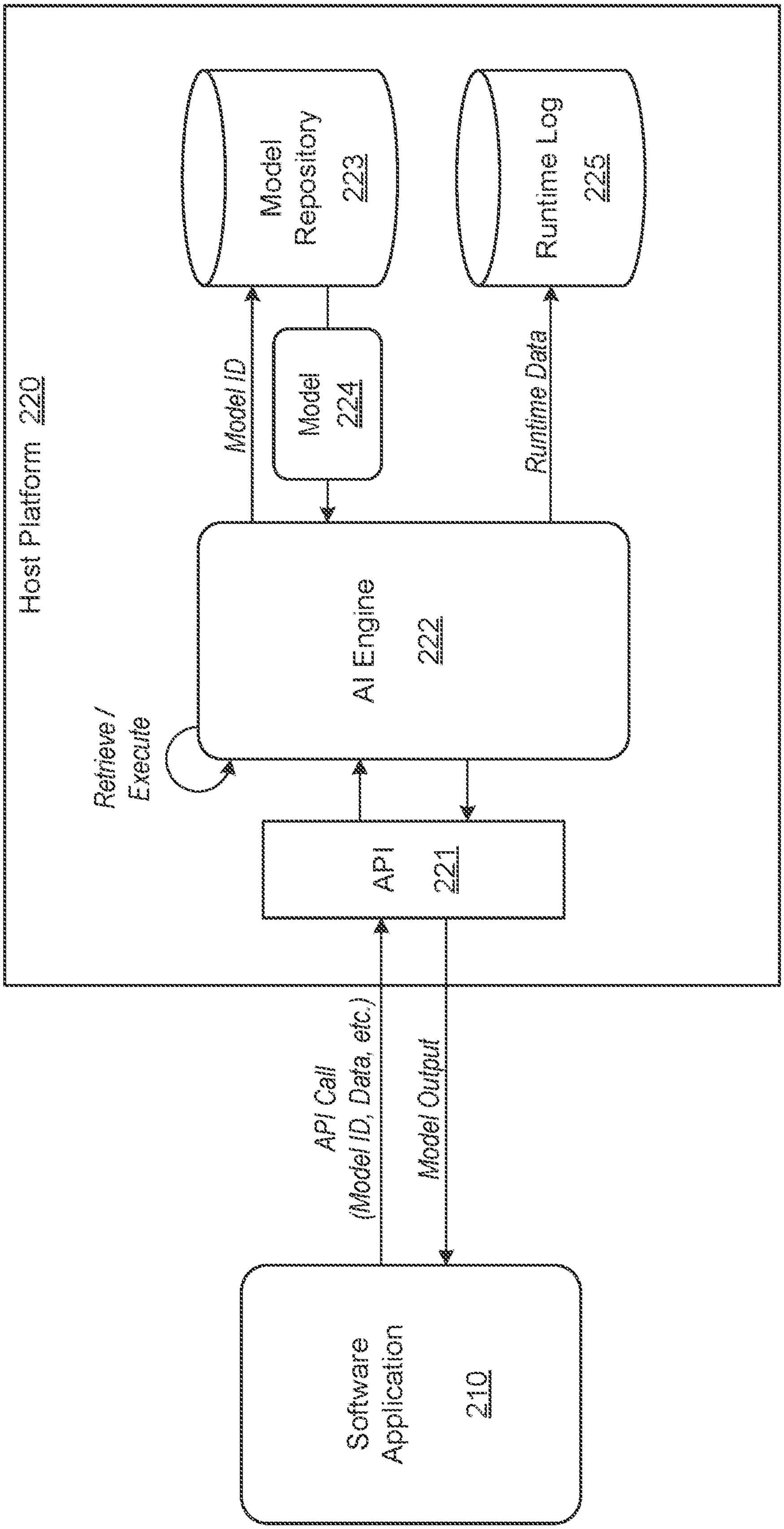
FIG. 2 is a diagram illustrating a process of executing an artificial intelligence model on input content according to example embodiments.

FIG. 2 illustrates a process 200 of executing a model 224 on input content according to example embodiments. As an example, the model 224 may be the GenAI model 122 described with respect to FIG. 1, however, embodiments are not limited thereto. Referring to FIG. 2, a software application 210 may request execution of the model 224 by submitting a request to the host platform 220. In response, an AI engine 222 may receive the request and trigger the model 224 to execute within a runtime environment of the host platform 220.

In FIG. 2, the AI engine 222 may control access to models that are stored within the model repository 223. For example, the models may include AI models, GenAI models, machine learning models, neural networks, and/or the like. The software application 210 may trigger execution of the model 224 from the model repository 223 via submission of a call to an application programming interface (API) 221 of the AI engine 222. The request may include an identifier of the model 224, such as a unique ID assigned by the host platform 220, a payload of data (e.g., to be input to the model during execution), and the like. The AI engine 222 may retrieve the model 224 from the model repository 223 in response and deploy the model 224 within a live runtime environment. After the model is deployed, the AI engine 222 may execute the running instance of the model 224 on the payload of data and return a result of the execution to the software application 210.

In some embodiments, the payload of data may be in a format that cannot be input to the model 224 nor read by a computer processor. For example, the payload of data may be in text format, image format, audio format, and the like. In response, the AI engine 222 may convert the payload of data into a format that is readable by the model 224, such as a vector or other encoding. The vector may then be input into the model 224.

In some embodiments, the software application 210 may display a user interface which enables a user thereof to provide feedback on the output provided by the model 224. For example, a user may input a confirmation that the GUI placement of an object by a GenAI model is correct or is liked. This information may be added to the results of execution and stored within a log 225. The log 225 may include an identifier of the input, an identifier of the output, an identifier of the model used, and feedback from the recipient. This information may be used to subsequently retrain the model.

Figure 3A:
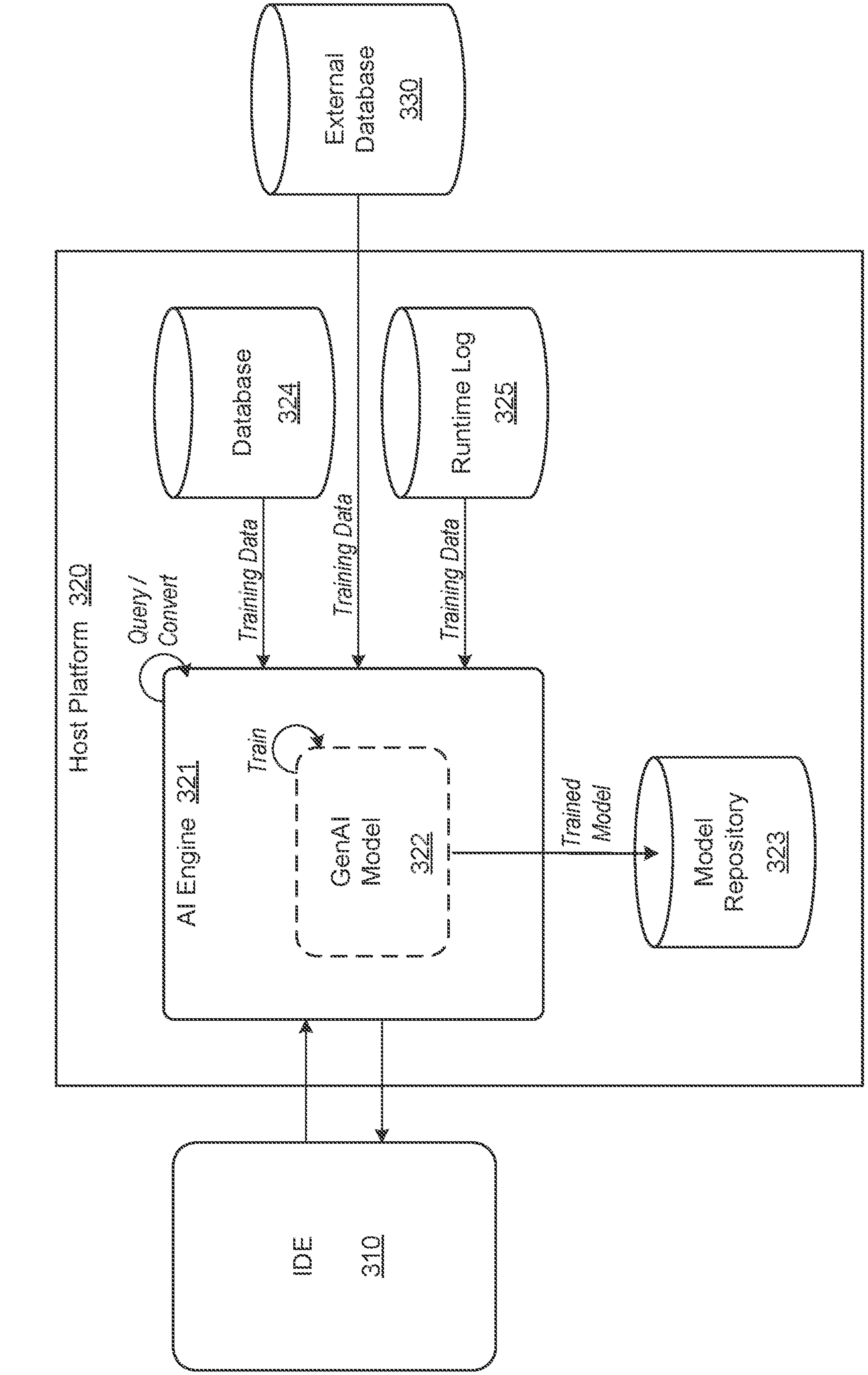
FIGS. 3A-3C are diagrams illustrating processes for training an artificial intelligence model according to example embodiments.

FIG. 3A illustrates a process 300A of training a GenAI model 322 according to example embodiments. However, it should be appreciated that the process 300A shown in FIG. 3A is also applicable to other types of models, such as machine learning models, AI models, and the like. Referring to FIG. 3A, a host platform 320 may host an integrated development environment (IDE) 310 where GenAI models, machine learning models, AI models, and the like, may be developed, trained, retrained, and the like. In this example, the IDE 310 may include a software application with a user interface accessible by a user device over a network or through a local connection. For example, the IDE 310 may be embodied as a web application that can be accessed at a network address, Uniform Resource Locator (URL), etc., by a device. As another example, the IDE 310 may be locally or remotely installed on a computing device used by a user.

The IDE 310 may be used to design a model (via a user interface of the IDE), such as a GenAI model that can receive text as input and generate custom imagery, text, etc., which can be displayed on a user interface/dashboard of a software application that displays content during meetings between user devices. The model can be executed/trained based on the training data established via the user interface. For example, the user interface may be used to build a new model. The training data for such a new model may be provided from a training data store, such as a database 324, which includes training samples from the web, from customers, and the like. As another example, the training data may be pulled from one or more external data stores 330, such as publicly available sites, etc.

During training, the GenAI model 322 may be executed on training data via an AI engine 321 of the host platform 320. The training data may include a large corpus of generic images and text that is related to those images. In the example embodiments, the training data may include coordinate locations on a GUI and content types mapped to each other. The GenAI model 322 may learn mappings/connections between locations on the GUI and content types and thus dynamically place content within the GUI based on content type. When the model is fully trained, it may be stored within the model repository 323 via the IDE 310 or the like.

As another example, the IDE 310 may be used to retrain the GenAI model 322 after the model has already been deployed. Here, the training process may use executional results that have already been generated/output by the GenAI model 322 in a live environment (including any customer feedback, etc.) to retrain the GenAI model 322. For example, predicted outputs/GUI placements that are custom generated by the GenAI model 322 and the user feedback of the placements may be used to retrain the model to further enhance the images that are generated for all users. The responses may include indications of whether the generated content is correct, and if not, what aspects of the placement are incorrect. This data may be captured and stored within a runtime log 325 or other data store within the live environment and can be subsequently used to retrain the GenAI model 322.

Figure 3B:
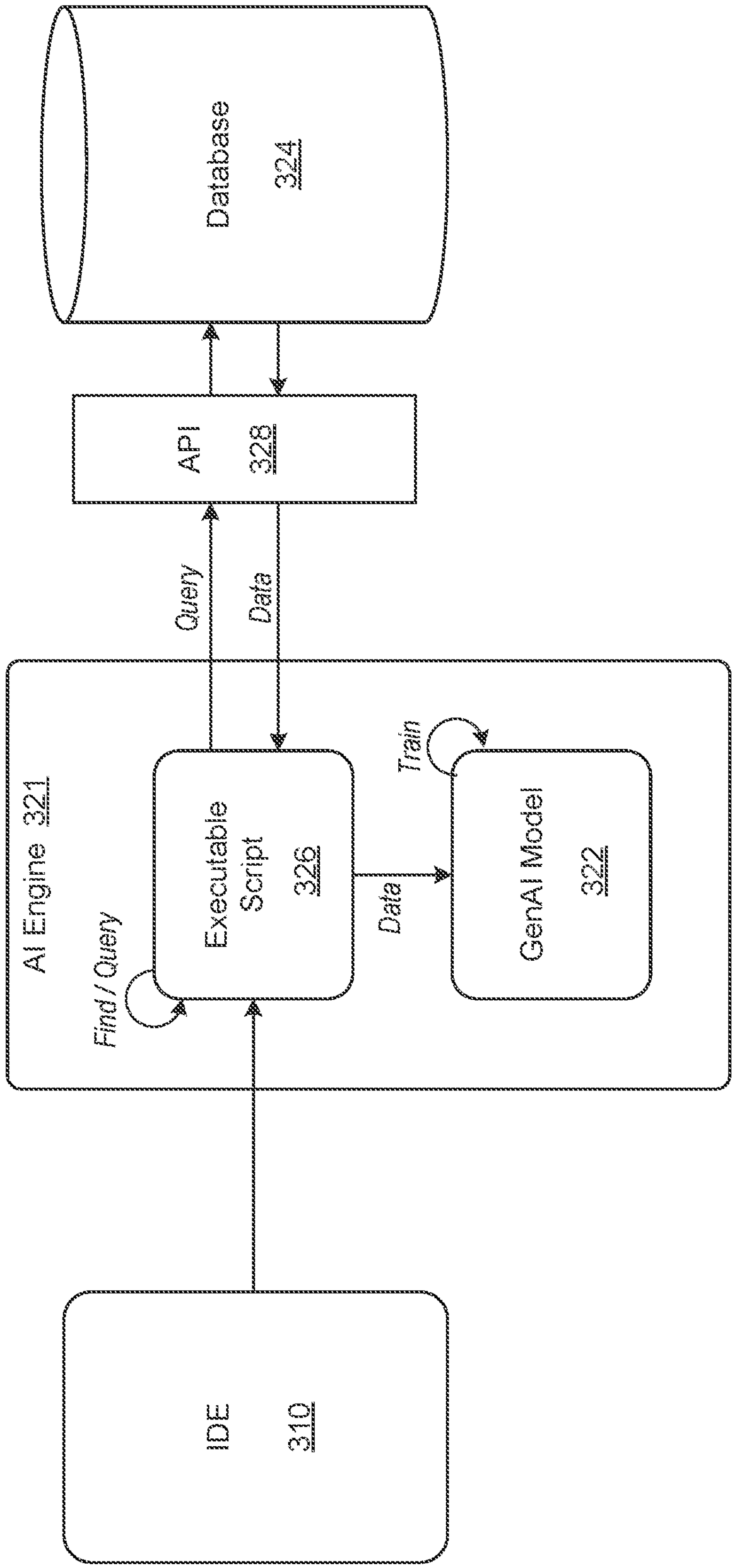

FIG. 3B illustrates a process 300B of executing a process for training/retraining the GenAI model 322 via an AI engine 321. In this example, a script 326 (executable) is developed and configured to read data from a database 324 and input the data to the GenAI model 322 while the GenAI model is running/executing via the AI engine 321. For example, the script 326 may use identifiers of data locations (e.g., table IDs, row IDs, column IDs, topic IDs, object IDs, etc.) to identify locations of the training data within the database 324 and query an API 328 of the database 324. In response, the database 324 may receive the query, load the requested data, and return it to the AI engine 321 where it is input to the GenAI model 322. The process may be managed via a user interface of the IDE 310 which enables a human-in-the loop during the training process (supervised learning). However, it should also be appreciated that the system is capable of unsupervised learning as well.

The script 326 may iteratively retrieve additional training data sets from the database 324 and iteratively input the additional training data sets into the GenAI model 322 during the execution of the model to continue to train the model. The script may continue the process until instructions within the script inform the script to terminate, which may be based on a number of iterations (training loops), total time elapsed during the training process, etc.

Figure 3C:
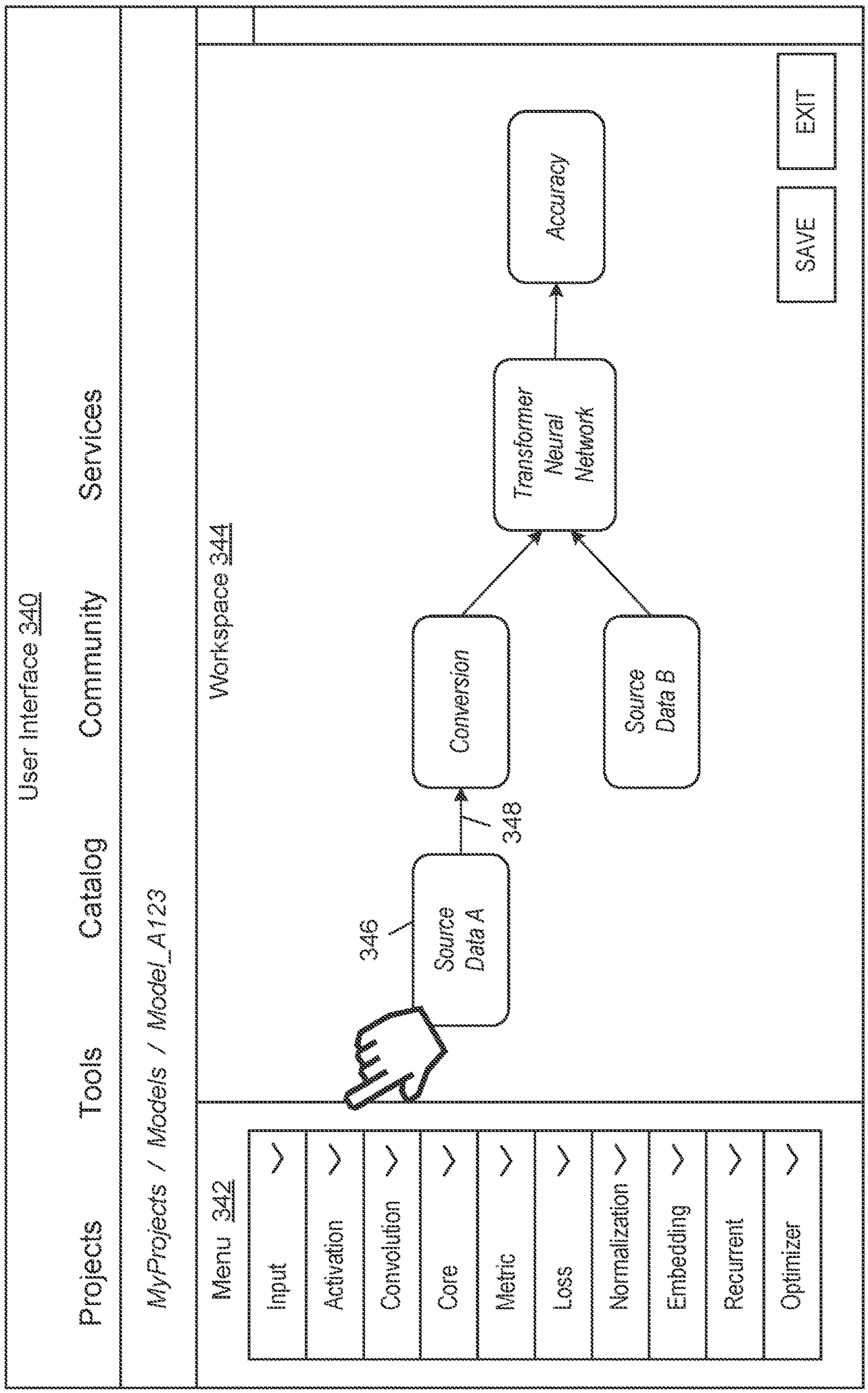

FIG. 3C illustrates a process 300C of designing a new AI model via a user interface 340 according to example embodiments. As an example, the user interface 340 may be output as part of the software application which interacts with the IDE 310 shown in FIG. 3A, however, embodiments are not limited thereto. Referring to FIG. 3C, a user can use an input mechanism to make selections from a menu 342 shown on the left-hand side of the user interface 340 to add pieces to the model, such as data components, model components, analysis components, etc. within a workspace 344 of the user interface 340.

In the example of FIG. 3C, the menu 342 includes a plurality of GUI menu options which can be selected to reveal additional components that can be added into the model design shown in the workspace 344. Here, the GUI menu options include options for adding features, such as neural networks, machine learning models, AI models, data sources, conversion processes (e.g., vectorization, encoding, etc.), analytics, etc. The user can continue to add features to the model and connect them using edges or other means to create a flow within the workspace 344. For example, the user may add a node 346 to a diagram of a new model within the workspace 344. For example, the user may connect the node 346 to another node in the diagram via an edge 348, creating a dependency within the diagram. When the user is done, the user can save the model for subsequent training/testing.

Prompt engineering is the process of structuring sentences (prompts) so that they are understood by the GenAI model. A prompt may include a description of a goal, such as a goal of purchasing a particular type of asset. The prompt may also provide an amount to purchase, a price range at which to purchase, and the like. All of this information may be input into the GenAI model and used to create custom content about the asset to enable the user to visualize the asset and understand how to add the asset to their portfolio, such as the steps to take to obtain the asset. Part of the prompting process may include delays/waiting times that are intentionally included within the script, such that the model has time to think/understand the input data.

Figure 4:
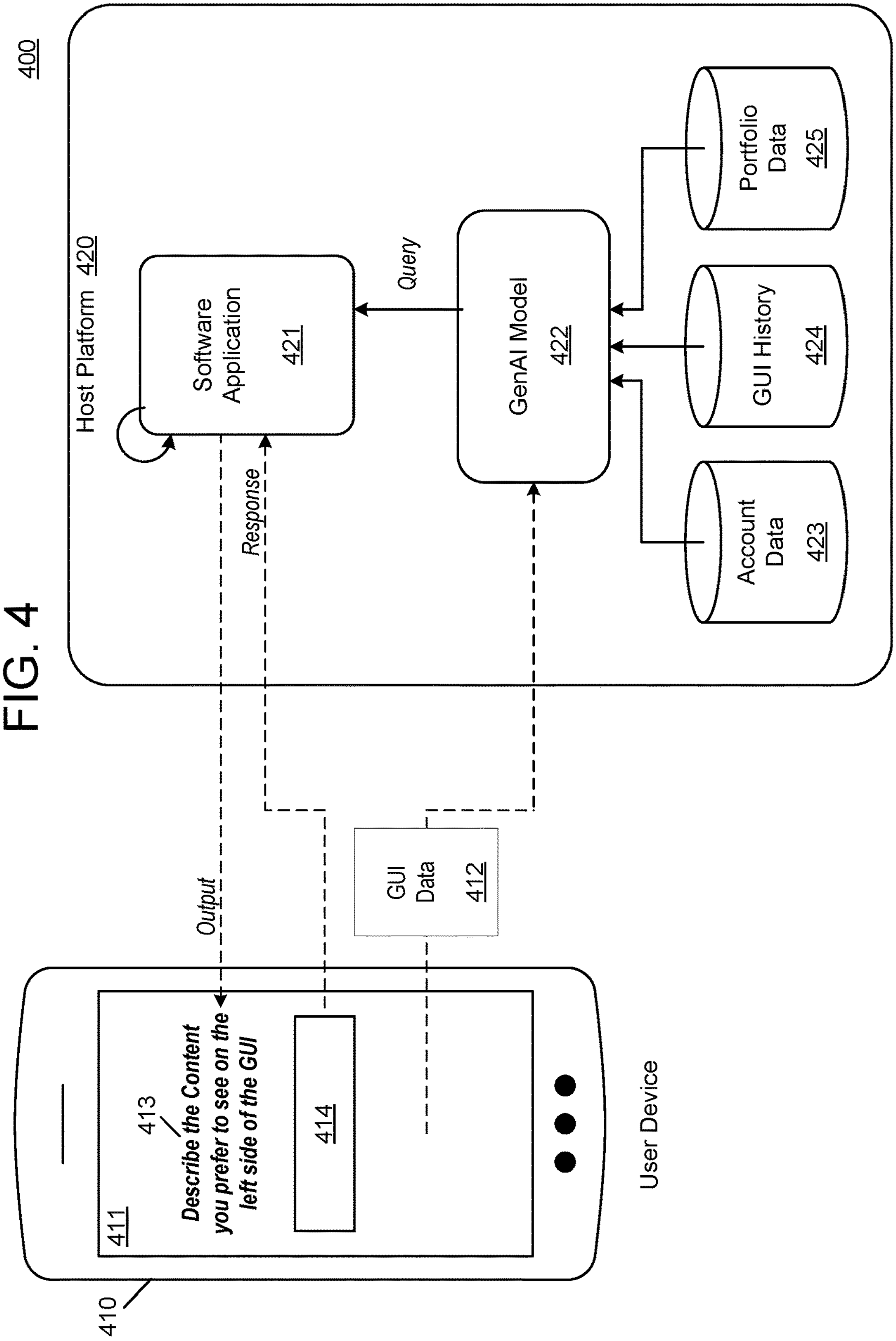
FIG. 4 is a diagram illustrating a process of prompting a GenAI model to generate location preferences for a GUI according to example embodiments.

FIG. 4 illustrates a process 400 of a GenAI model 422 generating a query based on user interface content 412 from a user interface 411 of a user device 410. In this example, the user device 410 is communicating with a host platform 420 via a software application 421 that is hosted by the host platform 420. In this example, the GenAI model 422 can receive text content from the user interface 411 including content input by a user of the user device 410 and transfer the content to the GenAI model 422. In response, the GenAI model 422 may generate a query to obtain more information from the user about the GUI. The query may be generated by the GenAI model 422 and transferred to the software application 421. In response, the software application 421 may output the query on the user interface 411. In this example, the query is shown as a question 413 on the user interface 411 of the user device 410.

The GenAI model 422 may receive an input from the user device 410. For example, the user may enter a response into a field 414 of the user interface 411 with an answer to the question 413 which is submitted to the software application 421. Here, the software application 421 may combine the question 413 and the response from the field 414 and generate a prompt that is input to the GenAI model 422 and used to predict a GUI location of a display object, such as a window of content. Referring to FIG. 4, the GenAI model 422 may be part of the software application 421 and may also be hosted on the host platform 420 or another external system. Here, the software application 421 may establish a connection with the user device 410, such as a secure network connection. The secure connection may include a personal identification number (PIN), biometric scan, password, username, Transport Layer Security (TLS) handshake, etc.

In the example of FIG. 4, the software application 421 may control the interaction of the GenAI model 422 on the host platform and the user device 410. In this example, the software application 421 may output queries on a user interface 411 of the user device 410 with requests for information from the user. The user may enter values into the fields (e.g., the field 414, etc.) on the user interface 411 corresponding to the queries, and submit/transfer the data to the software application 421, for example, by pressing a submit button, etc. In this example, the software application 421 may combine the query with the response from the user interface and generate a prompt that is submitted to the GenAI model 422. For example, each prompt may include a combination of a query on the user interface and the response from the user. For example, if the query is "Please describe the content you prefer on the left side of the GUI" and the response is "Income data", then the text from both the query and the response to the query may be submitted to the GenAI model 422. The GenAI model 422 may generate the queries and other outputs based on user profile data from a data store 423, GUI history data of the user from a data store 424, and portfolio data of the user from a data store 425.

In some embodiments, the software application 421 may deliberately add waiting times between submitting prompts to the GenAI model 422 to ensure that the model has enough time to "think" about the answer. The waiting times may be integrated into the code of the software application 421, or they may be modified/configured via a user interface. Furthermore, the ordering of the prompts and the follow-up questions may differ depending on the answers received during the previous prompt or prompts. Each prompt may include multiple components including one or more of context, an instruction, input data, and an expected response/output.

Figure 5A:
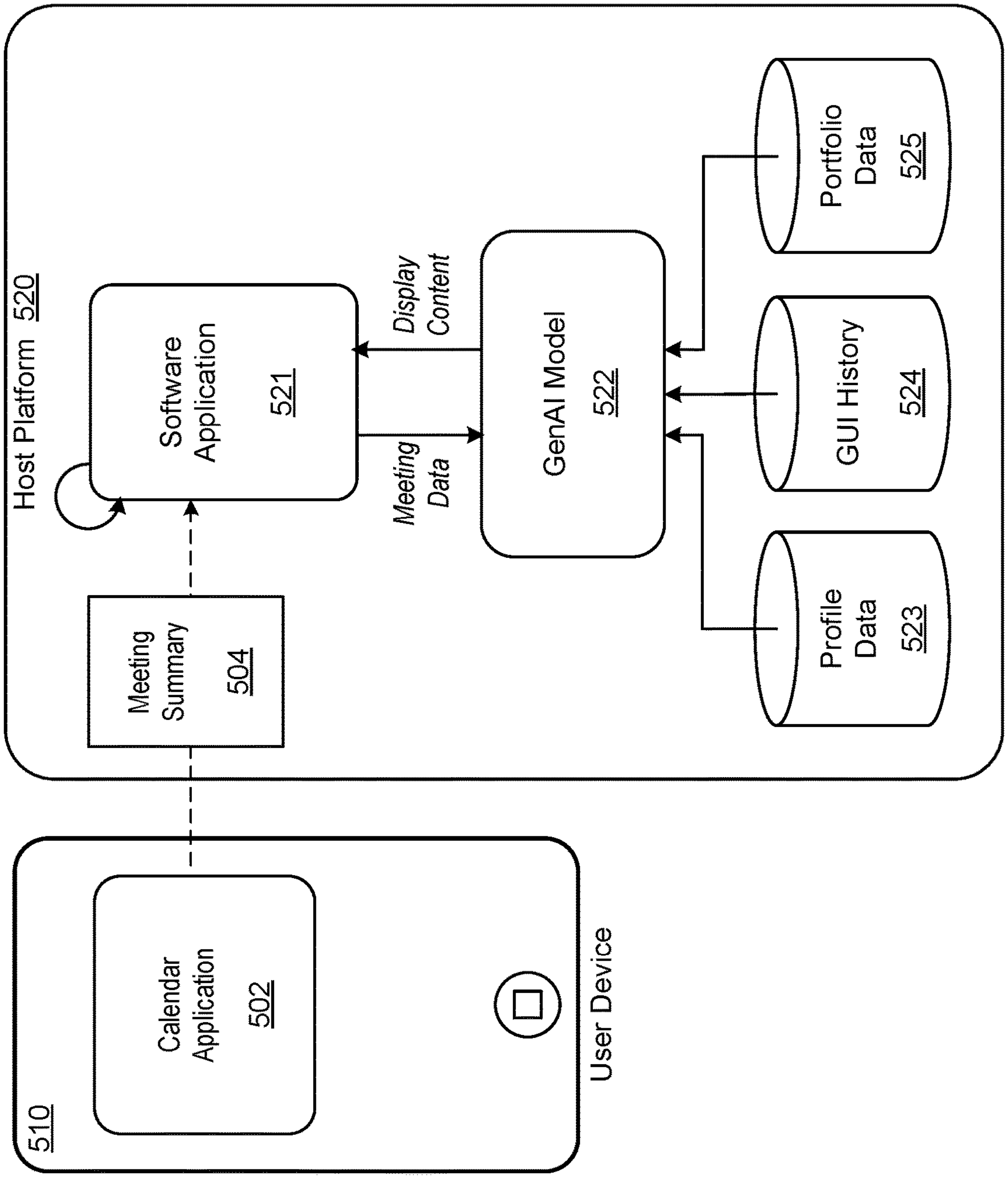
FIGS. 5A-5C are diagrams illustrating a process of dynamically presenting GUI content with a GenAI model according to example embodiments.
Figure 5B:
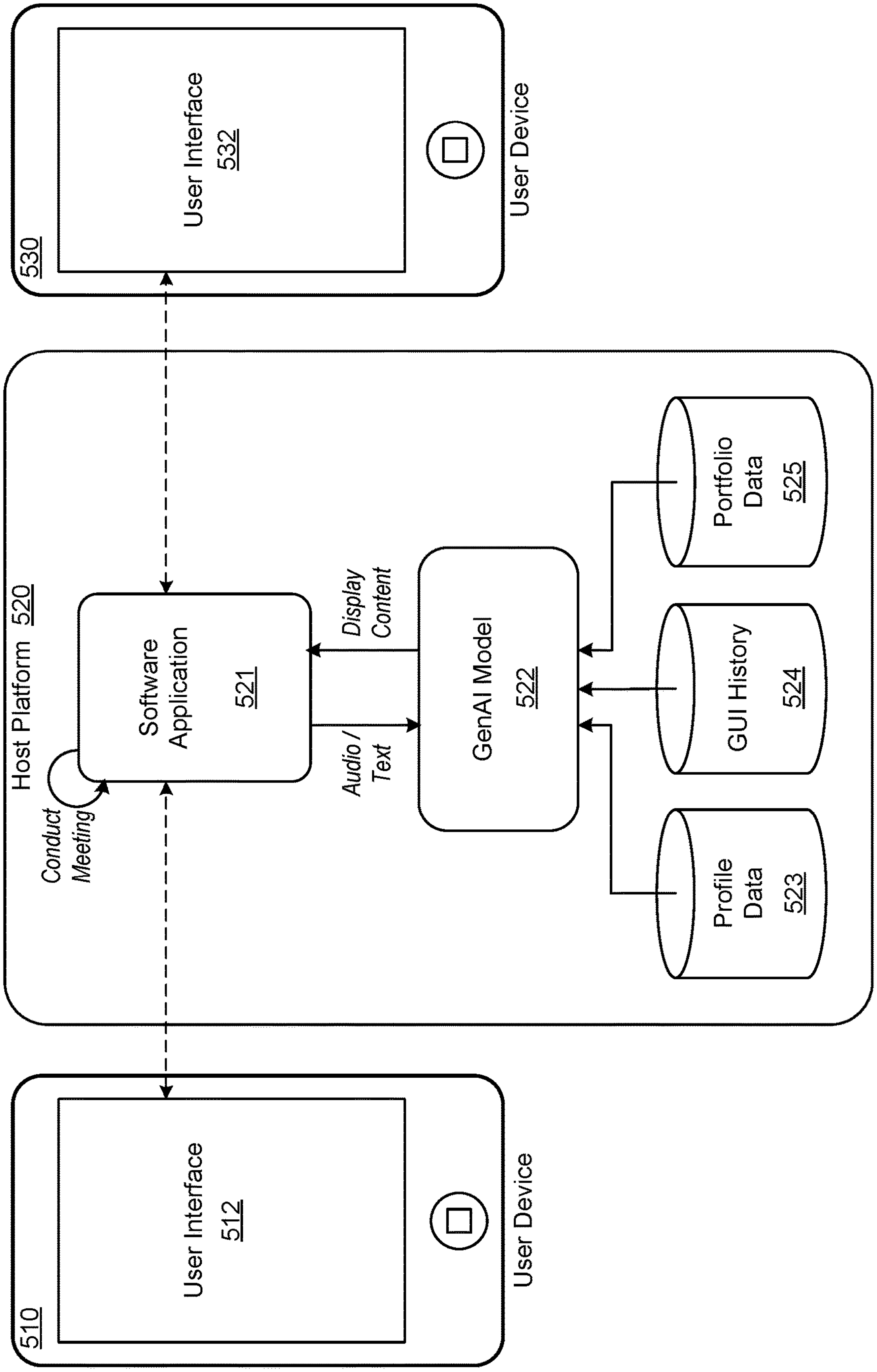
Figure 5C:
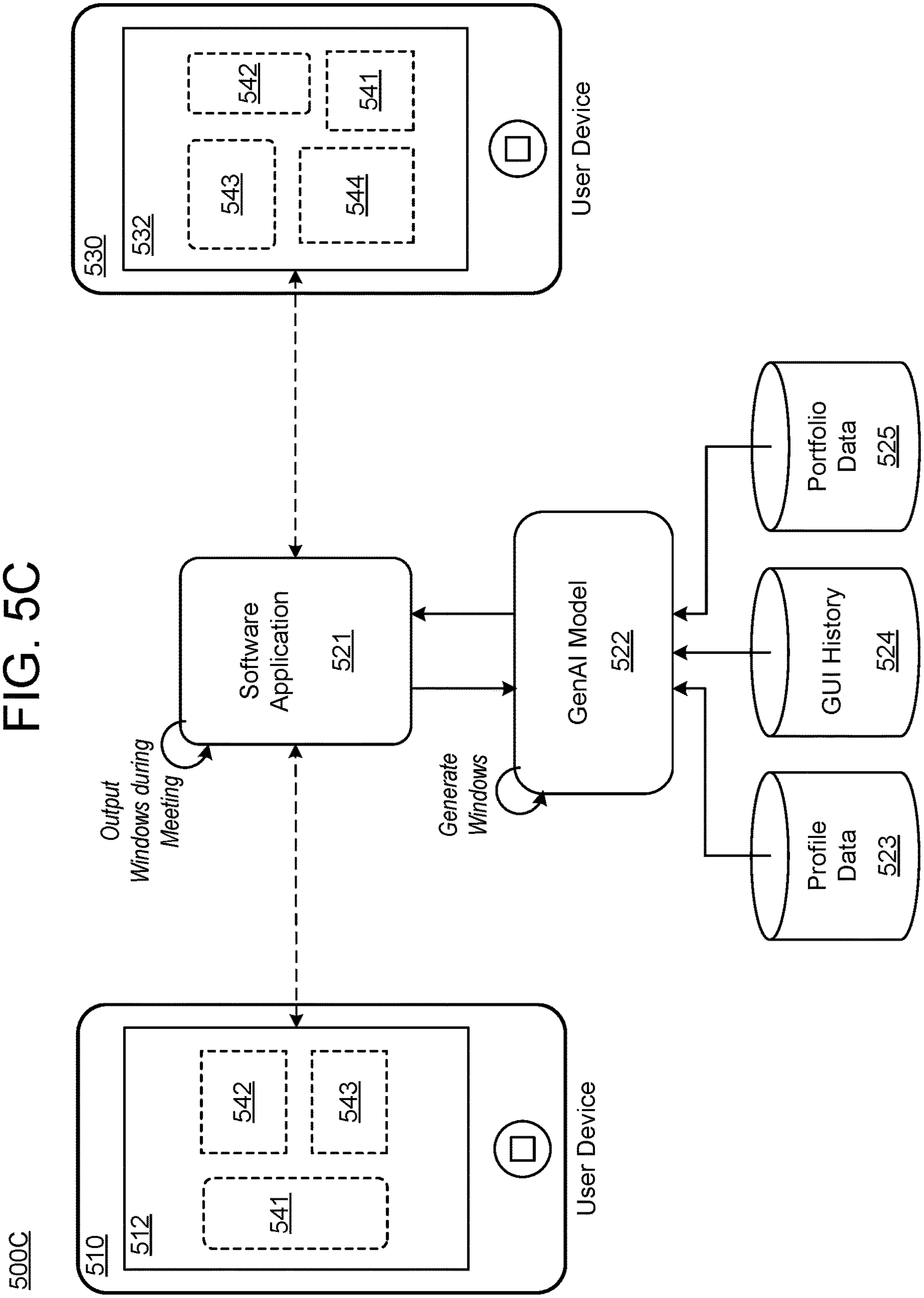

FIGS. 5A-5C are diagrams illustrating a process of dynamically presenting GUI content with a GenAI model according to example embodiments. For example, FIG. 5A illustrates a process 500A of ingesting content about an upcoming call/meeting from a user device 510 and generating display content for the call/meeting. Referring to FIG. 5A, a host platform 520 hosts a software application 521, such as a meeting application, call application, chat application, and/or the like. The software application 521 may establish a live channel of communication between the user device 510 and another user device, such as user device 530, shown in FIG. 5B.

For example, the software application 521 may query an application 502 installed on the user device 510 for information about an upcoming call/teleconference. The application 502 may be a calendar application, a meeting application, an email application, a message application, a chat application, and the like. Here, a meeting summary 504 of an upcoming meeting is retrieved from an electronic calendar within the application 502. In response to receiving the meeting summary 504, the software application 521 may transfer the meeting summary (e.g., the text content) to the GenAI model 522, which can generate display content for the upcoming meeting. Here, the GenAI model 522 may access profile data of the user in a data store 523, GUI history data of the user in a data store 524, portfolio data of the user in a data store 525, and the like.

According to various embodiments, the GenAI model 522 may be trained to identify content types and locations of such content types that are preferred on the respective user interfaces of the different devices. The training process may be performed differently for each device using different instances of the GenAI model 522. As another example, the same GenAI model may learn the preferences of multiple users.

FIG. 5B illustrates a process 500B of establishing the call associated with the meeting summary 504 retrieved from the user device 510 in FIG. 5A. In this example, the software application 521 establishes a communication channel for a live teleconference between the user device 510 and the user device 530 via a computer network such as the Internet. The content may be displayed on a user interface 512 of the user device 510 and a user interface 532 of the user device 530. During the call, the software application 521 may display windows of content and other graphics, such as menus, display buttons, boxes, radio buttons, and the like, on the user interface 512 and the user interface 532.

For example, FIG. 5C illustrates a process 500C of dynamically displaying content on the user interface 512 of the user device 510 and the user interface 532 of the user device 530. Here, the software application 521 may display content from a predefined script during the meeting. In this example, the content that is displayed on the user interface 512 (e.g., windows, content types, etc.) may be the same as the content that is displayed on the user interface 532. As another example, the content that is displayed on the user interface 532 may be different in size, shape, type of content, or the like. That is, the software application 521 may display different data on the user interfaces 512 and 532 at the same time during the meeting based on the preferences of the user devices.

Here, the preferences are learned by the GenAI model 522 during the training prior to the meeting being conducted. The training may include previous meetings conducted between the user device 510 and the user device 530, including call content, visual content, etc. As such, the GenAI model 522 is already familiar with the preferences of the user device 510 and the user device 530 when the meeting is conducted. In this example, the GenAI model 522 determines to display windows of content 541, 542, and 543 on the user interface 512 of the user device 510 and the user interface 532 of the user device 530. Here, the GenAI model 522 determines the arrangement of the windows of content 541, 542, and 543 in different locations on the user interface 512 and the user interface 532 based on the learned preferences. Furthermore, the GenAI model 522 may also determine the size, shape, etc. of the windows of content 541, 542, and 543 for the different users.

In addition, in this example, the GenAI model 522 displays an additional window of content 544 on the user interface 532 that is not shown on the user interface 512 of the user device 510 based on the learned preferences. In this example, the GenAI model 522 can rearrange the locations based on changes to preferences that are learned over time. The model can be retrained using logged data from a live runtime environment.

Figure 6A:
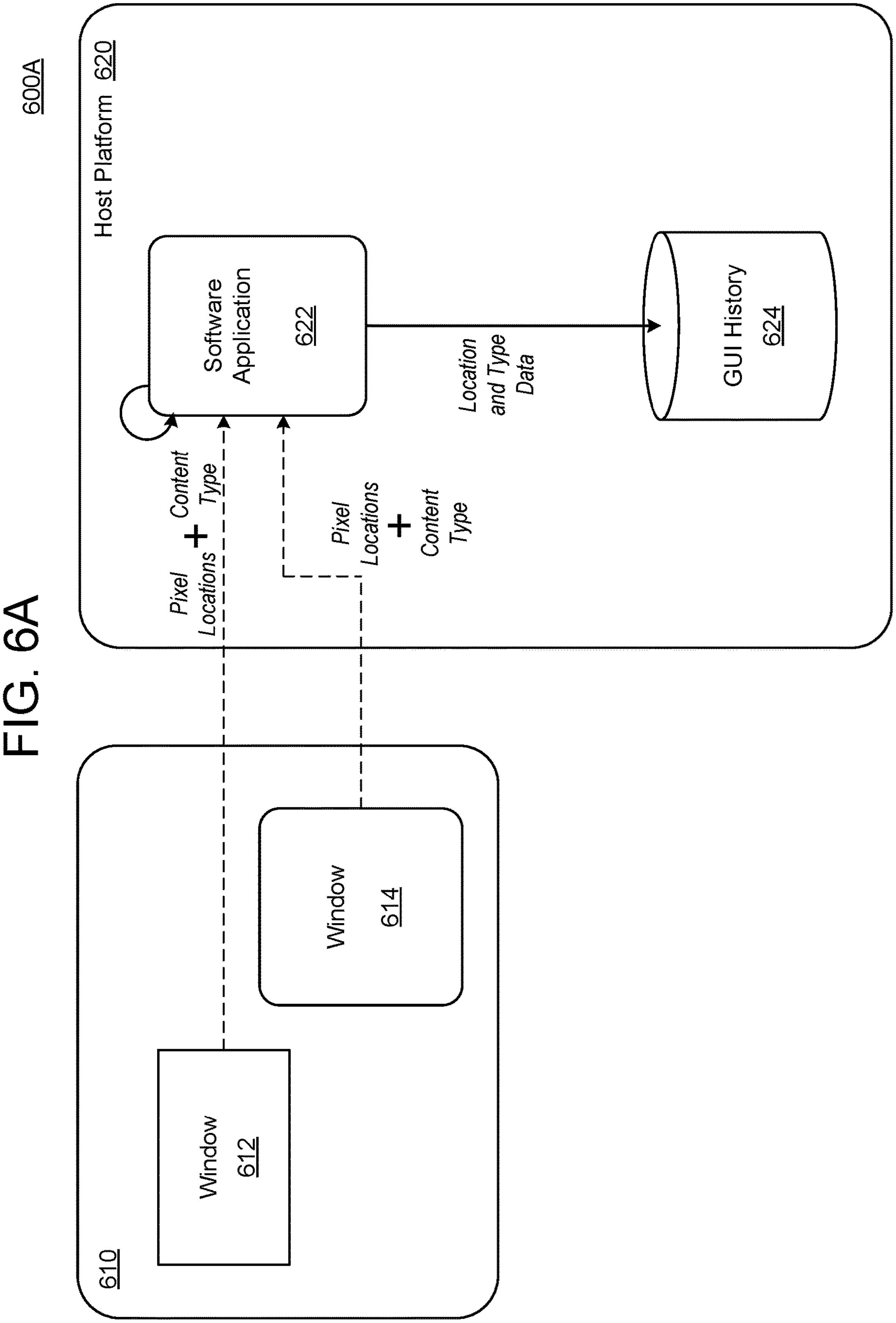
FIGS. 6A-6D are diagrams illustrating a process of echoing a display of content based on content familiarity according to example embodiments.

FIGS. 6A-6D are diagrams illustrating a process of echoing a display of content based on content familiarity according to example embodiments. For example, FIG. 6A illustrates a process 600A of a host platform capturing GUI location preferences of a plurality of windows of content, including window 612 and window 614 within a user interface 610. The user interface 610 may include an outer perimeter that can be used to identify locations of the windows within the user interface using pixel locations or the like. For example, predefined pixel locations may be mapped to individual pixels within the user interface 610 based on the overall size of the user interface 610.

The user interface 610 may periodically log user interface positions of windows of content, along with a content type of the windows of content, and send them to a software application 622 hosted by a host platform 620. Here, the software application 622 may record the logged GUI data within a data store 624. The logged data may include pixel locations of the window 612 and the window 614, changes to the pixel locations of the window 612 and the window 614 (e.g., deltas, etc.), content types of the window 612 and the window 614, and the like. The logged data may be used to train a GenAI model as shown in FIG. 6B.

Figure 6B:
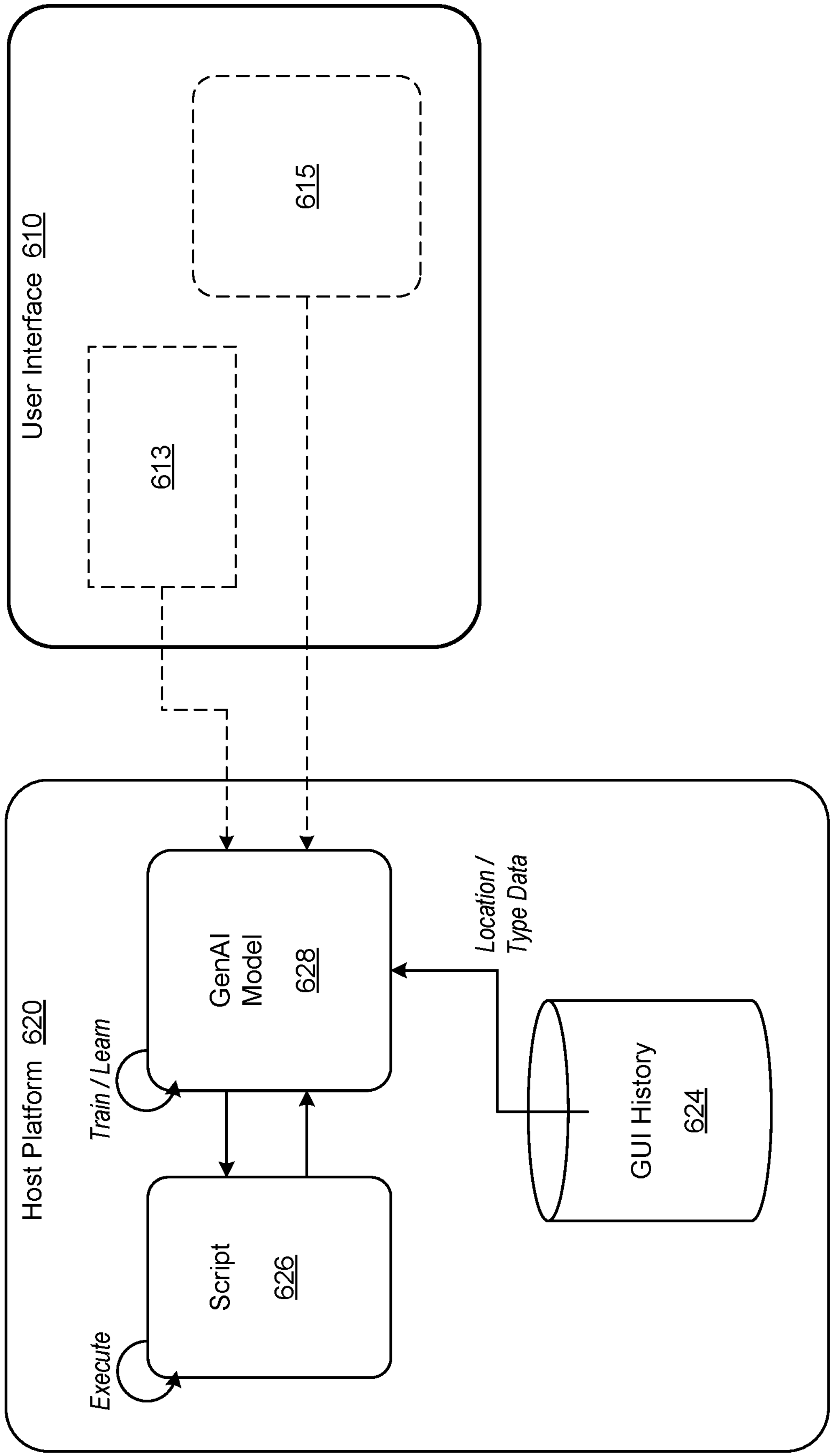

For example, FIG. 6B illustrates a process 600B of training a GenAI model 628 to learn location preferences of the windows 612 and 614 within the user interface 610 based on content types of the windows 612 and 614, as shown in FIG. 6A. In this example, a script 626 executes on the host platform 620 and retrieves logged GUI data from the data store 624 and inputs the logged GUI data into the GenAI model 628 as it executes. Through this process, the GenAI model 628 learns the location preferences of content types for this user.

The content types may be limited to a predefined set of content types (e.g., a predetermined set of 25 possible content types, 50 content types, 100 content types, etc.). The GenAI model 628 may learn both location and size preferences as well. In the example of FIG. 6B, the GenAI model 628 learns that the window 612, shown in FIG. 6A, has a type of content that the user prefers to be placed at location 613 while the window of content 614, shown in FIG. 6A, has a type of content that the user prefers to be placed at location 615 within the user interface. However, the locations of the content may be dependent on the overall size of the screen. The size of the screen is largely dependent on device type.

Figure 6C:
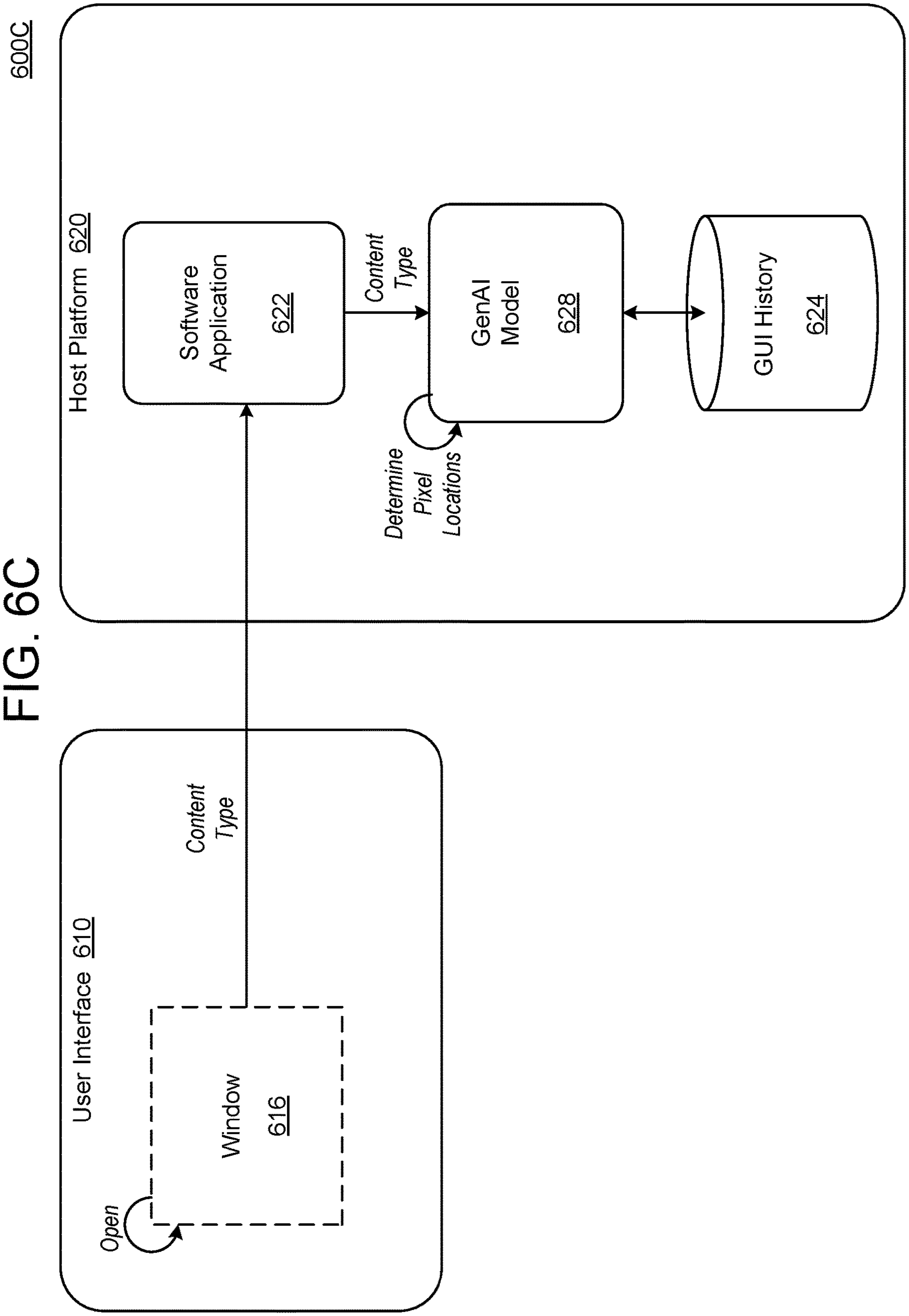

FIG. 6C illustrates a process 600C of loading a new window of content 616 to the user interface 610. In this example, the user interface 610 may transmit an identifier of the content type to the software application 622. In response, the software application 622 may transfer the content type to the GenAI model 628. Here, the GenAI model 628 may determine pixel locations for the new window of content 616 based on the content type and historical GUI data from the user interface 610 stored in the data store 624. Here, the pixel locations may include a horizontal location, a vertical location, a depth location, and the like for the new window of content 616, which may be used by the software application 622 to arrange the new window of content 616 at a location within the user interface 610.

Figure 6D:
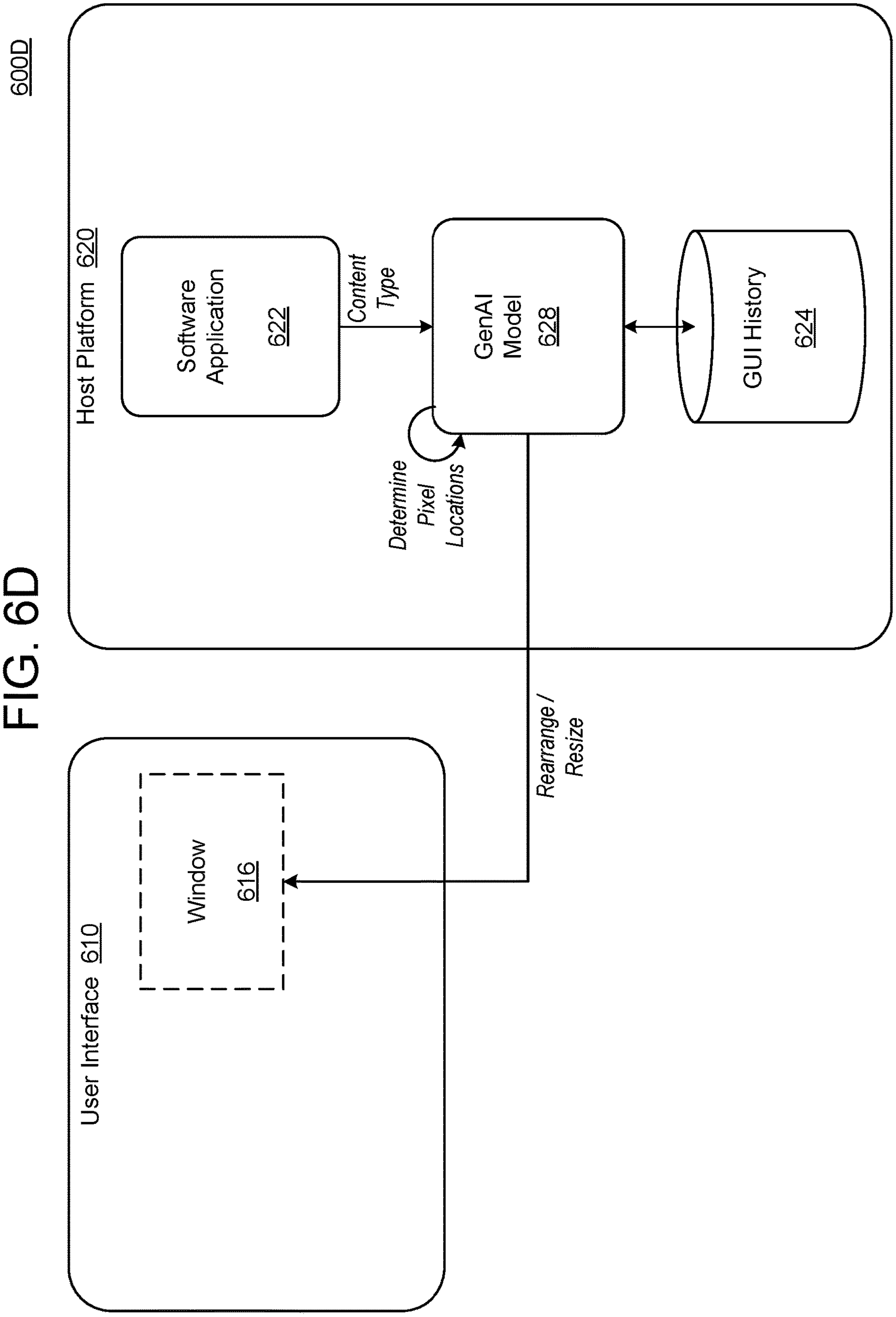

FIG. 6D illustrates a process 600D of arranging the new window of content 616 on the user interface 610 based on a type of content within the new window of content 616. In this example, the content type is the content from the user's retirement account, which they prefer to view on the right side of the GUI while discussing new investment opportunities. As such, the GenAI model 628 may trigger the software application 622 to generate pixel locations on the user interface 610 for the new window of content 616. The GenAI model 628 may also determine the size and the shape of the new window of content 616. For example, the GenAI model 628 may dynamically determine a shape for the new window of content 616 and a size for the new window of content 616 based on the content type and other GUI elements already on the screen.

Figure 7A:
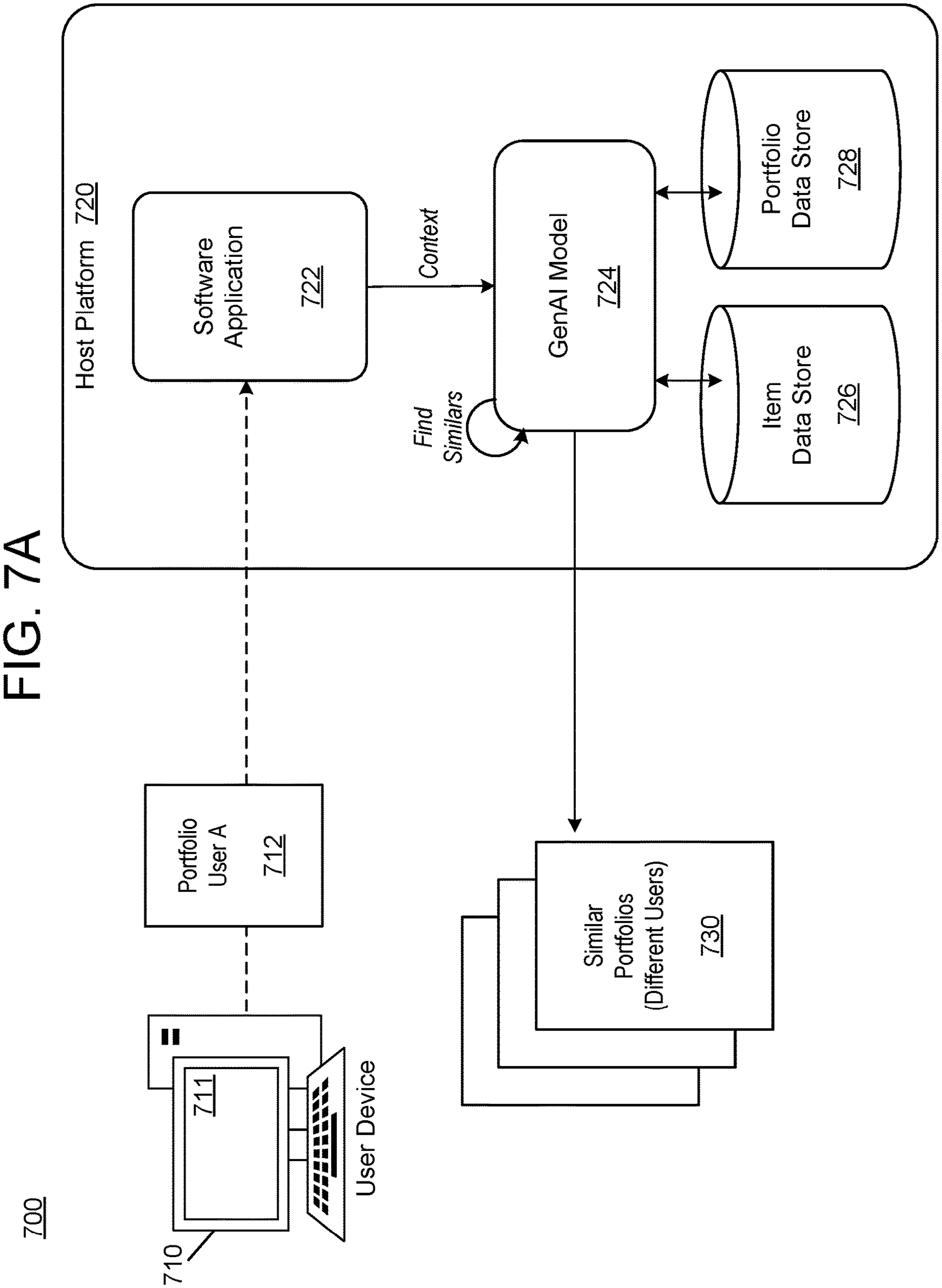
FIGS. 7A-7B are diagrams illustrating a process of displaying content based on similar users according to example embodiments.
Figure 7B:
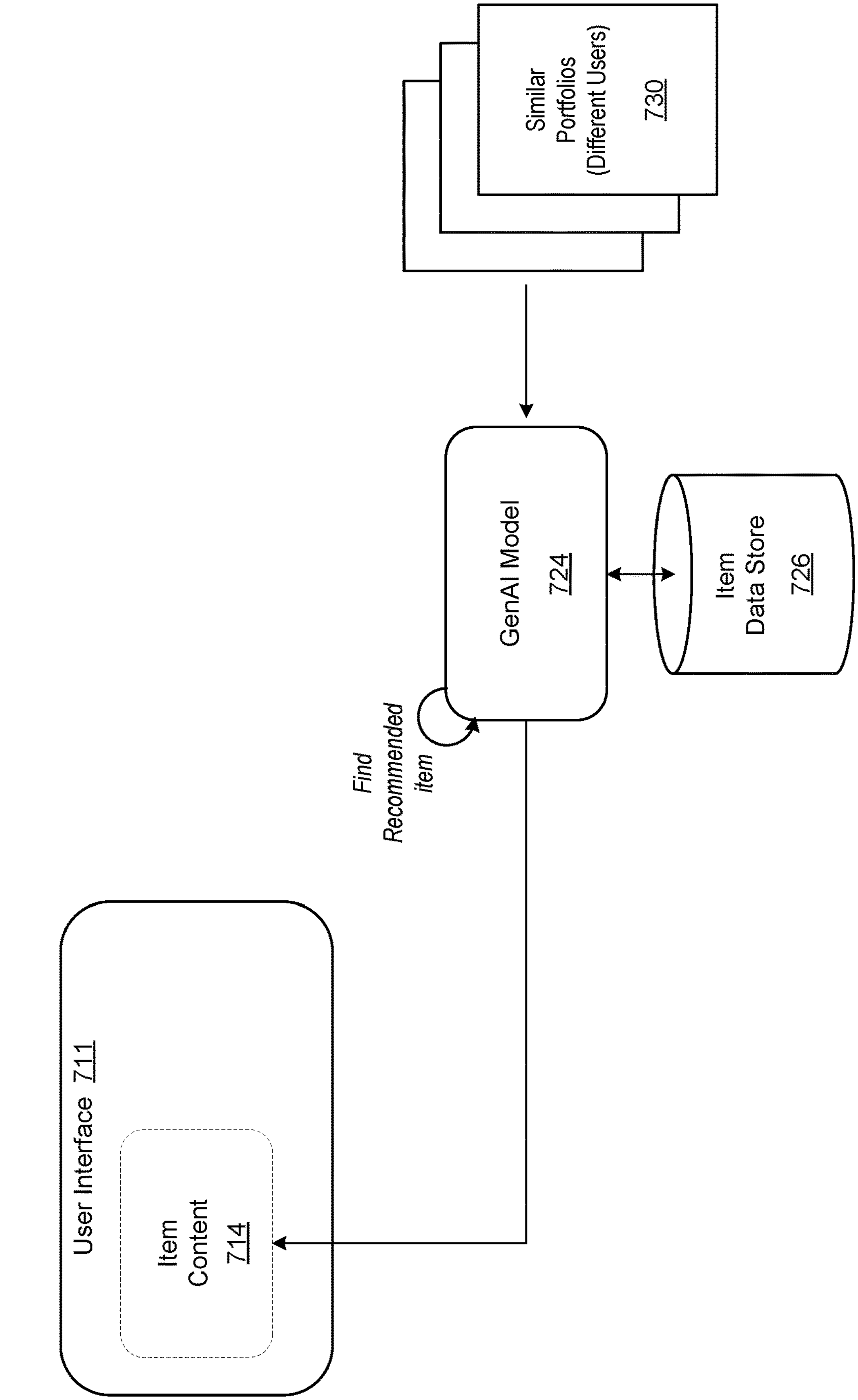

FIGS. 7A-7B are diagrams illustrating a process of displaying content based on similar users according to example embodiments. For example, FIG. 7A illustrates a process 700 of identifying portfolios of other users 730 that are similar to a portfolio of a target user 712. In this example, the user may be about to converse or may already be conversing or chatting with a financial advisor using a user device 710 and a software application 722 (such as a meeting application) hosted by a host platform 720. Here, the advisor may access the meeting from another user device (not shown) and see a live view of the client/user via the software application 722. The client and the advisor may converse with each other via the user device 710 and another user device (not shown) via the software application 722.

In this example, the user may submit the portfolio of the target user 712 to the software application 722, which in turn forwards content from the portfolio of the target user 712 to a GenAI model 724, also hosted on the host platform 720. The user may submit the portfolio by uploading a file via a user interface 711 of the user device 710 or by identifying a storage location of the portfolio within a portfolio data store 728 of the host platform 720. Here, the GenAI model 724 may ingest the portfolio of the target user 712 and identify one or more portfolios of other users 730 that are similar to the target user 712.

For example, FIG. 7B illustrates a process 740 of identifying an item to add to the portfolio of the target user 712, shown in FIG. 7A, based on a similarity between attributes, such as investment types, investment amounts, investment strategies, and the like, of the target user 712 and the other users with portfolios stored in the data store 728, shown in FIG. 7A, in addition to identifying the one or more portfolios of other users 730, shown in FIG. 7A, which is similar to the target user, the GenAI model 724 may also identify an asset or other item that is already held by the one or more portfolios of other users 730 that is not included in the portfolio of the target user 712. Here, the GenAI model 724 may generate a window of content 714 about the identified item based on item content from a data store 726, item content retrieved from an external data store, or the like, and display the window of content 714 on the user interface 711 of the user device 710, shown in FIG. 7A. In some embodiments, the window of content 714 may be arranged at a location within the user interface 711 based on a content type of the window of content 714.

Figure 8A:
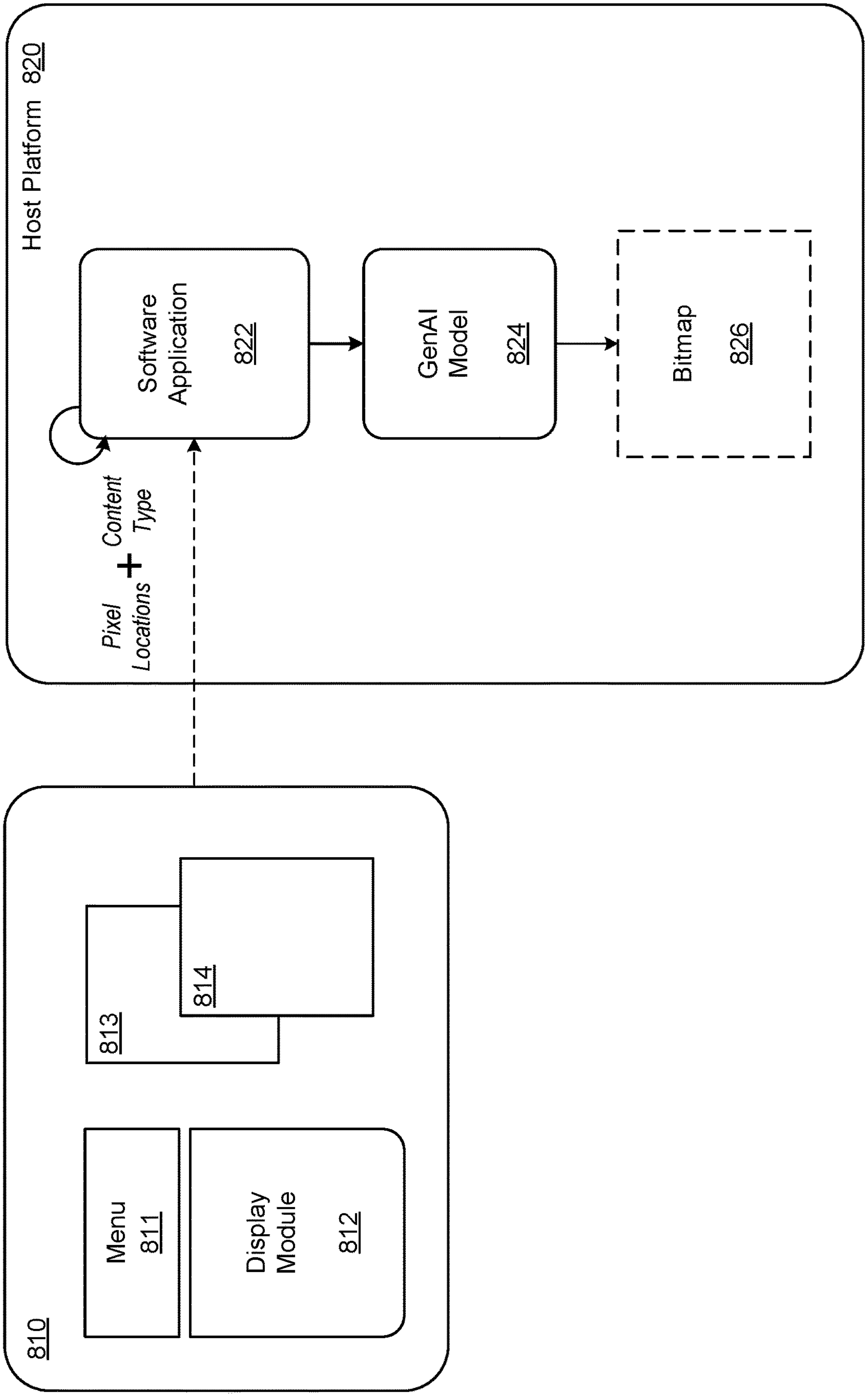
FIGS. 8A-8C are diagrams illustrating a process of generating a state of a user interface with a GenAI model according to example embodiments.
Figure 8B:
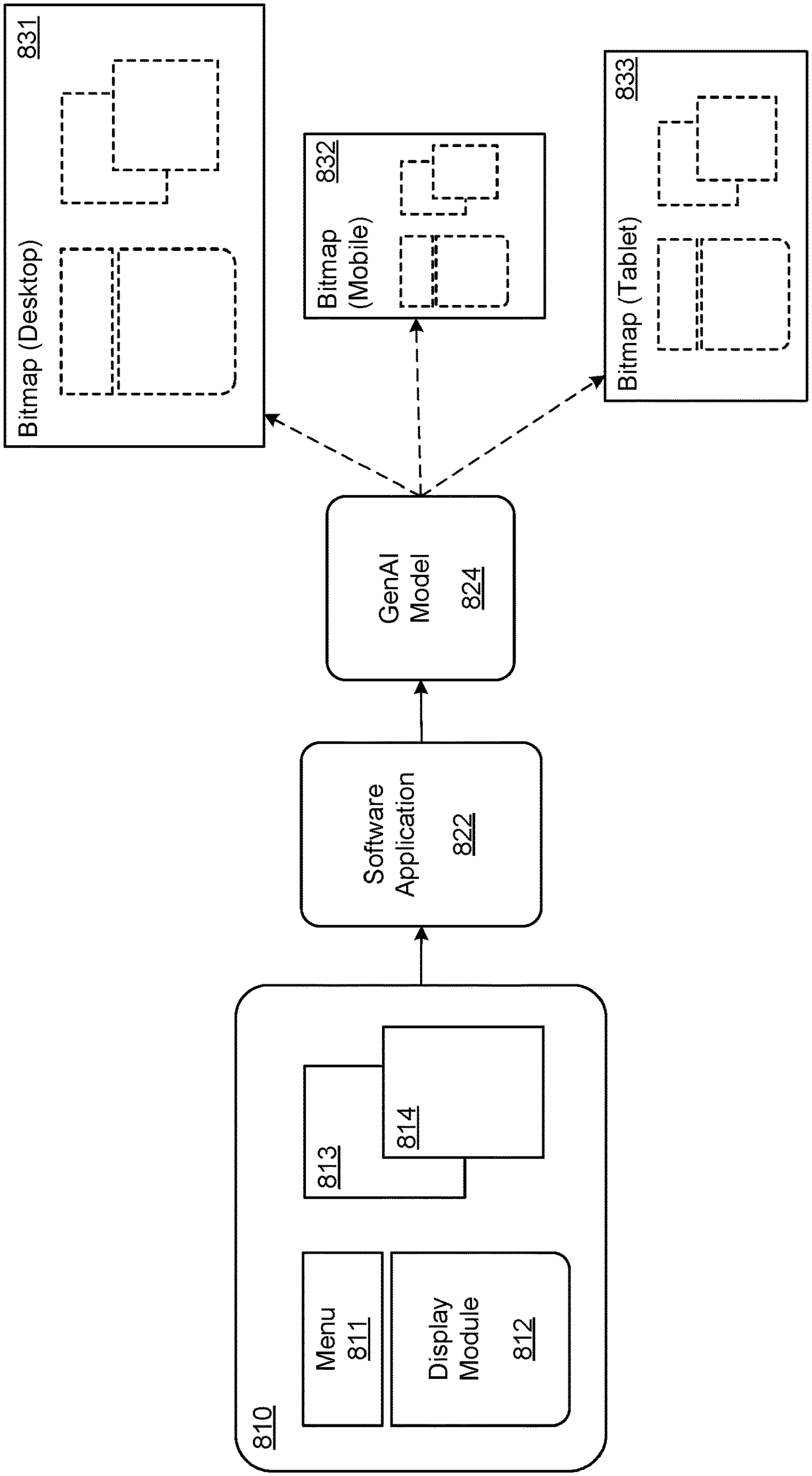
Figure 8C:
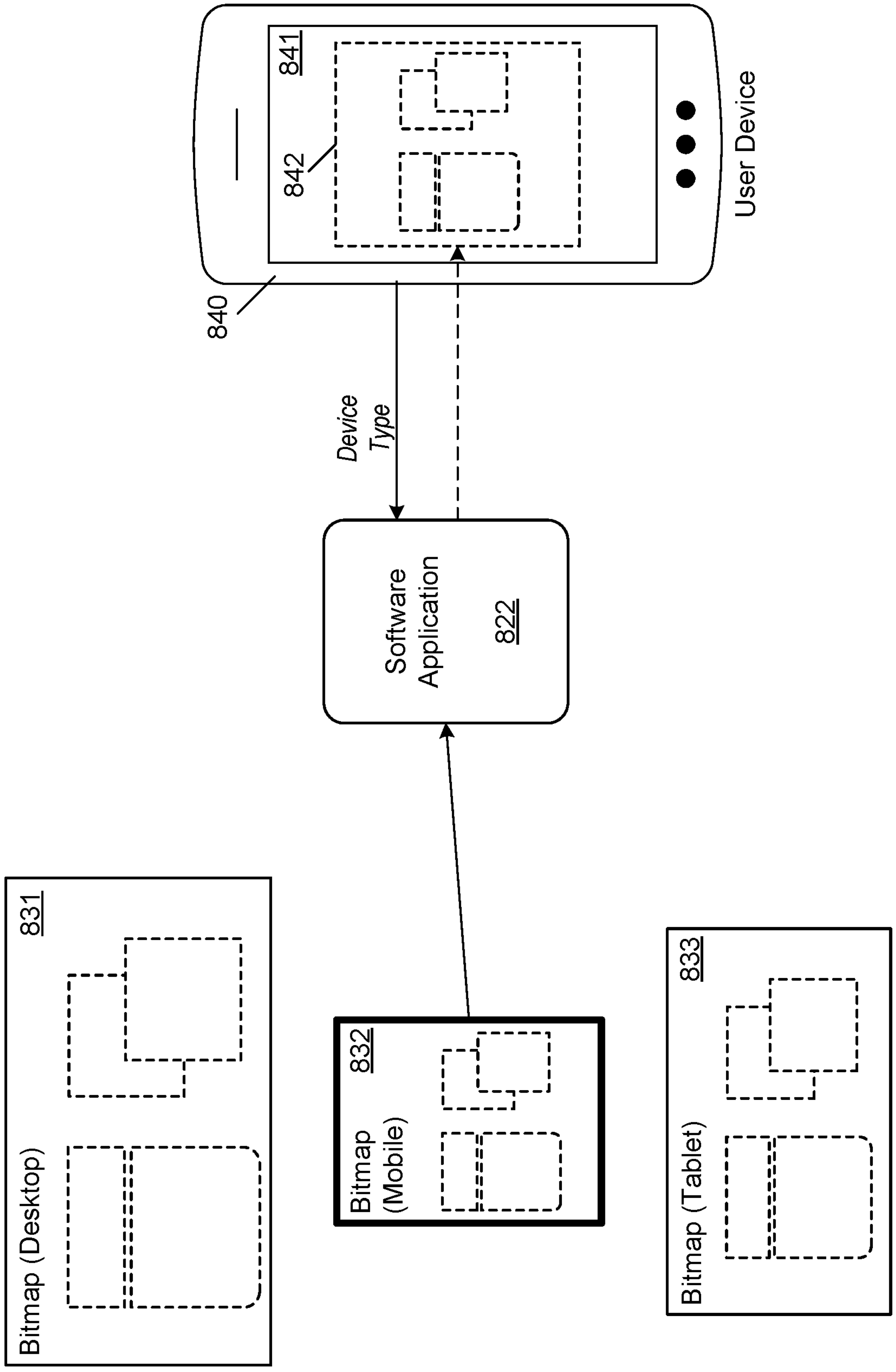

FIGS. 8A-8C are diagrams illustrating a process of generating a state of a user interface with a GenAI model according to example embodiments. According to various embodiments, the GenAI model described herein may learn GUI preferences of the user for different types of content and also for different sizes of screens on different types of devices. For example, FIG. 8A illustrates a process 800A of identifying content locations and content types of a plurality of display elements 811, 812, 813, and 814, within a user interface 810. Here, the display elements may correspond to user interface controls, menus, sliders, search bars, text input boxes, and the like, used for input and user interaction. The display elements may be located at different pixel locations within the user interface 810.

According to various embodiments, the locations and content types of the display elements 811, 812, 813, and 814 may be submitted to the software application 822 in response to a request, at periodic intervals, in response to a condition, or the like. The software application 822 may transfer the display locations and content types of the display elements 811, 812, 813, and 814 to a GenAI model 824, which generates a bitmap 826 of the locations of the display elements 811, 812, 813, and 814, with respect to an outer perimeter of the user interface 810. The bitmap 826 may include a digital image that preserves the sizes and the locations of the display elements 811, 812, 813, and 814. The bitmap may include a rectangular mesh of pixels that contains location values and content type values. In some embodiments, the bitmap may even include color values within the pixels.

FIG. 8B illustrates a process 800B of generating multiple different bitmaps 831, 832, and 833, representing the pixel locations of the display elements 811, 812, 813, and 814 within different sizes of display screens belonging to different device types. Here, the GenAI model 824 may receive, via the software application 822 shown in FIG. 8A, identifiers of the different devices of the user including screen sizes and generate different bitmaps representing the different screen sizes. The different bitmaps may include different sizes, shapes, locations, etc. for the display elements therewithin, in comparison to the other bitmaps. The different bitmaps may be labeled with a corresponding device type and stored within a storage of the host platform and queried by the software application 822.

Furthermore, when the software application receives a request for the user interface 810, the software application 822 may instantiate the user interface 810 by selecting one of the bitmaps and instantiating the display elements at positions based on the selected bitmap. For example, FIG. 8C illustrates a process 800C of displaying the user interface preserved within the bitmap 832 on a user device 840 in response to a request to open content on a user interface 841 of the user device 840, which is sent to the software application 822. Here, the software application 822 may detect the screen size or type of device from the input and select the corresponding bitmap (e.g., the bitmap 832). Next, the software application 822 may instantiate a window 842 with display elements therein on a user interface 841 of the user device 840 based on the bitmap 832. The software application 822 may modify or otherwise determine the locations of the display elements within the window 842 based on the pixel data within the bitmap 832.

Figure 9A:
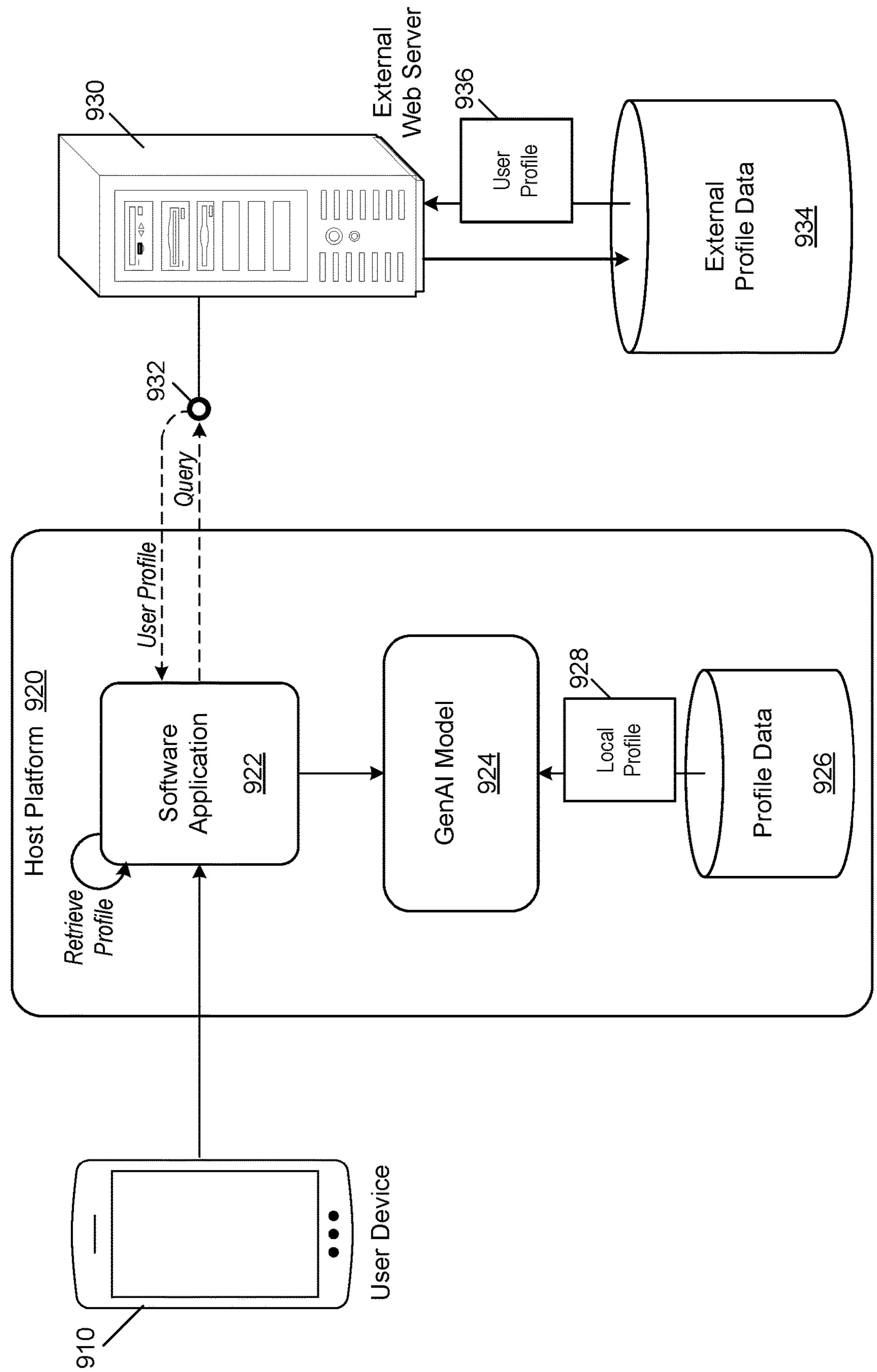
FIGS. 9A-9D are diagrams illustrating processes of connecting profiles and generating recommendations based therein with a GenAI model according to example embodiments.

FIGS. 9A-9D illustrate processes of connecting profiles and generating recommendations based therein with a GenAI model according to example embodiments. For example, FIG. 9A illustrates a process 900A of retrieving an external user profile 936 from an external data store 934 and a local user profile 928 from a local data store 926. Referring to FIG. 9A, a host platform 920 hosts a software application 922 which manages a user profile, such as financial accounts, retirement accounts, savings accounts, etc., of a user who possesses a user device 910 that is network-connected to the host platform 920. The user profile that is managed by the software application 922 is referred to as the local user profile 928.

In this example, the software application 922 may receive the user's access credentials with an external host system 930 which hosts the external user profile 936. In response, the software application 922 may query an endpoint 932 of the external host system 930 based on the user credentials and request access to profile content and features within the external user profile 936 hosted by the external host system 930. In this example, the software application 922 may "connect" an external account hosted by the external host system 930 or other external feature identified from the external user profile 936 of the user to the local user profile 928, thereby enabling access (view, transact, etc.) for the user to the external account while logged into the software application 922.

According to various embodiments, the software application 922 may pass the external user profile 936 to a GenAI model 924. In addition, the GenAI model 924 may retrieve the local user profile 928 from the data store 926 and execute on the received profiles to identify a product feature, such as an account or a benefit that can be added to the local user profile 928 from the external user profile 936. For example, FIG. 9B illustrates a process 900B of querying the user device 910 with a feature that can be added to the local user profile 928 from the external user profile 936 via the software application 922.

Figure 9B:
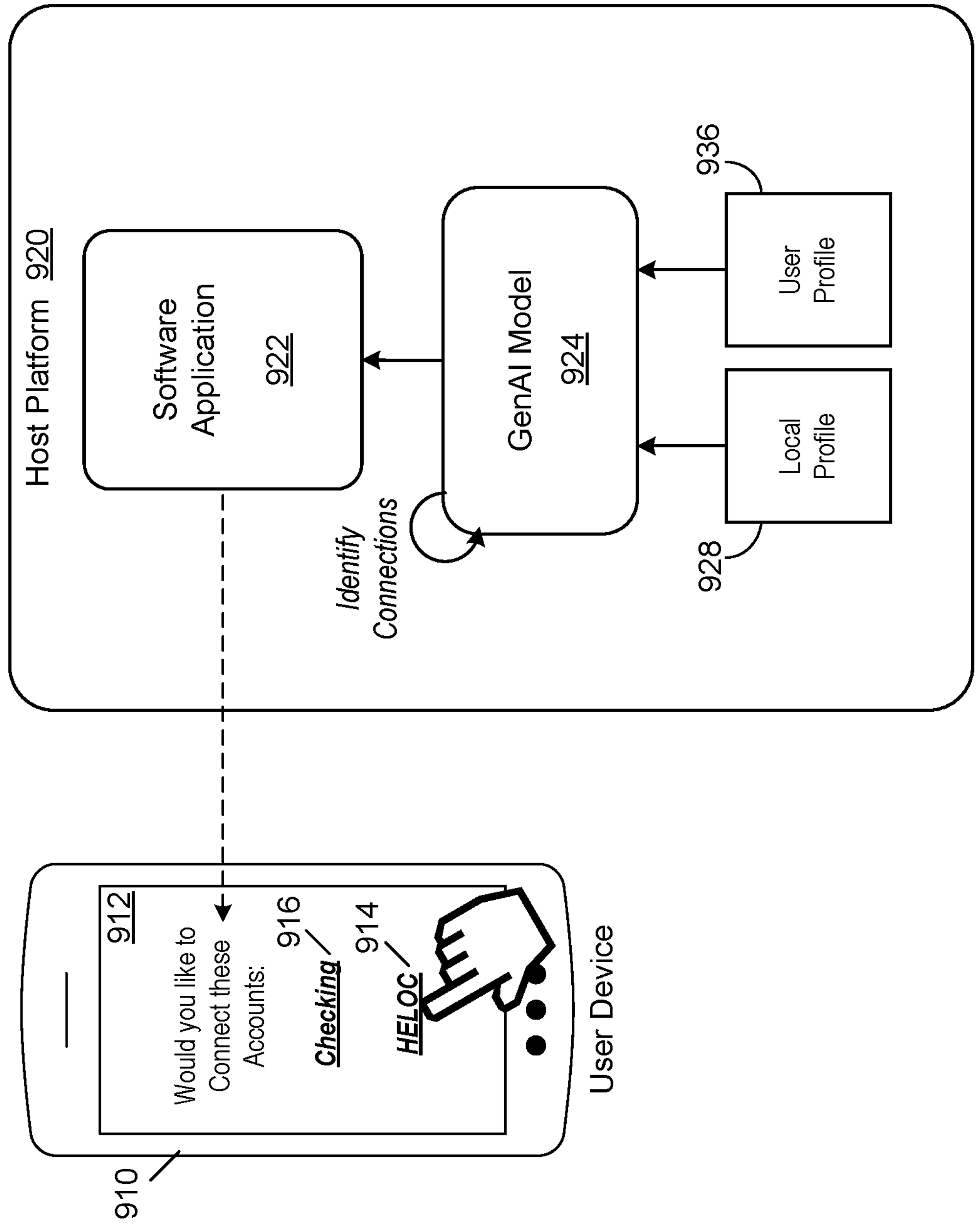
Figure 9C:
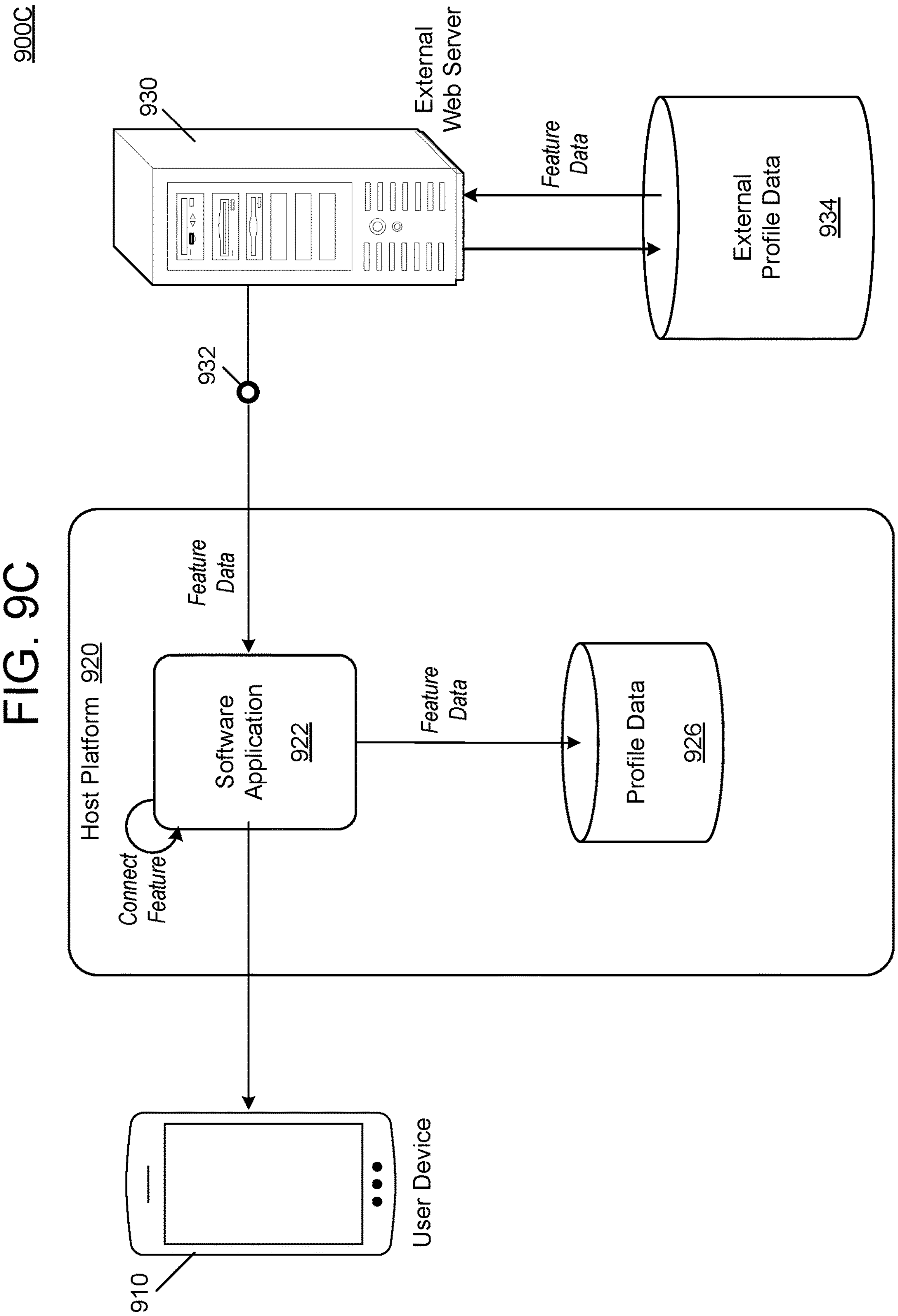

For example, referring to FIG. 9B, the software application 922 may identify two features 914 and 916, that are included in the external user profile 936 but are not included in the local user profile 928 and presents the features to be "connected" or otherwise "added" to the local user profile 928. The features may be displayed as clickable links on the user interface 912 of the user device 910. For example, FIG. 9C illustrates a process 900C of connecting the local user profile 928, shown in FIG. 9B, to the account feature within the external user profile 936, shown in FIG. 9B. The connecting enables content from the external user profile 936 (including the account content) to be accessed and viewed by the user within the software application 922 hosted on the host platform 920.

Figure 9D:
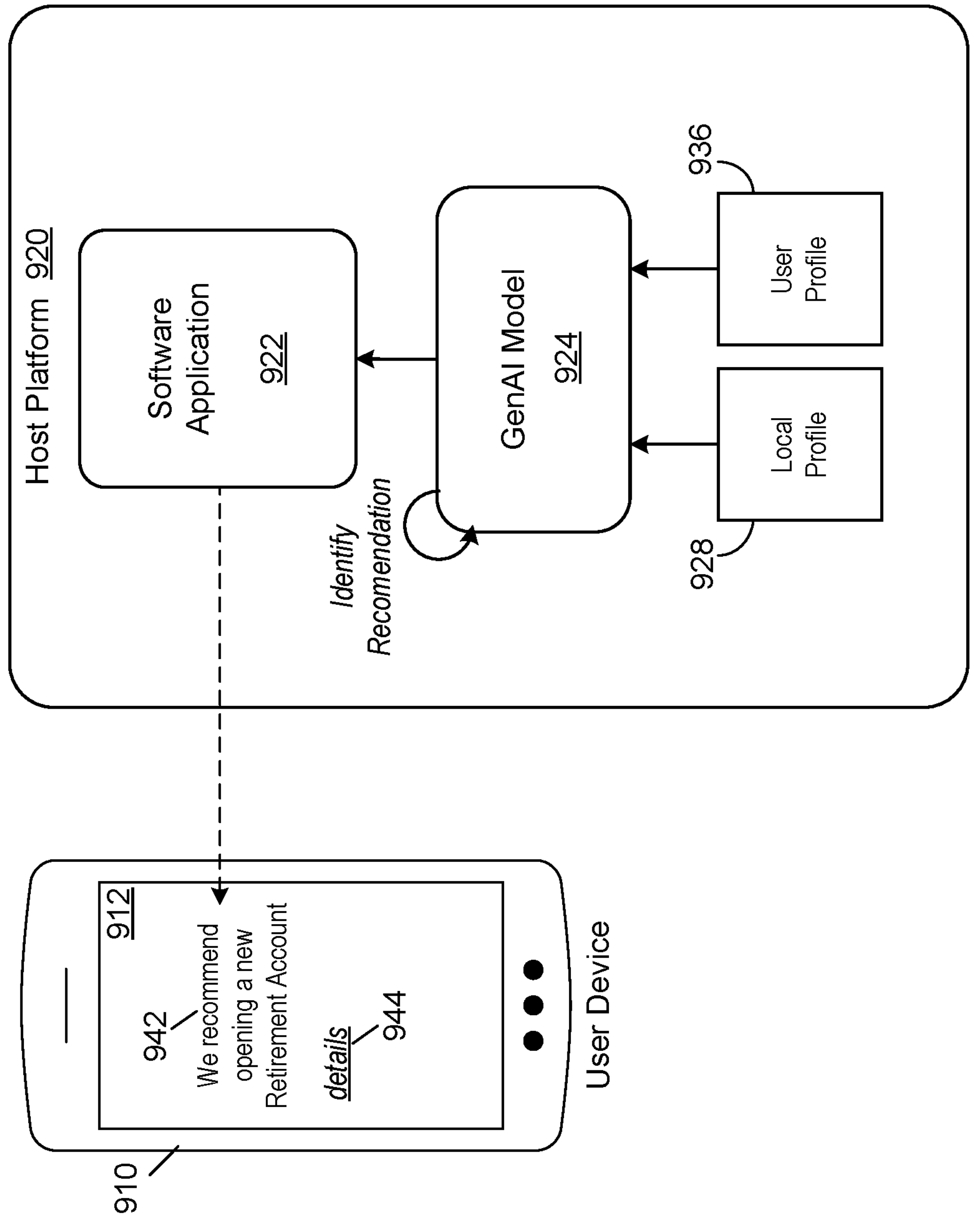

FIG. 9D illustrates a process of recommending a new product based on a connected feature from the external user profile 936. In this example, the software application 922 has connected the external user profile 936 to the local user profile 928, enabling content from both user profiles to be ingested by the GenAI model 924. In this example, the software application 922 may extract profile features from the profile hosted by the external host system and profile features from the local user profile within the host platform and input the extracted data to the GenAI model 924. The execution of the GenAI model 924 may determine a new profile feature to add to the local user profile based on a combination of the profile features extracted from the external user profile. 936 and the local user profile 928.

In the example of FIG. 9D, the software application 922 may display information about the new profile feature on the user interface 912 of the user device 910. Here, the GenAI model 924 may transfer content about the new profile feature to the software application 922, and the software application 922 may display content about the new feature on the user interface 912, including a link 944 to a landing page of the new feature which enables the user to add the new feature with a single click.

The software application 922 may extract a set of active features from the external user profile 936 and a set of active features from the local user profile 928 hosted by the host platform 920 and determine the new profile (e.g., new recommended content to add to the portfolio, etc.) based on executing the GenAI model 924 on each set of active features. The new portfolio may include a feature of interest hosted by the host platform that is not included in the local user profile and not included in the profile hosted by the external host system based on executing the GenAI model on the combination of the profile features extracted from the profile hosted by the external host system and the profile features extracted from the local user profile.

Figure 10A:
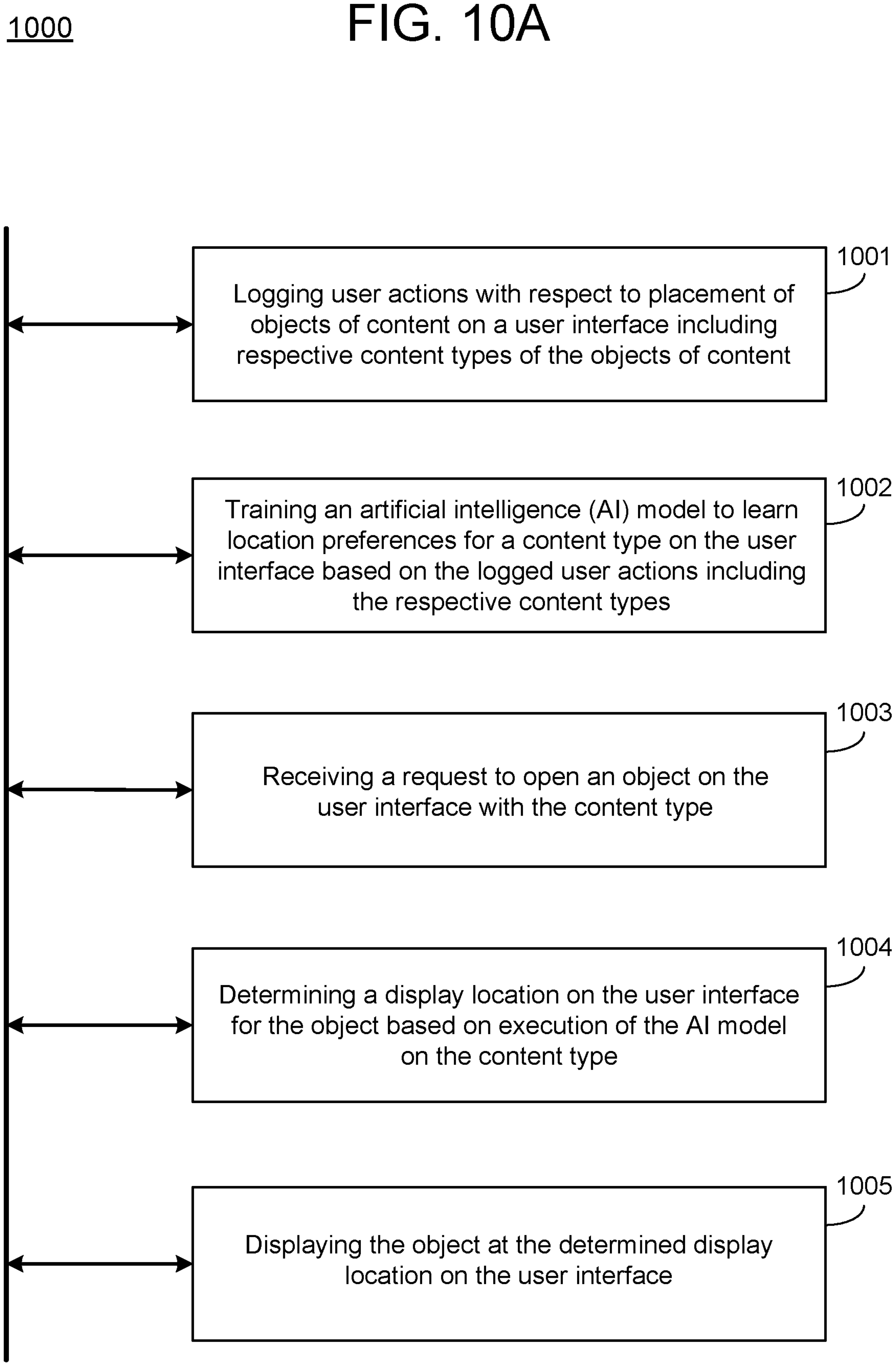
FIG. 10A is a diagram illustrating a method of echoing a display of content based on content familiarity according to example embodiments.

FIG. 10A illustrates a method 1000 of echoing a display of content based on content familiarity according to example embodiments. As an example, the method 1000 may be performed by a computing system, a software application, a server, a cloud platform, a combination of systems, and the like. Referring to FIG. 10A, in 1001, the method may include logging user actions with respect to placement of objects of content on a user interface including respective content types of the objects of content. In 1002, the method may include training an artificial intelligence (AI) model to learn location preferences for a content type on the user interface based on the logged user actions including the respective content types. In 1003, the method may include receiving a request to open an object on the user interface with the content type. In 1004, the method may include determining a display location on the user interface for the object based on execution of the AI model on the content type. In 1005, the method may include displaying the object at the determined display location on the user interface.

In some embodiments, the logging may include logging horizontal and vertical pixel locations and content types of the window objects within the user interface. In some embodiments, the training may include training the AI model to learn spatial locations of the objects of content within the user interface with respect to an outer perimeter of the user interface. In some embodiments, the method may further include identifying movement of the object from the determined display location to a different display location on the user interface and storing a log of the identified movement within a log file. In some embodiments, the method may include retraining the AI model based on the log of the identified movement of the object from the determined display location to the different display location on the user interface.

In some embodiments, the method may further include receiving an input on a different window object already positioned within the user interface and in response, rearranging a position of the different window object within the user interface based on a content type of the different window object. In some embodiments, the rearranging may include determining a new position for the different window object based on executing the AI model on the content type of the different window object and moving the different window object to the new position on the user interface. In some embodiments, the method may further include capturing locations and content types of the objects currently displayed on the user interface and dynamically rearranging the locations of the objects on the user interface based on executing the AI model on the content types of the objects.

Figure 10B:
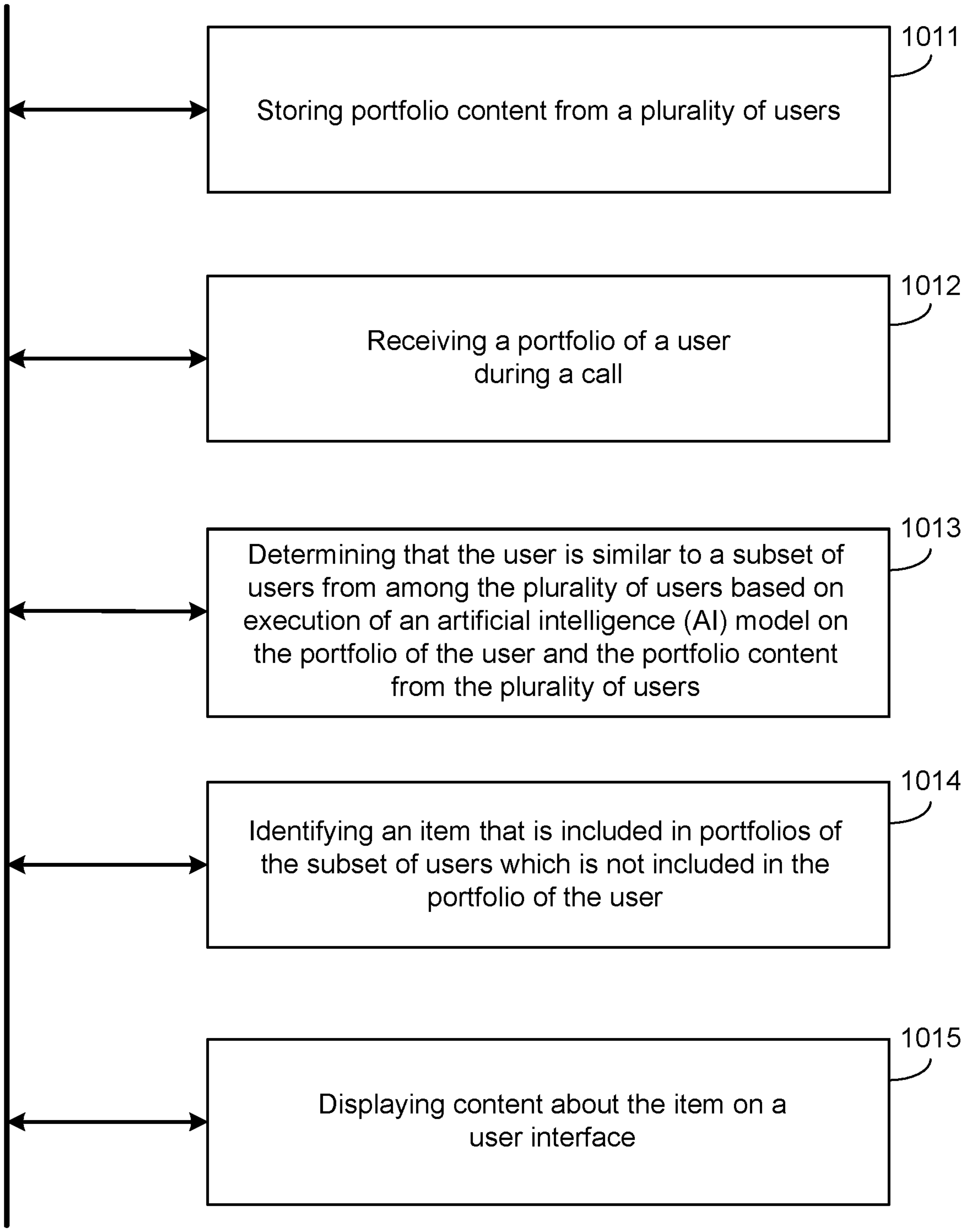
FIG. 10B is a diagram illustrating a method of displaying recommendations based on similarity of content according to example embodiments.

FIG. 10B illustrates a method 1010 of displaying recommendations based on similarity of content according to example embodiments. As an example, the method 1010 may be performed by a computing system, a software application, a server, a cloud platform, a combination of systems, and the like. Referring to FIG. 10B, in 1011, the method may include storing portfolio content from a plurality of users. In 1012, the method may include receiving a portfolio of a user during a call. In 1013, the method may include determining that the user is similar to a subset of users from among the plurality of users based on execution of an artificial intelligence (A) model on the portfolio of the user and the portfolio content from the plurality of users. In 1014, the method may include identifying an item that is included in portfolios of the subset of users which is not included in the portfolio of the user. In 1015, the method may include displaying content about the item on a user interface.

In some embodiments, the receiving may include opening the portfolio of the user within a software application, and the displaying may include displaying the content about the item within a page of the software application. In some embodiments, the determining may include determining that a set of assets included in the portfolio of the user matches a set of assets included in the portfolio content from the plurality of users. In some embodiments, the identifying may include identifying an asset to be added to the user's portfolio based on executing the AI model on the set of assets included in the user's portfolio. In some embodiments, the method may further include determining an amount of the item to add to the portfolio of the user based on executing the AI model on an identifier of the item and the portfolio of the user.

In some embodiments, the method may further include querying an external data store for performance data of the item and generating a graphic illustration that represents the performance of the asset of interest. In some embodiments, the method may further include conducting the call via a software application and displaying the graphic illustration within a user interface of the software application that is conducting the call. In some embodiments, the generating of the graphic illustration may include generating one or more of a chart or a graph showing the performance of the asset of interest in the future based on executing an AI model on the performance data of the item.

Figure 10C:
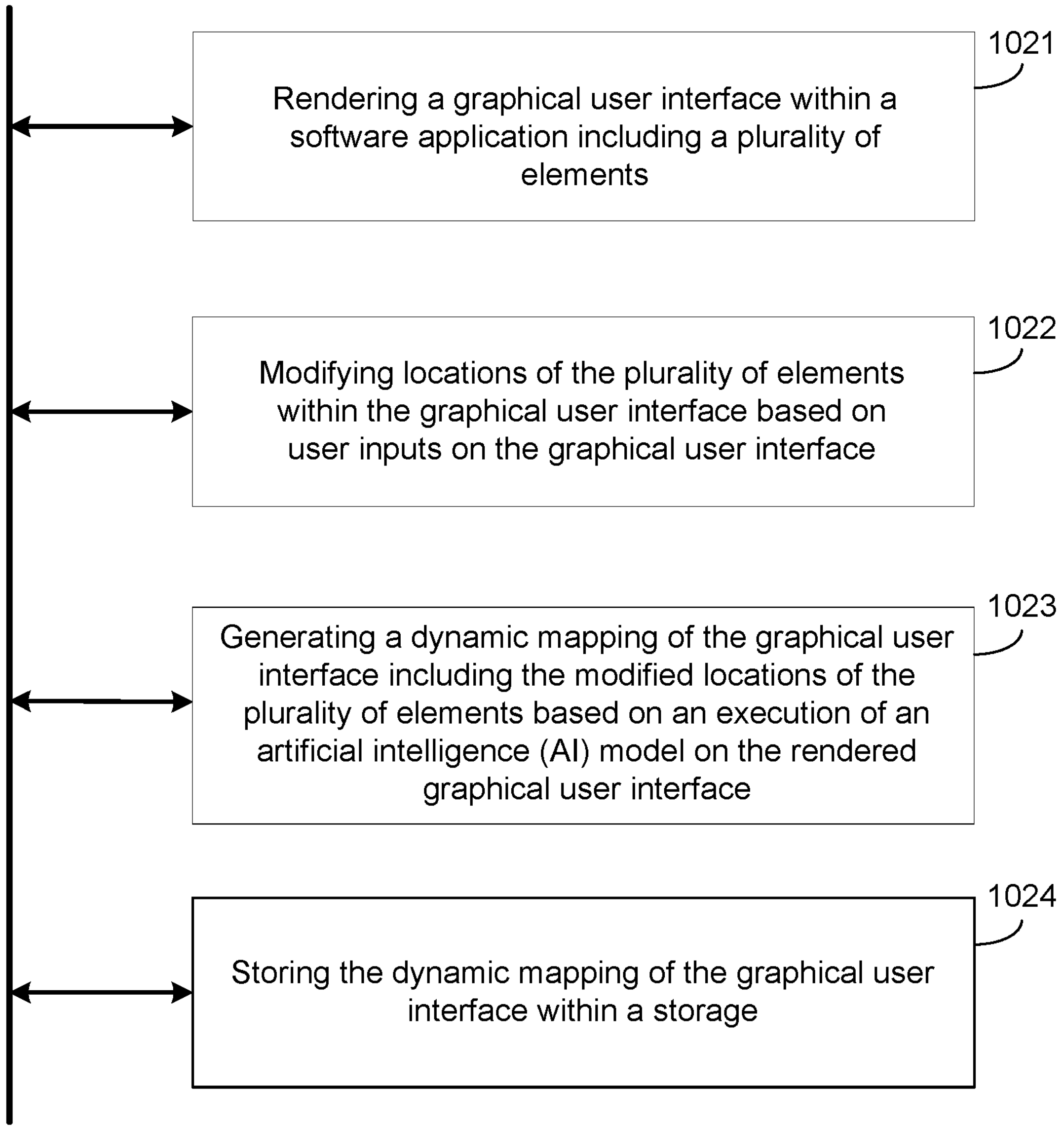
FIG. 10C is a diagram illustrating a method of memorializing a state of a GUI according to example embodiments.

FIG. 10C illustrates a method 1020 of memorializing a state of a GUI according to example embodiments. As an example, the method 1020 may be performed by a computing system, a software application, a server, a cloud platform, a combination of systems, and the like. Referring to FIG. 10C, in 1021, the method may include a graphical user interface within a software application including a plurality of elements. In 1022, the method may include modifying locations of the plurality of elements within the graphical user interface based on user inputs on the graphical user interface. In 1023, the method may include generating a dynamic mapping of the graphical user interface including the modified locations of the plurality of elements based on an execution of an artificial intelligence (AI) model on the rendered graphical user interface. In 1024, the method may include storing the dynamic mapping of the graphical user interface within a storage.

In some embodiments, the method may further include receiving a request to open a software application comprising a display window, and in response, determining locations of user interface elements within the display window of the software application based on the stored dynamic image of the graphical user interface. In some embodiments, the method may further include identifying a device type of a user device where the software application is being opened and generating the image of the graphical user interface based on executing the AI model on the device type of the user device. In some embodiments, the method may further include identifying a device type of a user device where the software application is being opened and further determining the locations of the user interface elements within the display window based on the device type of the user device.

In some embodiments, the plurality of elements may include a plurality selected from a group of elements, including a button, a slider, a text field, a combo box, a menu, and the like, which are displayed within the graphical user interface. In some embodiments, the method may further include receiving a request for the graphical user interface, and in response, reconstructing the graphical user interface with the modified locations of the plurality of elements based on the stored dynamic image of the graphical user interface. In some embodiments, the method may further include training the AI model prior to generating the dynamic image of the graphical user interface, wherein the training comprises executing the AI model based on historical locations of user interface elements of a software application for a user. In some embodiments, the method may further include modifying locations of user interface elements within a software application of a second user based on the AI model.

Figure 10D:
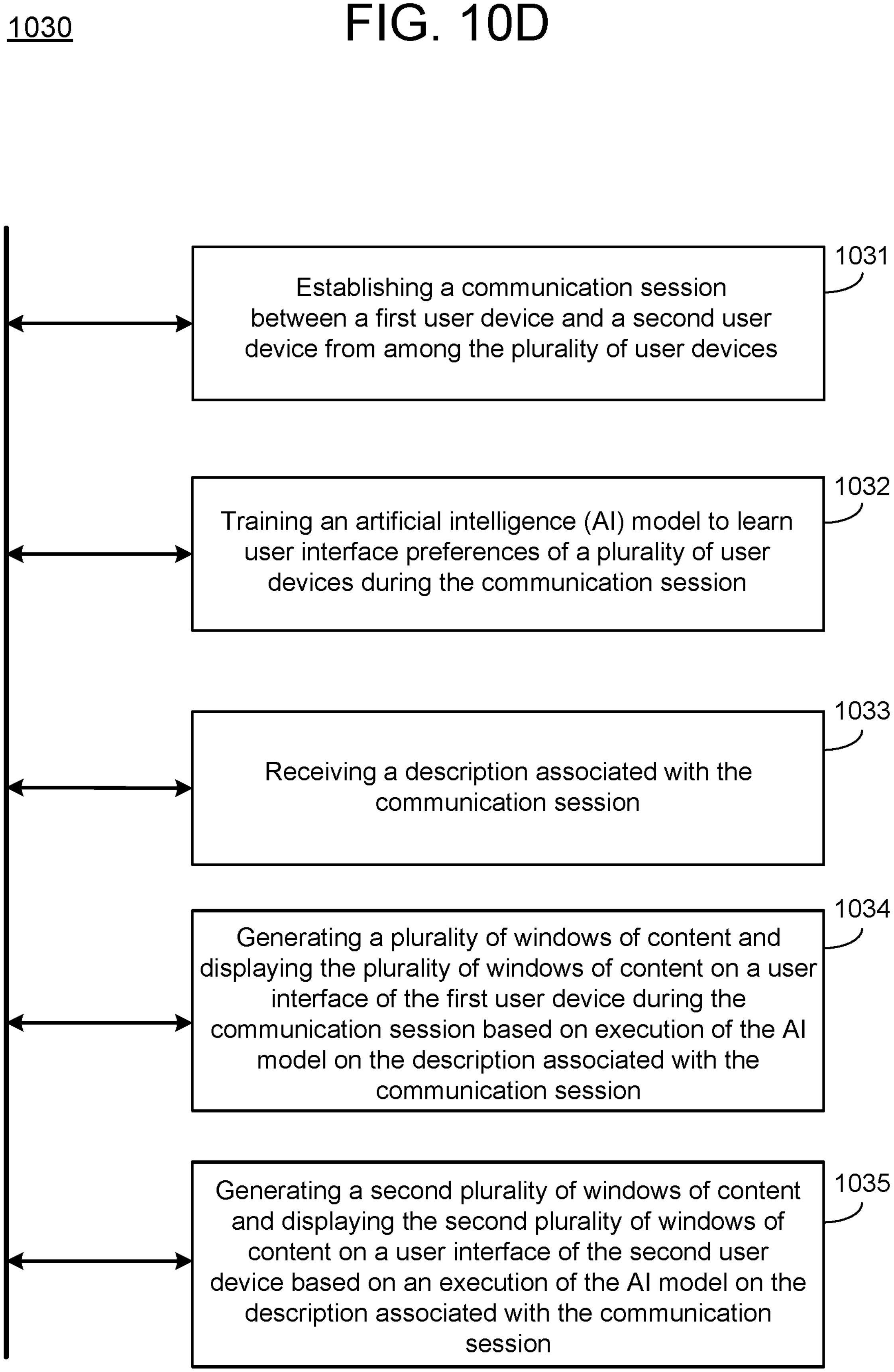
FIG. 10D is a diagram illustrating a method of dynamically presenting windows of content on GUIs during a call according to example embodiments.

FIG. 10D illustrates a method 1030 of dynamically presenting windows of content on GUIs during a call according to example embodiments. As an example, the method 1030 may be performed by a computing system, a software application, a server, a cloud platform, a combination of systems, and the like. Referring to FIG. 10D, in 1031, the method may include establishing a communication session between a first user device and a second user device from among the plurality of user devices. In 1032, the method may include training an artificial intelligence (AI) model to learn user interface preferences of a plurality of user devices during the communication session. In 1033, the method may include receiving a description associated with the communication session. In one embodiment, the description may be user-generated or AI-generated. The description may be received at any point in time, and may be received during the communication session.

In 1034, the method may include generating a plurality of windows of content and displaying the plurality of windows of content on a user interface of the first user device during the communication session based on execution of the AI model on the description associated with the communication session. In 1035, the method may include generating a second plurality of windows of content and displaying the second plurality of windows of content on a user interface of the second user device based on an execution of the AI model on the description associated with the communication session.

In some embodiments, the training may include executing the AI model on call content and visual content from previous meetings between the first user device and the second user device. In some embodiments, the receiving of the call may include receiving an audio feed and a video feed from a meeting application on one or more of the first user device and the second user device. In some embodiments, receiving the description may include receiving a meeting summary of the call with a summary description of content to be discussed during the call between the first user device and the second user device. In some embodiments, the generating of the second plurality of windows of content may include generating at least one window of content for the second plurality of windows of content that is not included in the plurality of windows of content displayed on the user interface of the first user device.

In some embodiments, the generating of the second plurality of windows of content may include generating a same plurality of windows of content for the first and second user interfaces and arranging the second plurality of windows of content in different locations on the user interface of the second user device than the first plurality of windows of content on the user interface of the first user device based on different preferences of the second user device. In some embodiments, the different preferences are determined based on executing the AI model on call content and visual content from previous meetings between the first and second user devices. In some embodiments, the displaying of the second plurality of windows of content on the user interface of the second user device may include displaying the second plurality of windows of content on the user interface of the second user device simultaneously while displaying the plurality of windows of content on the user interface of the first user device.

Figure 10E:
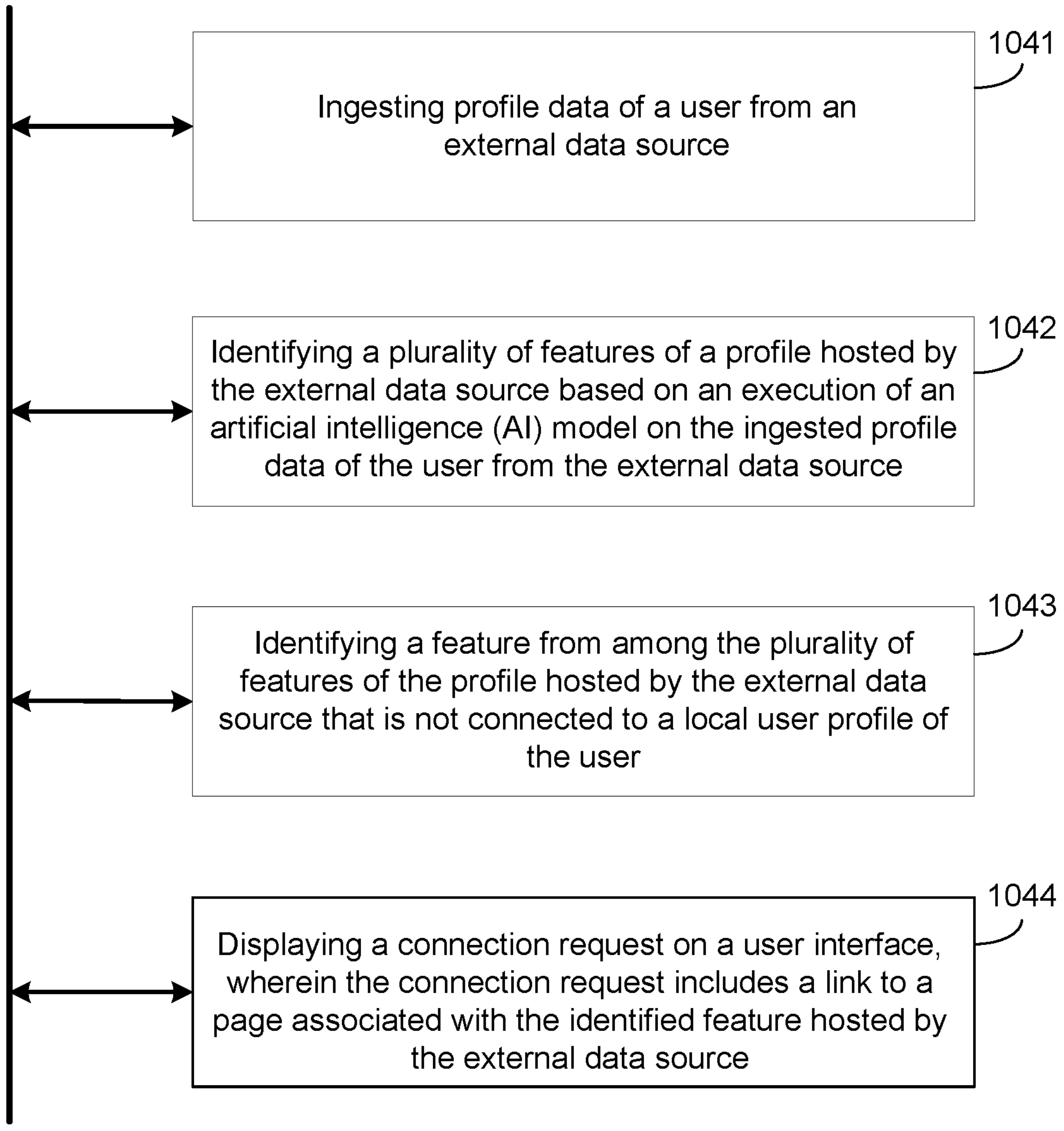
FIG. 10E is a diagram illustrating a method of predicting a content item on a GUI that is missing according to example embodiments.

FIG. 10E illustrates a method 1040 of predicting a content item on a GUI that is missing according to example embodiments. As an example, the method 1040 may be performed by a computing system, a software application, a server, a cloud platform, a combination of systems, and the like. Referring to FIG. 10E, in 1041, the method may include ingesting profile data of a user from an external data source. In 1042, the method may include identifying a plurality of features of a profile hosted by the external data source based on an execution of an artificial intelligence (AI) model on the ingested profile data of the user from the external data source. In 1043, the method may include identifying a feature from among the plurality of features of the profile hosted by the external data source that is not connected to a local user profile of the user. In 1044, the method may include displaying a connection request on a user interface, wherein the connection request includes a link to a page associated with the identified feature hosted by the external data source.

In some embodiments, the ingesting may include querying an endpoint associated with the external data source for an external user profile hosted at the external host system. In some embodiments, the method may further include outputting a query about the profile data from the external data source on the user interface of a user device of the user based on executing the AI model on the ingested profile data. In some embodiments, the method may further include receiving a response to the query, which is input via the user interface, and the identifying further comprises identifying the features hosted by the external host system that is not connected to the local user profile based on executing the AI model on the query and the received response to the query.

In some embodiments, the identifying of the plurality of features may include identifying a plurality of profile features of the user within a user profile from the external data source. In some embodiments, the identifying of the feature that is not connected may include identifying a profile feature from among the plurality of profile features that has not been added to a local profile of the user hosted by a host platform, and the displaying may include displaying a link to a landing page of the profile feature at the external host system.

In some embodiments, the method may further include ingesting profile data of the user from a second external data source and identifying a list of profile features that are active at the second external data source based on executing the AI model on the profile data of the user from the second external data source. In some embodiments, the method may further include identifying a feature that is active within the profile data of the user at the second external data source that is not connected to the local user profile and displaying a connection request on the user interface with a link to a page of the feature within the profile data at the second external data source. In one embodiment, a connection to open banking accesses the external data source. The connection may call out to secured external data requiring authentication to access.

Figure 10F:
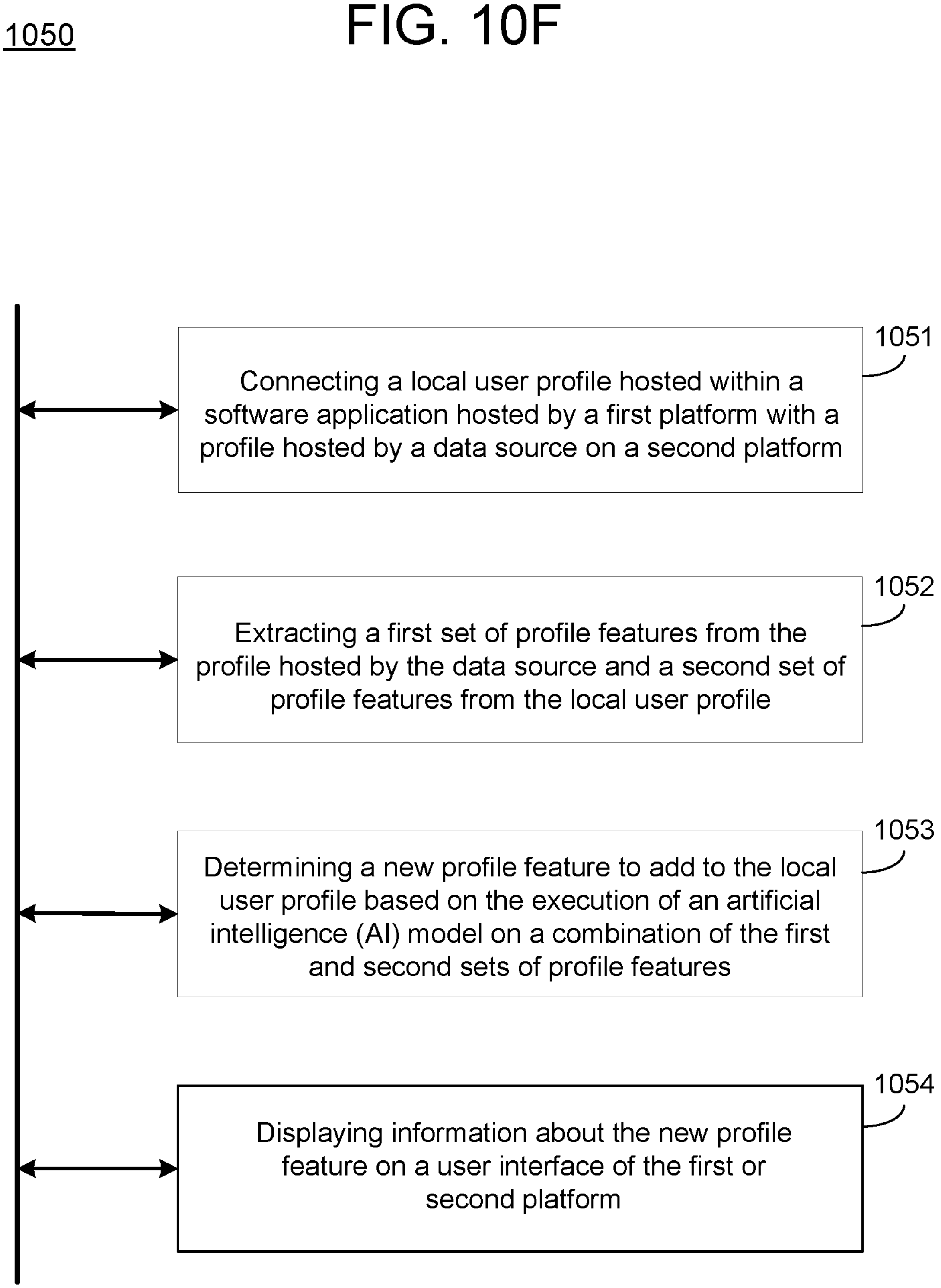
FIG. 10F is a diagram illustrating a method of generating a recommendation based on an externally connected data source according to example embodiments.

FIG. 10F illustrates a method 1050 of generating a recommendation based on an externally connected data source according to example embodiments. As an example, the method 1050 may be performed by a computing system, a software application, a server, a cloud platform, a combination of systems, and the like. Referring to FIG. 10F, in 1051, the method may include connecting a local user profile hosted within a software application hosted by a first platform with a profile hosted by a data source on a second platform. In 1052, the method may include extracting a first set of profile features from the profile hosted by the data source and a second set of profile features from the local user profile.

In 1053, the method may include determining a new profile feature to add to the local user profile based on the execution of an artificial intelligence (AI) model on a combination of the first and second sets of profile features. In 1054, the method may include displaying information about the new profile feature on a user interface of the first or second platform. In some embodiments, the connecting may include receiving credentials for a user profile from the external data source via the user interface and submitting the credentials to the external host system to connect the profile from the external data source to the software application.

In some embodiments, the extracting may include extracting a set of active features within the profile from the external data source and a set of active features within the local user profile hosted by the host platform and determining the new profile feature based on executing the AI model on each set of active features. In some embodiments, the determining may include identifying a feature of interest hosted by the host platform that is not included in the local user profile and not included in the profile from the external data source based on executing the AI model on the combination of the profile features extracted from the profile from the external data source and the profile features extracted from the local user profile.

In some embodiments, the method may further include training the AI model based on profiles of other users hosted by the host platform and features included in the profiles of the other users. In some embodiments, the method may further include displaying user interface controls within the user interface and receiving feedback about the new profile feature from the user interface based on inputs with respect to the user interface controls. In some embodiments, the method may further include retraining the AI model based on the new profile feature and the feedback about the new profile feature received from the user interface.

In one embodiment, the system is extended to a cloud-based platform wherein users can seamlessly integrate multiple profiles from various external data sources. The cloud platform allows centralized processing, making the execution of the AI model faster and more efficient, ensuring that profile features extracted from different sources are stored, processed, and updated in real time. Users connect to the cloud platform using secure credentials and select the external data sources they wish to integrate, and the cloud-based system automatically extract, process, and update profile features. The system harnesses the computational power and scalability advantages of cloud architectures. Users can effortlessly amalgamate multiple profiles sourced from a range of external data repositories by situating the method on a cloud platform. This centralized approach ensures swift and streamlined processing, allowing the AI model to execute tasks efficiently. In one embodiment, the system can constantly update and process profile attributes from diverse sources in a real-time setting. Users initiate a connection to the cloud platform via secure authentication methods. Once authenticated, they are presented with an interface where they can elect the external databases they intend to assimilate. Following this selection, the cloud system takes over, automatically reaching out to the chosen databases, retrieving the necessary profile components, processing this data, and ensuring that the profile features are constantly updated, ensuring that the user's integrated profile remains current and comprehensive.

In one embodiment, the system focuses on privacy preservation. Before extracting features from the external data source, the system employs encryption and/or other privacy-preserving techniques, ensuring that user data remains confidential. Only after this functionality would the AI model process the encrypted data. The system utilizes Homomorphic Encryption or Differential Privacy that is employed to protect the user's data during the feature extraction and processing phases. The system is tailored to safeguard user data even before feature extraction from external data sources commences. The system ensures that the user's data remains concealed and untouched from any potential breaches or unauthorized access. Only post this protective measure does the AI model proceed to decipher and process the encrypted data, ensuring that the original, unencrypted data never gets exposed to the model or any other entity. Techniques such as Homomorphic Encryption are employed. This method allows computations to be carried out on the encrypted data without ever needing to decrypt it, ensuring user data confidentiality throughout the processing phase. Additionally, Differential Privacy is used to add statistical noise to the user's data, ensuring that individual data points cannot be singled out, thus maintaining the user's anonymity.

In one embodiment, the system employs a user feedback mechanism. Once the new profile feature is displayed, the software application prompts the user with specific questions about relevance, accuracy, or utility, further refining the AI model's understanding. The system may incorporate pop-up surveys or sliders for users to rate the new profile features, which then feed back into the AI model for continuous learning. Upon the display of the new profile feature within the software application, it takes an extra step to engage the user actively. Rather than passively presenting information, the system proactively prompts the user with specific questions, probing insights about the newly presented profile feature's relevance, accuracy, or overall utility. Such a method is to garner user response and refine and enhance the AI model's comprehension and accuracy over time. In one embodiment, the system deploys pop-up surveys post the display of new profile features. These surveys could be designed with pointed questions, gauging user sentiment about the utility and relevance of the provided feature. Alternatively, sliders could be used, offering users an intuitive way to rate their satisfaction or agreement level with the feature on a continuum, be it from "Not Relevant" to "Highly Relevant" or any other relevant scale. These user inputs, once gathered, feed directly back into the AI model, allowing for continuous learning by the AI model. Every user interaction becomes a learning opportunity, allowing the AI model to iteratively fine-tune its predictions and outcomes, aligning more closely with user expectations, and ensuring enhanced user satisfaction in subsequent interactions.

In one embodiment, a multi-layered profile integration system is implemented. This system categorizes profile features into primary, secondary, and tertiary layers based on their relevance, giving users a more structured view of their integrated profile. The AI model ranks features based on a combination of factors such as source reliability, user feedback, and relevance scores. Instead of presenting users with a monolithic amalgamation of profile features, this approach brings more structure and hierarchy to the integrated profile. The system categorizes and presents profile features within three distinct layers: primary, secondary, and tertiary. Each of these layers is reflective of the relevance and importance of the features contained within. The AI model is responsible for ranking and segregating features across these layers. The ranking process is not arbitrary but is determined based on a meticulously designed combination of factors. For example, the reliability of the source from which the feature was extracted plays a crucial role. A feature from a trusted and verified source might naturally find its place in the primary layer, while one from a less reliable source might be relegated to the secondary or tertiary layers.

Furthermore, the system harnesses the power of user feedback, as further discussed herein in the interactive feedback mechanism. Features that consistently receive positive feedback or are deemed highly relevant by users might be elevated to higher layers, while those that fail to resonate with users might be moved down the hierarchy. Additionally, an intrinsic relevance score, computed by the AI model based on contextual factors and historical data, can further guide the categorization process.

In one embodiment, the system predicts potential future profile features based on patterns identified across multiple users and their external data sources. The AI model, trained on extensive user datasets, analyzes patterns and trends to forecast and suggest possible future profile additions or changes. Instead of solely aggregating and integrating current features, the system is designed to forecast potential future features. This is achieved by discerning patterns and commonalities identified across a broad spectrum of users and their respective external data sources. The AI model is trained on vast and diverse datasets encompassing a multitude of users. This training equips the model to identify overarching patterns, trends, and trajectories in profile feature evolutions. For example, if a significant proportion of users in a certain age bracket or geographical location begin to exhibit a particular new profile feature, the AI can extrapolate this data to predict that similar users might also adopt or showcase this feature in the near future.

Furthermore, by analyzing the historical data of individual users, the AI model can also gauge personal growth trajectories or changing interests. If a user's profile has shown an increasing inclination towards eco-friendly activities over the past year, the AI might predict and suggest features related to sustainable practices or green technologies for the upcoming months.

These predictive insights offer multiple benefits. For one, users can be better prepared for potential shifts in their profiles, giving them a foresight that can be advantageous in various scenarios, be it personal branding, career planning, or social networking. Additionally, by receiving these predictive insights, users might become more proactive, either embracing the predicted changes or consciously altering their trajectories based on the foresight provided.

In one embodiment, the system focuses on dynamic profile updates. Instead of a one-time extraction and integration, the system continuously monitors the external data sources for any changes and updates the local user profile accordingly. Using functionality such as web scrapers or API calls, the system remains connected to external sources, ensuring the user's profile within the software application remains up to date. In the current embodiment, the focus shifts from a static, one-off profile integration to an agile and dynamic approach, ensuring the user's profile remains perpetually current and reflective of any changes occurring in external data sources. The continuous monitoring ensures that any modifications, additions, or deletions in the external sources are promptly identified and mirrored in the local user profile within the software application. For example, if a user garners a new certification or alters their job position in an external professional networking site, this change would be automatically detected and replicated in the user's integrated profile. The operational engine driving this real-time synchronization can be powered by web scrapers or, more efficiently, by leveraging API calls. These tools can be scheduled to run at regular intervals or even be triggered by certain events, ensuring the timeliness of updates. Additionally, the system might incorporate notification mechanisms to maintain user trust and prevent potential data overload. Users are alerted whenever significant changes are identified and integrated, offering them the choice to review, accept, or reject these updates.

In one embodiment, an originating processor located within the host platform recognizes the need to integrate an external profile with the local user profile. Upon detecting a user's intent (possibly through a user interface action) or a predefined instruction, the processor sends a connection request message to a destination processor overseeing the external data source. This message may contain metadata about the local user profile, credentials for accessing the external data source, and other necessary details to facilitate the connection. Upon receipt of the connection request, the destination processor (within the external data source) validates the credentials and, if authenticated, sends a profile data message back to the originating processor. This message includes relevant profile features and any associated metadata from the external data source. After receiving the profile data message, the originating processor extracts the necessary features from the external and local user profiles. The processor then initiates the AI model to determine potential new features. To do this, it may send an AI processing request message to a dedicated AI module or a co-processor specifically designed for AI computations. This message contains a combination of profile features extracted from both the local user profile and the external data source. Upon completing the computations, the AI co-processor identifies the new profile feature(s) and sends back a feature identification message to the originating processor. This message conveys details of the new profile feature and any relevant insights or recommendations associated with it. Lastly, the originating processor, equipped with the new profile feature data, commands the software application's user interface module to display the feature. It does so by dispatching a UI update message, instructing the UI to update and showcase the new feature details to the user.

In one embodiment, the originating processor within the host platform triggers a credential request message to the user interface, prompting users to input their profile credentials for the external data source. Once the user submits the credentials through the user interface, the UI sends a credential submission message back to the originating processor. This message contains the user's credentials for the external profile. The originating processor then sends a profile connection message to the destination processor in the external data source containing the user's credentials. Upon successful validation of these credentials by the destination processor, an authentication acknowledgment message is relayed back, permitting the connection and subsequent data exchange between the host platform and the external data source.

In one embodiment, the originating processor sends a feature extraction request message to both the local profile's storage module and the destination processor at the external data source.

Once the features are extracted, the external data source's processor sends an active feature data message to the originating processor. This message provides details about the active features present in the external profile. Upon collating active features from both profiles, the originating processor dispatches an AI active feature processing request message to the dedicated AI co-processor or module. This message contains both sets of active features, prompting the AI to determine the new profile feature.

In one embodiment, after extracting profile features from both sources, the originating processor seeks to identify any unique features not present in either profile. To achieve this, it sends a feature comparison request message to the AI co-processor, containing profile features from both the local user profile and the external data source. The AI co-processor then performs a comparative analysis, identifying any "features of interest" missing from both profiles. Upon completion, it sends back a feature identification message to the originating processor. This message provides details of the identified features of interest and relevant data, or metadata associated with them.

In one embodiment, the system trains the AI model with profiles of other users. The originating processor in the host platform sends an AI training request message to the dedicated AI co-processor or module. This message instructs the AI module to initiate a training session using stored profiles. Subsequently, the originating processor sends a user profile data collection message to the data storage module, which contains profiles of other users. The storage module then retrieves these profiles and sends back a profile data response message comprising features from multiple user profiles. Once the AI co-processor receives this bulk of data, it commences the training process. Upon completion, the AI module sends a training completion acknowledgment message to the originating processor, confirming that the model is now updated and trained based on the combined user data.

In one embodiment, the originating processor dispatches UI controls to display messages to the user interface module. This message prompts the display of specific controls that allow users to give feedback on the new profile feature. Once the user interacts with these controls and provides feedback, the user interface sends a user feedback message back to the originating processor. This message contains the user's inputs and opinions on the new profile feature.

In one embodiment, the system refines the AI model. Upon receipt of the user feedback message, the originating processor sends an AI retraining request message to the AI co-processor. This message comes with the new profile feature details and user feedback. Having received instructions to retrain, the AI co-processor assimilates the new data and feedback to refine its predictions and recommendations. Upon the completion of the retraining process, the AI co-processor sends back a retraining completion acknowledgment message to the originating processor, confirming that the AI model has been successfully updated based on user feedback.

In one embodiment, the primary apparatus consists of a processor linked with a memory. The processor, on initiation, sends a message (Message A) to an external data source's processor, requesting user profile data. Once this data is received, the processor employs an AI model, processing the data to recognize distinct features. If a feature not connected to the local profile is found, the processor sends a display request (Message B) to the user interface processor, prompting it to show a connection request with a relevant link. After the primary processor ingests user profile data, it sends another message (Message C) to query an endpoint related to the external data source. This message asks for more comprehensive details of the user's profile hosted externally. Upon receiving the query, the external source's processor fetches the requested profile and sends it back. Post data ingestion and AI analysis, the primary processor may generate a query about the external profile data. It then sends a display request (Message D) to the user interface processor, prompting it to present this query on the user's device interface for further clarification or feedback. When the user interacts with the query displayed, their input is captured by the user interface processor and sent (Message E) to the primary processor. The processor then utilizes the AI model again, combining the user's response with the previously ingested data to further identify unlinked features from the external source. The primary processor uses the AI model to analyze the ingested external user profile data. If multiple features within the external profile are identified, it catalogs them for future reference or actions. Post the identification of multiple features; the processor determines any feature not added to the local profile. Once such a feature is found, a display request (Message F) is sent to the user interface processor, prompting it to showcase a direct link to the unadded feature's landing page on the external source. The primary processor, in addition to the first external data source, sends a data request (Message G) to a second external data source's processor. Once the user profile data from this second source is ingested, the AI model is again used to determine active profile features specific to this source. When the processor identifies an active feature in the second external source's data not connected to the local profile, it dispatches another display request (Message H) to the user interface processor. This message prompts the display of a connection request, complete with a link that leads to the feature's specific page on the second external source.

In one embodiment, when the processor trains the AI model on user interface (UI) preferences, it might send a "Training Initiation" message to secondary processors responsible for managing the UI. Upon receiving a call between two devices, a "Call Detected" message can be sent to the AI model, prompting it to access recent training data. When generating and displaying content windows, the processor sends a "Display Request" message to each device's processor, detailing the content to be displayed. When executing the AI model on previous meetings' content, the processor sends a "Data Retrieval" message to storage processors, requesting past calls and visual content between the two devices. This information is utilized to refine and train the AI model further. For audio and video feeds, the processor sends a "Feed Request" message to the processors of the devices (first and/or second user device) to obtain real-time data streams. These streams are processed and used as input for displaying relevant content windows. Upon a call's initiation, the processor may send a "Meeting Summary Request" message to the originating device, asking for an overview or agenda. The returned summary then influences the content windows that will be displayed. For generating unique content windows for the second device, a "Unique Window Generation" message is sent from the main processor to the AI model, which determines and sends back the unique content based on its training. When generating content for both devices, the main processor sends a "Layout Preference Query" message to each device's processor. This is to gather UI preferences and arrange content accordingly. The devices' processors respond with a "Preference Data" message containing the necessary UI details. The main processor sends a "Historical Data Request" message to storage processors to determine unique device preferences, requesting data from previous interactions between the two devices. The AI model uses this data to discern and predict UI layout preferences. The main processor sends concurrent "Display Request" messages to both the first and second user devices to ensure simultaneous display. This ensures that content windows appear on both devices' interfaces at the same time, enhancing the synchronized user experience.

In one embodiment, the apparatus's processor (Processor A) receives a command to display the graphical user interface (GUI). Processor A sends a message to the memory requesting the standard layout of the GUI. Upon receiving user input to modify the GUI, Processor A instructs an AI model processor (Processor B) to generate a dynamic mapping or dynamic image of the updated GUI. Processor B, after processing, sends back a mapping or image, which Processor A then commands to be stored in the memory. When a request comes to open a software application, Processor A queries the memory for the stored dynamic mapping or image of the GUI. Once retrieved, Processor A sends a message to the software application's processor (Processor C) with instructions on how to configure the user interface elements based on the retrieved dynamic mapping or image. Upon recognizing a software launch request, Processor A communicates with a device identification processor (Processor D) to determine the type of device in use. With this information, Processor A and Processor B collaborate to adjust the GUI's configuration in accordance with the device type. Processor D proactively identifies the device type and communicates this to Processor A. Using this data, Processor A collaborates with Processor C to adjust the GUI elements' positions, ensuring optimal compatibility with the recognized device. This claim underscores the various elements within the GUI. When these elements are interacted with or modified, Processor A sends element-specific messages to Processor B, guiding the AI model's decisions in real-time. When a request to view the GUI is received, Processor A communicates with the memory to fetch the dynamic mapping or image. This mapping or image is then dispatched to Processor C (software application processor) to reconstruct and display the most recent GUI configuration. Processor A commands Processor B to undergo training before creating the dynamic mapping or image. Processor A sends historical user data from the memory to Processor B. Processor B processes this data, training the AI model to better predict user preferences based on historical interactions. Processor B, once trained, isn't confined to serving a single user. When a second user's GUI interaction is detected by Processor A, it communicates with Processor B, instructing it to use the trained AI model. Processor B then modifies the second user's GUI elements within their software application, ensuring a personalized user experience based on the shared knowledge.

In one embodiment, the core apparatus consists of a memory and a processor (referred to as Processor A). Processor A has multiple functionalities, primarily centered on portfolio analysis and display adjustments based on the results of an AI model. This model could be executed on a specialized AI processor, referred to herein as Processor B. Additionally, an external data store, managed by Processor C, can be involved when querying for additional data. Processor A initializes by storing portfolios from multiple users. When a user shares their portfolio during a call, Processor A packages this portfolio data and sends a message to Processor B, asking for a similarity analysis. The message might be formatted as: [Request: Similarity Analysis; Data: User Portfolio; Stored Portfolios]. After executing the AI model, Processor B returns a subset of users deemed similar. Processor A then cross-references the user's portfolio against these similar ones to find missing items and prepares to display content related to the missing item. Upon receiving a command to display content within a specific software application in the user's portfolio, Processor A retrieves the content related to the identified item and embeds it within the software application, ensuring a seamless user experience. Processor A reviews the user's portfolio and detects asset matches with the stored portfolio content. This might involve a message within Processor A like: [Action: Asset Match; Data: User Portfolio; Stored Portfolios], facilitating internal cross-referencing and asset identification. With the user's asset set identified, Processor A sends another message to Processor B: [Request: Asset Recommendation; Data: User Asset Set]. Processor B uses the AI model to determine possible asset additions and responds with suitable recommendations. Upon determining a potential item to add to the user's portfolio, Processor A consults Processor B on the volume or amount of the item. The message might be: [Request: Asset Volume Analysis; Data: Item Identifier, User Portfolio]. Processor B evaluates the request and provides an appropriate amount based on the AI model's outcomes. Processor A sends a query to Processor C: [Request: Performance Data; Data: Item Identifier] for a detailed analysis of an item's performance. Processor C searches its databases and sends back the performance data. Processor A creates a graphical representation with this data to illustrate the item's performance. When a software application is maintaining the call, Processor A integrates the graphical representation within this application's interface, enhancing the user's context during the call. To predict an asset's future performance, Processor A communicates with Processor B using the message: [Request: Future Performance Prediction; Data: Item Performance Data]. Processor B executes the AI model, analyzes the historical performance data, and sends back predictive graphical content like charts or graphs.

In one embodiment, a primary Processor A (managing user interactions and content display) and an auxiliary Processor B (handling AI operations and predictions) is presented. When a user positions or interacts with content objects on a user interface, Processor A captures these actions, documenting each with its associated content type. This data is accumulated for the training of an AI model. Once a user requests to open a content object on the user interface, Processor A dispatches a message to Processor B, which might be framed as: [Action: Predict Placement; Data: Content Type]. Using its trained AI model, Processor B calculates the optimal placement and communicates back with the preferred location. Processor A then ensures the object is displayed at that recommended position on the user interface. Processor A's data recording routine captures the x-y coordinates (horizontal and vertical pixel locations) of content objects on the user interface, associating each position with its relevant content type. This granular data aids the AI model in developing more precise placement predictions. For the AI model to understand the spatial context of user placements, Processor A sends spatial positioning data to Processor B. This information emphasizes positions relative to the user interface's boundary or outer perimeter, allowing the AI model to recognize patterns and preferences in proximity to edges. When a user manually relocates a content object, Processor A notices this shift, especially if it's from an AI-recommended location. This movement, and its associated metadata, are then documented for further model refinement. Recognizing potential discrepancies between user behavior and AI suggestions, Processor A may periodically initiate AI model retraining. It communicates with Processor B via a message like: [Action: Retrain; Data: Movement Logs]. Processor B adjusts the AI model, using these logs to better align predictions with user behavior. On detecting user input on an existing object in the user interface, Processor A sends a query to Processor B with the structure: [Request: Adjust Position; Data: Content Type]. Given the existing AI data and the content type in question, this determines whether the item's position should be modified. For repositioning already-placed objects, Processor A dispatches another message to Processor B: [Action: Determine New Position; Data: Content Type of Object]. Processor B consults the AI model, deduces a new optimal position, and conveys this back. Processor A then commands the UI to shift the object to this new location. Processor A takes a snapshot of current object placements and their content types to dynamically reconfigure the user interface. It sends this bulk data to Processor B as [Action: Dynamic Rearrangement; Data: Current Positions and Types]. Processor B evaluates the data, uses the AI model to suggest a new layout, and communicates this back. Processor A enacts these changes, ensuring the user interface reflects the updated, optimal object arrangement.

In one embodiment, the system maps the user interface elements, not an image of the user interface. This mapping allows for both a wider repositioning of the elements within the application, and provisioning of the AI-generated GUI.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 11 illustrates an example computer system architecture, which may represent or be integrated in any of the above-described components, etc.

Figure 11:
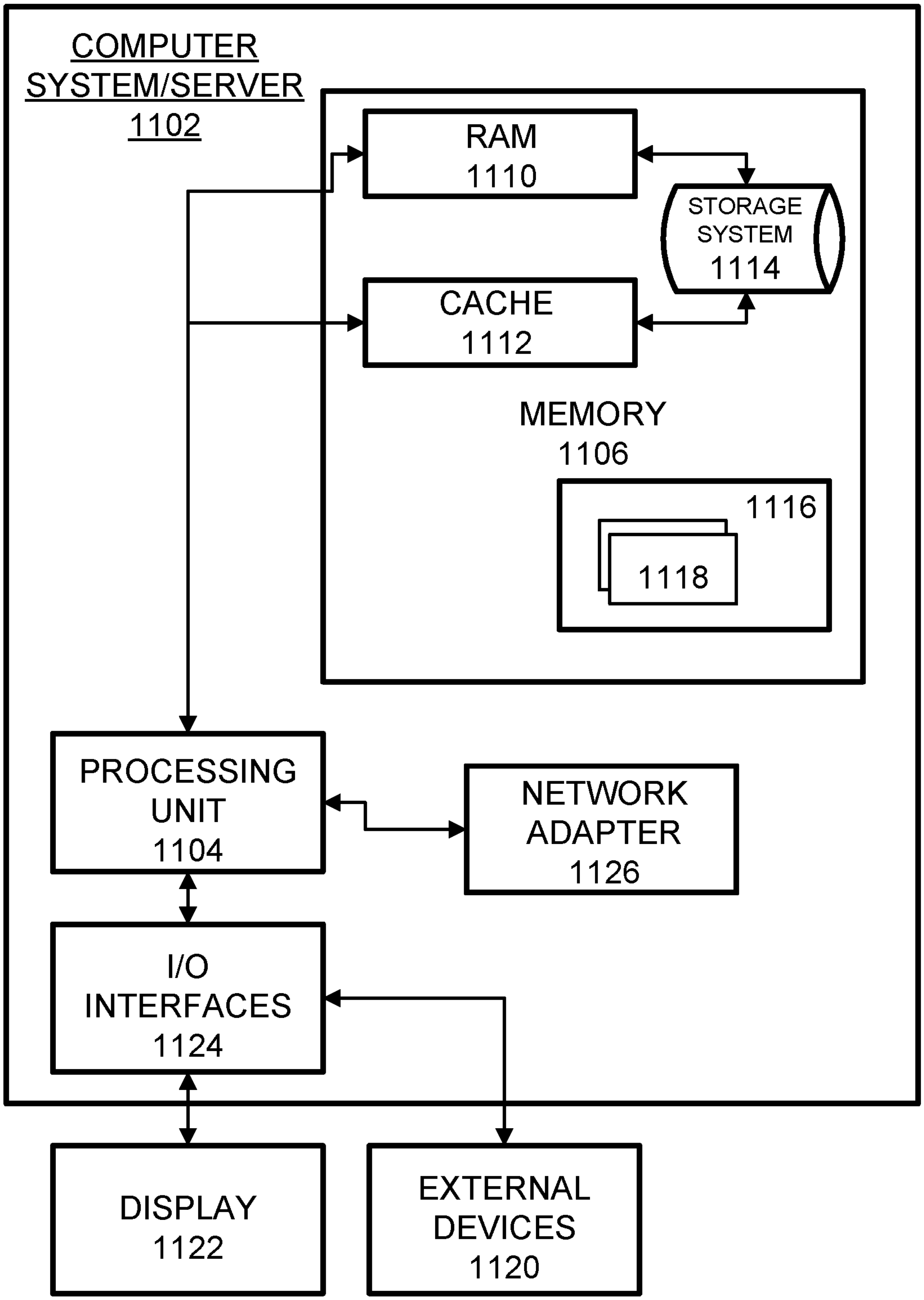
FIG. 11 is a diagram illustrating a computing system that may be used in any of the example embodiments described herein.

FIG. 11 illustrates an example system 1100 that supports one or more of the example embodiments described and/or depicted herein. The system 1100 comprises a computer system/server 1102, which is operational with numerous other general purpose or special purpose computing system environments or configurations. Examples of well-known computing systems, environments, and/or configurations that may be suitable for use with computer system/server 1102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on, that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

A distributed cloud computing environment represents a sophisticated evolution of cloud services, breaking away from the traditional centralized model and pushing applications, data, and computing power to more localized environments. This architecture is inherently spread across multiple distinct geographical locations, implying that computing resources, storage, and networking capabilities can be located at the edge of the cloud network, reducing latency, bandwidth use, and data sovereignty concerns.

In such an environment, public cloud providers leverage a mix of their own and third-party infrastructure to support the distribution of public cloud services to different physical locations. However, the services are still managed centrally. Customers can use and access these services locally, enjoying the benefits of a public cloud service, including scalability, elasticity, and up-to-date feature sets, while also experiencing lower latency and data processing closer to the point of origin, often critical for compliance-bound data processing or latency-sensitive applications.

An integral component of this distributed approach includes edge computing, which allows for the processing of data closer to its source, or "edge" of the network, rather than relying on a centralized data-processing warehouse.

Underpinning these services is a network of data centers or processing nodes, often micro data centers, that are interconnected via high-speed communication networks. This ensures not only rapid data transfer but also resilience and redundancy, as the distributed nature of these resources means that they are less susceptible to single points of failure. The management plane of this distributed cloud remains centralized, providing a uniform method of deploying, operating, and monitoring the services, thus ensuring consistent security, policy, and governance across the ecosystem.

As shown in FIG. 11, computer system/server 1102 in the example system 1100 is shown in the form of a general-purpose computing device. The components of computer system/server 1102 may include, but are not limited to, one or more processors or processing units (processor 1104), a system memory 1106, and a bus that couples various system components including the system memory 1106 to the processor 1104.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1102 typically includes a variety of computer system readable media. Such media may be any available media that is accessible by computer system/server 1102, and it includes both volatile and non-volatile media, removable and non-removable media. The system memory 1106, in one embodiment, implements the flow diagrams of the other figures. The system memory 1106 can include computer system readable media in the form of volatile memory, such as random-access memory (RAM) 1110 and/or cache memory 1112. Computer system/server 1102 may further include other removable/non-removable, volatile/non-volatile computer system storage media. By way of example only, storage system 1114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk, such as a CD-ROM, DVD-ROM or other optical media, can be provided. In such instances, each can be connected to the bus by one or more data media interfaces. As will be further depicted and described below, the system memory 1106 may include at least one program product having a set (e.g., at least one) of program modules that are configured to carry out the functions of various embodiments of the application.

Program/utility 1116, having a set (at least one) of program modules 1118, may be stored in the system memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1102 may also communicate with one or more external devices 1120, such as a keyboard, a pointing device, a display 1122, etc.; one or more devices that enable a user to interact with computer system/server 1102; and/or any devices (e.g., network card, modem, etc.) that enable computer system/server 1102 to communicate with one or more other computing devices. Such communication can occur via input/output (I/O) interfaces 1124. Still yet, computer system/server 1102 can communicate with one or more networks, such as a local area network (LAN), a general wide area network (WAN), and/or a public network (e.g., the Internet) via network adapter 1126. As depicted, network adapter 1126 communicates with the other components of computer system/server 1102 via a bus. It should be understood that although not shown, other hardware and/or software components could be used in conjunction with computer system/server 1102. Examples include, but are not limited to, microcode, device drivers, redundant processing units, external disk drive arrays, redundant array of independent disks (RAID) systems, tape drives, and data archival storage systems, etc.

Although an exemplary embodiment of at least one of a system, method, and computer readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the system's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors, such as logic chips, transistors, or other discrete components. A module may also be implemented in programmable hardware devices, such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:

a memory; and a processor coupled to the memory, the processor configured to:

render, on a first device, a graphical user interface that includes a plurality of elements, modify spatial locations of the plurality of elements within the graphical user interface based on inputs on the graphical user interface, generate a machine-readable mapping structure that includes a pixel mesh sub-structure that comprises modified spatial locations of the plurality of elements and content-type identifiers corresponding to the plurality of elements embedded therein based on an execution of an artificial intelligence (AI) model on the rendered graphical user interface, and automatically render the graphical user interface on a second device that comprises a display configuration that corresponds to the machine-readable mapping structure.

2. The apparatus of claim 1, wherein the processor is configured to receive a request to open a software application comprising a display window, and in response, configure locations of the plurality of elements within the display window of the software application based on the machine-readable mapping structure.

3. The apparatus of claim 1, wherein the processor is further configured to receive a device type of the first device and generate the machine-readable mapping structure based on the execution of the AI model on the device type.

4. The apparatus of claim 1, wherein the processor is configured to identify a device type of the first device and configure the spatial locations of the plurality of elements on the graphical user interface within a display window based on the device type.

5. The apparatus of claim 1, wherein the plurality of elements comprises a plurality selected from a group of elements including a button, a slider, a text field, a combo box, and a menu, which are displayed within the graphical user interface.

6. The apparatus of claim 1, wherein the processor is further configured to receive a request for the graphical user interface, and in response, reconstruct the graphical user interface with the modified locations of the plurality of elements based on the machine-readable mapping structure.

7. The apparatus of claim 1, wherein the processor is configured to train the AI model prior to generating the machine-readable mapping structure, wherein the training comprises executing the AI model based on historical locations of user interface elements.

8. The apparatus of claim 1, wherein the pixel mesh sub-structure comprises a plurality of mesh cells that comprise coordinate locations and content-type identifiers of the plurality of elements within the graphical user interface.

9. The apparatus of claim 1, wherein the processor is configured to select the machine-readable mapping structure based on the display configuration of the second device prior to rendering the graphical user interface.

10. A method comprising:

rendering, on a first device, a graphical user interface including a plurality of elements;

modifying spatial locations of the plurality of elements within the graphical user interface based on inputs on the graphical user interface;

generating a machine-readable mapping structure that includes a pixel mesh sub-structure that comprises the modified spatial locations of the plurality of elements and content-type identifiers corresponding to the plurality of elements embedded therein based on an execution of an artificial intelligence (AI) model on the rendered graphical user interface; and automatically rendering the graphical user interface on a second device that comprises a display configuration that corresponds to the machine-readable mapping structure.

11. The method of claim 10, wherein the method further comprises receiving a request to open a software application comprising a display window, and in response, configuring the locations of the plurality of elements within the display window of the software application based on the machine-readable mapping structure.

12. The method of claim 10, wherein the method further comprises identifying a device type of the first device and generating the machine-readable mapping structure based on the execution of the AI model on the device type.

13. The method of claim 10, wherein the method further comprises identifying a device type of the first device and further configuring the spatial locations of the plurality of elements on the graphical user interface within a display window based on the device type.

14. The method of claim 10, wherein the plurality of elements comprises a plurality selected from a group of elements including a button, a slider, a text field, a combo box, and a menu, which are displayed within the graphical user interface.

15. The method of claim 10, wherein the method further comprises receiving a request for the graphical user interface, and in response, reconstructing the graphical user interface with the modified spatial locations of the plurality of elements based on the machine-readable mapping structure.

16. The method of claim 10, wherein the method further comprises training the AI model prior to generating the machine-readable mapping structure, wherein the training comprises executing the AI model based on historical locations of user interface elements.

17. A non-transitory computer-readable storage medium comprising instructions stored therein which when executed by a processor cause a computer to perform:

rendering, on a first device, a graphical user interface including a plurality of elements;

modifying spatial locations of the plurality of elements within the graphical user interface based on inputs on the graphical user interface;

generating a machine-readable mapping structure that includes a pixel mesh sub-structure that comprises the modified spatial locations of the plurality of elements and content-type identifiers corresponding to the plurality of elements embedded therein based on an execution of an artificial intelligence (AI) model on the rendered graphical user interface; and automatically rendering the graphical user interface on a second device that comprises a display configuration that corresponds to the machine-readable mapping structure.

18. The non-transitory computer-readable storage medium of claim 17, wherein the computer is further configured to perform receiving a request to open a software application comprising a display window, and in response, configuring the locations of the plurality of elements within the display window of the software application based on the machine-readable mapping structure.

19. The non-transitory computer-readable storage medium of claim 17, wherein the computer is further configured to perform identifying a device type of the first device and generating the machine-readable mapping structure based on the execution of the AI model on the device type.

20. The non-transitory computer-readable storage medium of claim 17, wherein the computer is further configured to perform identifying a device type of the first device and configuring the spatial locations of the plurality of elements on the graphical user interface within a display window based on the device type.

* * * * *